US012296867B2

(12) United States Patent
Griffis et al.

(10) Patent No.: US 12,296,867 B2
(45) Date of Patent: May 13, 2025

(54) AUTOMATED ON-WHEEL THERMOGRAPHY FOR SAFETY AND PREVENTION

(71) Applicant: Delta Thermal, Inc., Tucson, AZ (US)

(72) Inventors: Andrew Griffis, Tucson, AZ (US);
Michael Snyder, Tucson, AZ (US);
Nicholas Griffis, Tucson, AZ (US);
Jacob Dorer, Tucson, AZ (US)

(73) Assignee: Delta Thermal, Inc., Tucson, AZ (US)

( * ) Notice: Subject to any disclaimer, the term of this patent is extended or adjusted under 35 U.S.C. 154(b) by 0 days.

(21) Appl. No.: 18/913,956

(22) Filed: Oct. 11, 2024

(65) Prior Publication Data

US 2025/0121862 A1  Apr. 17, 2025

Related U.S. Application Data

(60) Provisional application No. 63/589,596, filed on Oct. 11, 2023.

(51) Int. Cl.
*B61K 9/06* (2006.01)
*G01M 13/045* (2019.01)

(52) U.S. Cl.
CPC ............. *B61K 9/06* (2013.01); *G01M 13/045* (2013.01)

(58) Field of Classification Search
CPC ................................ B61K 9/06; G01M 13/045
See application file for complete search history.

(56) References Cited

U.S. PATENT DOCUMENTS

| | | | |
|---|---|---|---|
| 9,365,223 B2* | 6/2016 | Martin | G01K 7/023 |
| 9,685,065 B2 | 6/2017 | Diels | |
| 9,857,272 B2* | 1/2018 | Summers | F16C 19/527 |
| 10,005,317 B2 | 6/2018 | Biderman et al. | |
| 10,122,969 B1 | 11/2018 | Lim et al. | |
| 10,796,403 B2 | 10/2020 | Choi et al. | |
| 10,991,217 B2 | 4/2021 | Griffis | |
| 11,068,679 B2 | 7/2021 | Rodriguez et al. | |
| 11,832,025 B2 | 11/2023 | Griffis | |

(Continued)

FOREIGN PATENT DOCUMENTS

WO   2012/006605 A2   1/2012

OTHER PUBLICATIONS

Gong et al, Y. "Self-Powered Wireless Sensor Node for Smart Railway Axle Box Bearing via a Variable Reluctance Energy Harvesting System", Google Scholar, IEEE Transactions on Instrumentation and Measurement, vol. 70, Apr. 2021, pp. 1-11. (Year: 2021).*

(Continued)

*Primary Examiner* — Russell Frejd
(74) *Attorney, Agent, or Firm* — NGUYEN TARBET IP LAW

(57) ABSTRACT

A comprehensive system designed for the predictive maintenance of railcar wheel bearings, integrating multiple sensor modalities. The system includes thermography for temperature mapping, vibration analysis via a three-axis accelerometer, rotational velocity measurement using a rate gyro, and optical spectrometry for lubricant analysis. Each modality contributes to a holistic understanding of bearing health, enhancing maintenance strategies, safety, and operational efficiency in rail transportation.

21 Claims, 28 Drawing Sheets

(56) References Cited

U.S. PATENT DOCUMENTS

| | | | |
|---|---|---|---|
| 2006/0222278 A1* | 10/2006 | Singh | F16C 33/581 |
| | | | 384/448 |
| 2009/0136099 A1 | 5/2009 | Boyden et al. | |
| 2011/0301873 A1* | 12/2011 | Cocconcelli | G01M 13/045 |
| | | | 702/35 |
| 2014/0114555 A1 | 4/2014 | Lagassey | |
| 2015/0035961 A1 | 2/2015 | Chen et al. | |
| 2015/0168864 A1 | 6/2015 | Herloski et al. | |
| 2016/0313442 A1 | 10/2016 | Ho et al. | |
| 2017/0337700 A1 | 11/2017 | Wilson et al. | |
| 2017/0370775 A1 | 12/2017 | Kusukame et al. | |
| 2018/0035084 A1 | 2/2018 | Swiss et al. | |
| 2018/0149949 A1 | 5/2018 | Kim et al. | |
| 2019/0038365 A1 | 2/2019 | Soper et al. | |
| 2019/0310137 A1 | 10/2019 | Pop | |
| 2020/0041348 A1 | 2/2020 | Kusukame et al. | |
| 2020/0134939 A1 | 4/2020 | Schell et al. | |
| 2020/0224460 A1 | 7/2020 | Miller et al. | |
| 2020/0242737 A1 | 7/2020 | Stan et al. | |
| 2023/0035869 A1* | 2/2023 | Martin | B61H 13/00 |

OTHER PUBLICATIONS

Bernal et al, E. "Onboard Condition Monitoring Sensors, Systems and Techniques for Freight Railway Vehicles: A Review", Google Scholar, IEEE Sensors Journal, vol. 19, No. 1, Jan. 2019, pp. 4-24. (Year: 2019).*

Dziadak et al, B. "Powering the WSN Node for Monitoring Rail Car Parameters, Using a Piezoelectric Energy Harvester", Google Scholar, MDPI, Energies, Feb. 2022, pp. 1-18. (Year: 2022).*

Mohamed et al., "Partial Discharge Detection and Localization: Using Software-Defined Radio", IEEE Industrial Electronics Magazine, vol. 13, Issue 4, Dec. 23, 2019, pp. 77-85.

USPTO, "Non-Final Office Action" issued in connection with U.S. Appl. No. 16/779,622, dated Oct. 8, 2020, 20 pages.

USPTO, "Non-Final Office Action" issued in connection with U.S. Appl. No. 17/237,032, dated Jan. 10, 2023, 17 pages.

USPTO, "Non-Final Office Action" issued in connection with U.S. Appl. No. 18/490,044, dated Dec. 27, 2024, 14 pages.

WIPO, "International Search Report and Written Opinion" issued in connection with PCT Patent Application PCT/US2024/051276, dated Jan. 14, 2025, 12 pages.

* cited by examiner

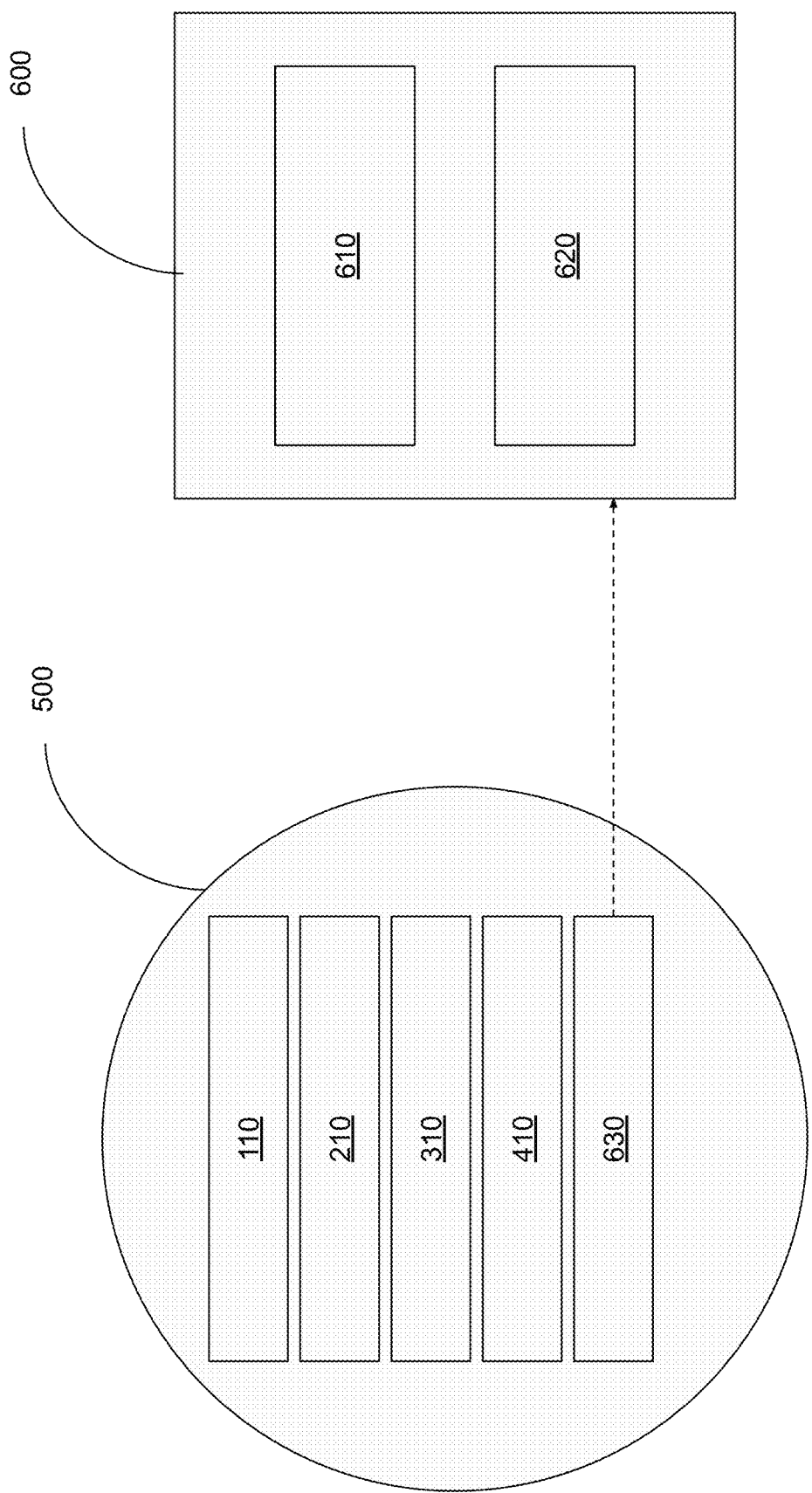

AUTOMATED ON-WHEEL THERMOGRAPHY FOR SAFETY AND PREVENTION

CROSS-REFERENCES TO RELATED APPLICATIONS

This application is a non-provisional and claims benefit of U.S. Provisional Application No. 63/589,596 filed Oct. 11, 2023, the specification of which is incorporated herein in its entirety by reference.

BACKGROUND OF THE INVENTION

Railroads use rail vehicles to move essential freight for commercial transactions in the U.S. Except for the locomotives, rail vehicles do not have any drive train. This means that the vast majority of the wear and tear will occur near the wheel—the truck assembly, the bearings, and the wheel-track interface. Consequently, breakdowns and accidents will often be found in or near wheel bearings. The wheel bearings are, in fact, the point of failure for the East Palestine (EP) incident. Runaway bearing heating produced a catastrophic failure. Heat is the mechanism by which most physical systems manifest "trouble". Since heat is often the final "complaint" of failing equipment, it is valuable to measure overheating precursors also—the impact, acoustic, and vibration sensors that can provide warnings about the early onset of known failure modes. Further, since time is of the essence for a profitable railroad, having data that is both continuous (short time between measurements) and comprehensive (spanning all rail cars in a train) is vital. The root cause of the problems facing commercial railroad companies is both in the character of the data and the quantity of data. There are data gaps that preclude effective decision-making. Thus, a present need exists for predictive maintenance technologies for rail transportation systems, more particularly, an integrated sensor system for the real-time assessment of railcar wheel bearing conditions using thermal, vibrational, rotational, and spectroscopic analysis.

Prior systems, such as that described in U.S. Pat. No. 10,005,317 describe measuring thermal energy on a wheel, but do not discuss any non-contact means of measuring heat, nor any infrared observation of heat. This prior reference also does not concern the generation of electrical power for the sake of powering electronics. This disclosure explicitly intends to use and monitor conductive thermal paths for the sake of managing a battery and connected motor components.

The invention described by US20200134939A1 describes a magnetic powering component separate from the bulk of the sensor device. Bearings are used to support the stationary component of the magnetic powering component. Similar to U.S. Pat. No. 10,005,317, there are no non-contact means of measuring heat, nor any infrared observation of heat described in this prior reference. Furthermore, no prior references are configured to attach to the specific shape of the bearings on an axle end cap of a railcar. The attachment methods described in the prior references would not be applicable or make obvious any method of attaching a sensor device to the axle end cap of a railcar.

FIELD OF THE INVENTION

The present invention is directed to real-time assessment of railcar wheel bearing conditions using thermal, vibrational, rotational, and spectroscopic analysis.

BRIEF SUMMARY OF THE INVENTION

It is an objective of the present invention to provide systems and devices that allow for real-time assessment of railcar wheel bearing conditions using thermal, vibrational, rotational, and spectroscopic analysis, as specified in the independent claims. Embodiments of the invention are given in the dependent claims. Embodiments of the present invention can be freely combined with each other if they are not mutually exclusive.

The present invention comprises a disk-shaped sensor device designed to autonomously measure and analyze the condition of railcar wheel bearings. The sensor device is equipped with thermographic imaging capabilities, a three-axis accelerometer, a rate gyro, and an optical spectrometer. This multimodal approach allows for an unprecedented level of detail in bearing condition assessments, supporting preventive maintenance and extending vehicle system lifetimes.

The present invention features a self-powered system configured to measure properties of one or more bearings of one or more wheels. In some embodiments, the system may comprise one or more sensor devices, each sensor device disposed on a wheel of the one or more wheels. Each sensor device may comprise one or more thermal sensors, configured to continuously measure a temperature of the one or more bearings and generate a continuous temperature data stream. Each sensor device may further comprise a magnetic power unit operatively coupled to the one or more thermal sensors, configured to convert a rotation of the wheel into energy and power the sensor device with the energy without a battery. The system may further comprise a computing device communicatively coupled to the one or more sensor devices, configured to accept, for each sensor device, the continuous temperature data stream from the one or more thermal sensors, generate a temperature map of the one or more bearings based on the one or more continuous temperature data streams, measure a heat value of one or more regions of the temperature map against a heat threshold, and identify, if the heat value of a region of the one or more regions exceeds the heat threshold, a hot spot indicative of one or more anomalies of the one or more bearings.

The features that are likely to contribute to the patentability of the railcar wheel bearing sensor system are its multifunctional integrated design, real-time predictive maintenance capabilities, and self-powered operation. Specifically, the system's innovative integration of thermography, vibration analysis, rate gyro, and optical spectrometry into a single, self-sustaining unit that attaches directly to the wheel bearing assembly is novel. This integration allows for comprehensive monitoring and analysis of bearing conditions, which can significantly enhance preventative maintenance strategies for railcar vehicles. The sensor's ability to generate its own power from the wheel's rotation adds to its uniqueness and practicality in the field.

One of the unique and inventive technical features of the present invention is the implementation of a self-powered sensor device configured to be applied directly to a wheel. Without wishing to limit the invention to any theory or mechanism, it is believed that the technical feature of the present invention advantageously provides for wire-free and continuous measurement of the properties of the wheel while in use. None of the presently known prior references or work has the unique inventive technical feature of the present invention.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE SEVERAL VIEWS OF THE DRAWING(S)

The features and advantages of the present invention will become apparent from a consideration of the following detailed description presented in connection with the accompanying drawings in which:

FIG. 18 shows a schematic of an embodiment of the sensor device of the present invention having thermal sensing, accelerometer, gyroscope, and optical spectrometer capabilities, communicatively coupled to a computing device.

DETAILED DESCRIPTION OF THE INVENTION

Figure 1:
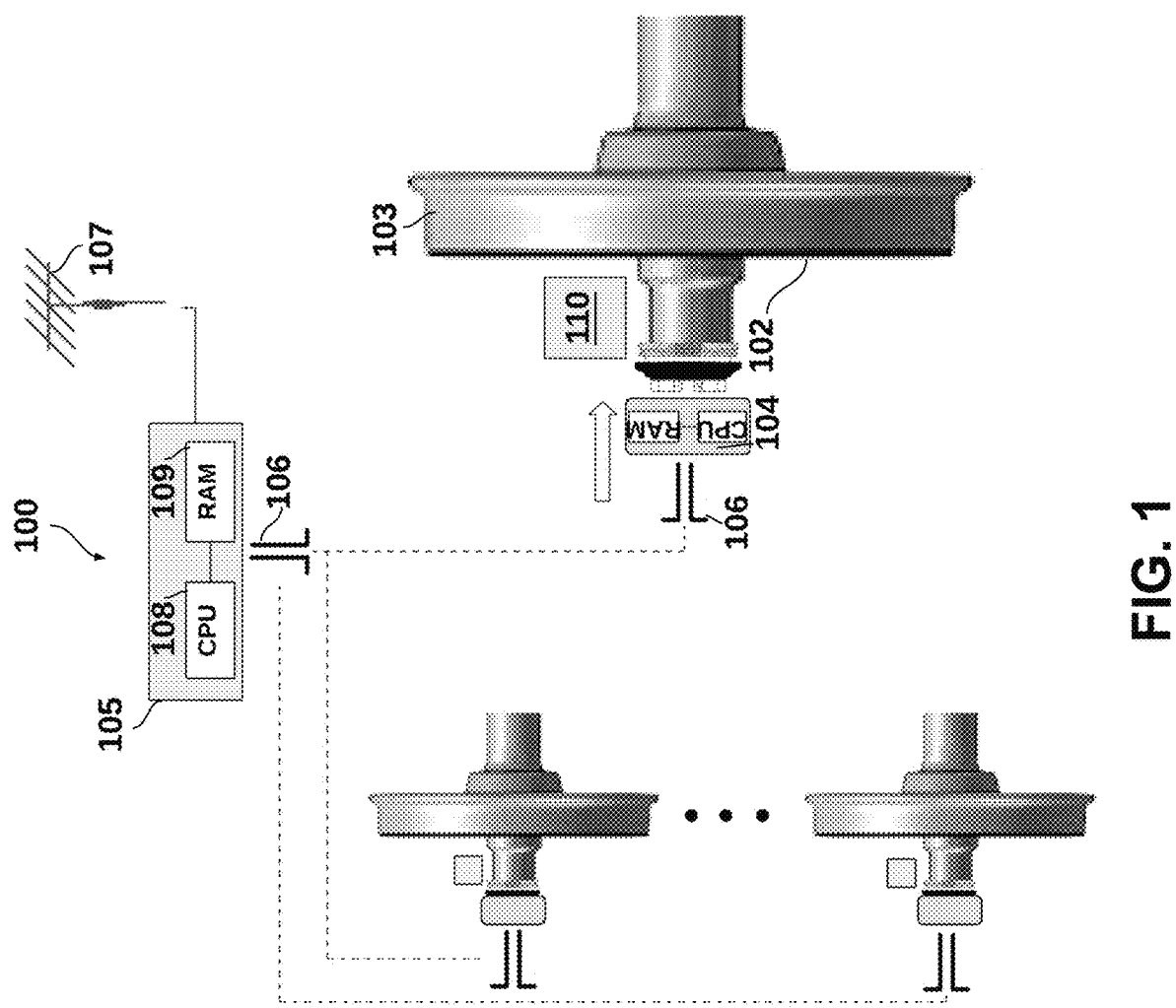
FIG. 1 shows a diagram of the sensor devices of the present invention coupled to multiple wheels and wirelessly communicating with a cloud server.

Following is a list of elements corresponding to a particular element referred to herein:
100 system
102 bearings
103 wheel
104 sensor device
105 computing device
106 wireless transceiver component
107 wireless communication
108 processor
109 memory component
110 bearing adapter
120 end cap assembly
123 screw heads
124 end cap
125 shield
130 thermographic sensing module
134 thermal sensors
136 thermal imaging array
137 pixel elements
138 focusing optics
200 vibration analysis module
203 accelerometer
300 rate gyrometer assembly
302 platform
303 rate gyrometer
400 optical spectrometer assembly
403 light source
404 spectral source
405 lubricant
410 optical spectrometer
500 circuit assembly
503 thermal sensor
504 rate gyrometer
505 spectrometer
506 accelerometer
507 processing unit
508 power supply
510 sensor device
600 magnetic power unit
603 voltage output
604 regulator
605 filter
606 rectifier 607 stator component
608 rotor component
701 electromechanical assembly
702 wheel bearing
703 printed circuit board
704 rotor
705 stator
706 counterweight
708 wheel
709 retainer ring
710 bearing assembly
711 tabbed disk
900 two-piece stator rotor assembly
903 stator component
904 rotor component
905 direct current (DC) output
906 regulator
907 filter
908 rectifier
910 two-piece stator-rotor assembly
913 rotor magnetics assembly
914 stator
915 DC power output
916 regulator
917 filter
918 rectifier
1002 outer sleeve
1003 sectioned element
1004 metal retainer
1005 bolts
1101 bolts
1102 lugs
1103 bearing end cap
1104 bearings
1105 preload spring feature
1106 tabbed disk
1107 annular carrier
1108 sensor device
1110 inner radius of sensor electronics housing/carrier
1111 lug engagement of bearing end cap edge
1201 housing top view
1202 sensor
1203 slots
1204 stator support structure
1205 sensor electronics printed circuit board
1206 carrier disk
1207 stator support
1208 counterweight
1209 bearing structure
1210 rotor
1211 tabbed disk assembly
1302 lugs
1310 bearing assembly
1401 fasteners
1402 tabbed disk assembly
1403 bearing end cap
1404 bearing housing
1405 carrier ring with bent fastener tabs
1406 c-channel structure
1407 sensor device housing
1408 interior standoff fasteners
1409 faux bolt circle
1410 device housing
1411 lateral fasteners The term "temperature map" is defined herein as a visualization of a temperature profile of a particular environment.

The term "Fourier transform" is defined herein as a function derived from a given function and representing it by a series of sinusoidal functions.

Referring now to FIGS. 1-6, the present invention features a system (100) configured to measure properties of one or more bearings (102) of one or more wheels mechanically coupled to a railcar with a bearing adapter (110). In some embodiments, the system (100) may comprise one or more sensor devices, each sensor device (104) disposed on a wheel (103) of the one or more wheels. Each sensor device (104) may comprise one or more thermal sensors (134), configured to continuously measure a temperature of the one or more bearings (102) and generate a continuous temperature data stream. Each sensor device (104) may further comprise a magnetic power unit (600) operatively coupled to the one or more thermal sensors (134), configured to convert a rotation of the wheel (103) into energy and power the sensor device (104) with the energy without a battery. The system (100) may further comprise a gateway computing device (105) communicatively coupled to the one or more sensor devices, comprising a processor (108) configured to execute computer-readable instructions and a memory component (109) comprising computer-readable instructions. The computer-readable instructions may comprise accepting, for each sensor device (104), the continuous temperature data stream from the one or more thermal sensors (134), generating a temperature map of the one or more bearings (102) based on the one or more continuous temperature data streams, measuring a heat value of one or more regions of the temperature map against a heat threshold, and identifying, if the heat value of a region of the one or more regions exceeds the heat threshold, a hot spot indicative of one or more anomalies of the one or more bearings (102).

The present invention features a self-powered sensor device (104) configured to measure properties of one or more bearings (102) of one or more wheels. In some embodiments, the system (100) may comprise one or more sensor devices, each sensor device (104) disposed on a wheel (103) of the one or more wheels. Each sensor device (104) may comprise one or more thermal sensors (134), configured to continuously measure a temperature of the one or more bearings (102) and generate a continuous temperature data stream. The one or more thermal sensors (134) may be disposed optically in-line with the one or more bearings (102) such that the one or more thermal sensors (134) do not contact the one or more bearings (102). Each sensor device (104) may further comprise a magnetic power unit (600) operatively coupled to the one or more thermal sensors (134), configured to convert a rotation of the wheel (103) into energy and power the sensor device (104) with energy without a battery.

The system (100) may further comprise a self-powered sensor device (104) configured to measure the properties of one or more bearings (102) of one or more wheels. In some embodiments, the system (100) may comprise one or more sensor devices, each sensor device (104) disposed on a wheel (103) of the one or more wheels. Each sensor device (104) may comprise a sensor housing. Each sensor device (104) may further comprise one or more thermal sensors (134) disposed within the sensor housing, configured to continuously measure a temperature of the one or more bearings (102) and generate a continuous temperature data stream. Each sensor device (104) may further comprise a magnetic power unit (600) disposed within the sensor housing, operatively coupled to the one or more thermal sensors (134), configured to convert a rotation of the wheel (103)

into energy and power the sensor device (104) with energy without a battery. The magnetic power unit (600) may be disposed adjacent to the one or more thermal sensors (134).

In some embodiments, the sensor device may be integrated with power generation in a single structure. In some embodiments, the sensor device may comprise only a portion of the power generation. In other embodiments, the sensor device may be fully separate from the power generation components, e.g., sensing and powering can be shared between bearing (102) and bearing adapter (110) structures. In some embodiments, the sensor device, power generation components, and means of attaching these components to a wheel bearing may comprise a single integrated object. In other embodiments, the sensor device, power generation components, and means of attaching these components to a wheel bearing may comprise more than one integrated object, such that more than one item must be secured or attached to a wheel bearing or other rotary object.

In embodiments having a wheel bearing structure similar to or the same as that used in railcar transportation, sensor, and power generation components may be attached in several ways, including but not limited to a) radial compressive attachment to the bearing housing, axle end cap, bearing adapter, axle end cap screws; b) tensile attachment to the axle end cap screws by means of an expansion mechanism or a spring-loaded, e.g., clock spring or other spring capable of generating radial clamping force; c) tensile or compressive attachment using axial force to attach to the bearing structure, e.g., setting up a force between the end cap seal boundary and the end cap face where cap screws affix the locking plate; d) using fastener friction, e.g., via jack screws exerting radial force or axial force to secure a sleeve or plate to the bearing housing or end cap, respectively; e) using adhesives to attach components to the bearing structure.

Figure 2:
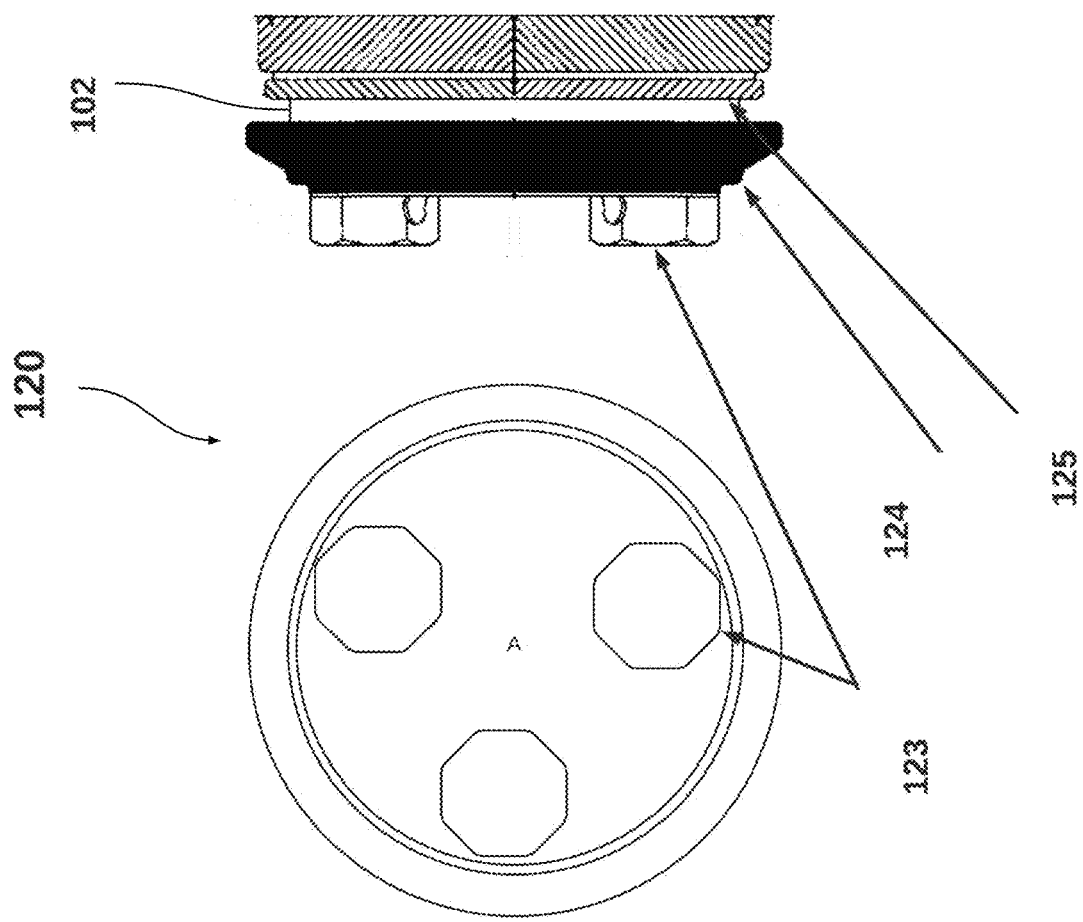
FIG. 2 shows a diagram of a bearing end cap assembly comprising the sensing modalities of the present invention.

Referring now to FIG. 2, in some embodiments, compressive elements may be placed inside the axial force elements, e.g., cap screws, to exert an outward radial force on the screw heads (123) to secure the sensor device in place against the bearings (102). In some embodiments, tensile clamping elements may be placed outside the cap screws to exert an inward radial force on the screw heads (123) to secure the sensor device in place against the bearings (102). In some embodiments, features may be incorporated into the cap screw locking shield (125) to provide hard mount points. These features may comprise threads, openings for wedge elements, attachment points, hooks, brackets, or a combination thereof. In some embodiments, a cup-like sleeve may be configured to slide over the axle end cap to secure the sensor device to the one or more bearings (102). In some embodiments, the sleeve may be affixed by an adhesive to the axle end cap. In some embodiments, the sleeve may be affixed to the axle end cap by a thermal-expansion-driven slip-fit force. In some embodiments, the sleeve may be affixed to the axle end cap by a combination of the adhesive and the thermal-expansion-driven slip-fit force.

In some embodiments, a cup-like sleeve with clipping features may produce clamping force between the axle end cap face and the axle end cap seal boundary. In some embodiments, the sleeve may be affixed to the axle end cap by a preload in the radial direction such that the clips spring into the seal boundary. In some embodiments, axial excess from this process may be resolved using axial fasteners or jack screws. In some embodiments, the sleeve may be affixed to the axle end cap by a preload in the radial and axial direction such that a hammer can be used to tap the assembly into place and no further fastening is required. In some embodiments, in this process, the axial excess may be resolved with a circumferential spring force, e.g., using a Belleville washer type of structure.

In some embodiments, a pair of C Channel components may produce a clamping force radially along the circumference of the axle end cap and between the axle end cap and the axle end cap seal boundary to seal the sensor device against the bearings (102). In some embodiments, the C Channel components may produce the clamping force through a spring preload in the axial direction and/or radial direction that resolves excess motion in axial and/or radial directions, respectively. In some embodiments, a tap-n-slap ratchet mechanism that is part of a cup that slips over the axle end cap and uses tabs/clips to produce a clamping force between the axle end cap and the end cap seal boundary and seal the sensor device to the bearings (102). In some embodiments, clips may be placed onto the axle end cap such that a sleeve with clip openings can be tapped onto the clips all axial excess is resolved and the sensor device is sealed to the bearings (102). In some embodiments, a circular structure may be placed within the end cap (124) bolt circle formed by the end cap screw heads (123) having a shape that constrains it to rotate with the bearing end cap assembly (120) while the wheel (103) is rotating and having one or more features extending axially toward the sensor device (104) such that mating structures internal to the sensor device (104) couple mechanically and support the rotation of the sensor device with the bearing end cap (124), the pair of mating structures functioning like a socket wrench and bolt combination.

In some embodiments, the magnetic power unit (600) may comprise a rotor component (608) comprising a first magnet system, configured to rotate with a motion of the wheel (103). The magnetic power unit (600) may further comprise a stator component (607) comprising a second magnet system, disposed adjacent to the rotor component (608). The first magnet system may be configured to pass the second magnet system with rotation of the wheel (103) such that the first magnet system interacts with the second magnet system and the energy is generated. In some embodiments, the magnetic power unit (600) may comprise one or more windings, e.g., tens to hundreds, so as to scale the current and voltage properties according to the application and the intended rotary velocity of the moving magnet system. In some embodiments, the first magnet system may comprise a plurality of magnets, often attached to a ferrous ring or carrier such that a magnetic flux loop can be produced by virtue of the magnetism of each magnet and the flux path it shares with the ferrous ring, there being more than one magnet per ring and commonly tens of magnets per ring. In some embodiments, the second magnet system may comprise a plurality of coils, e.g., more than one and often tens of coils, e.g., wire wound on a bobbin, each having a plurality of windings. In some embodiments, the magnetic power unit (600) may be configured to generate diverse voltages, e.g., 3 to 100 volts, having the capacity to rectify by a rectifier (606), filter by a filter (605) and regulate by a regulator (604) a direct current (DC) voltage output (603), when the alternating current produced at the stator (607), e.g., often having multiple phases, is not sufficient for the power generation needs of the sensor device (104) or system (100).

Figure 11:
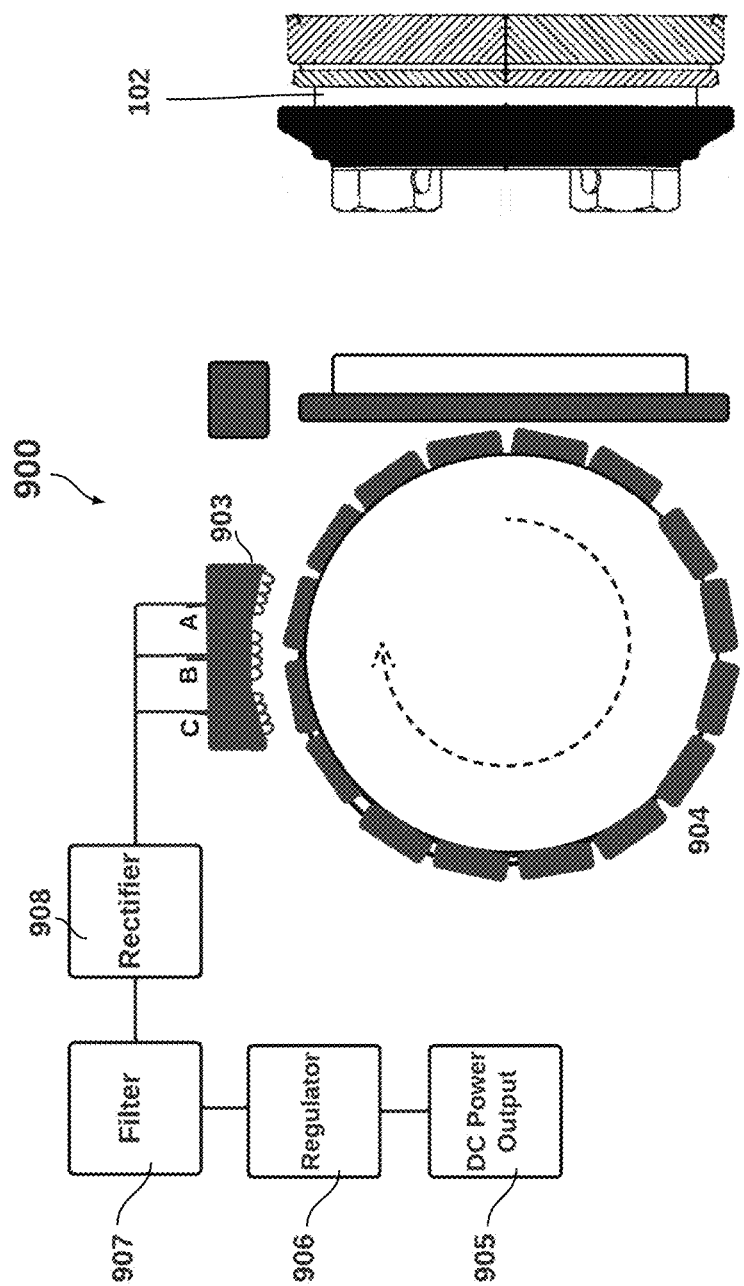
FIG. 11 shows a diagram of a two-piece rotor and stator powering system comprising a stator external to the sensor housing.

In some embodiments, the stator component (903) may be disposed external to a housing of the sensor device (104) (see FIG. 11). In some embodiments, the stator component (607) may be disposed within the same housing as the rotor component (608). In this embodiment, the stator component (607) may comprise an asymmetric mass such that while the rotor component (608) rotates freely with the wheel (103), the stator component (607) stays stable such that the first magnet system passes the second magnet system with each rotation of the wheel (103) such that the first magnet system interacts with the second magnet system and the energy is generated.

Figure 12:
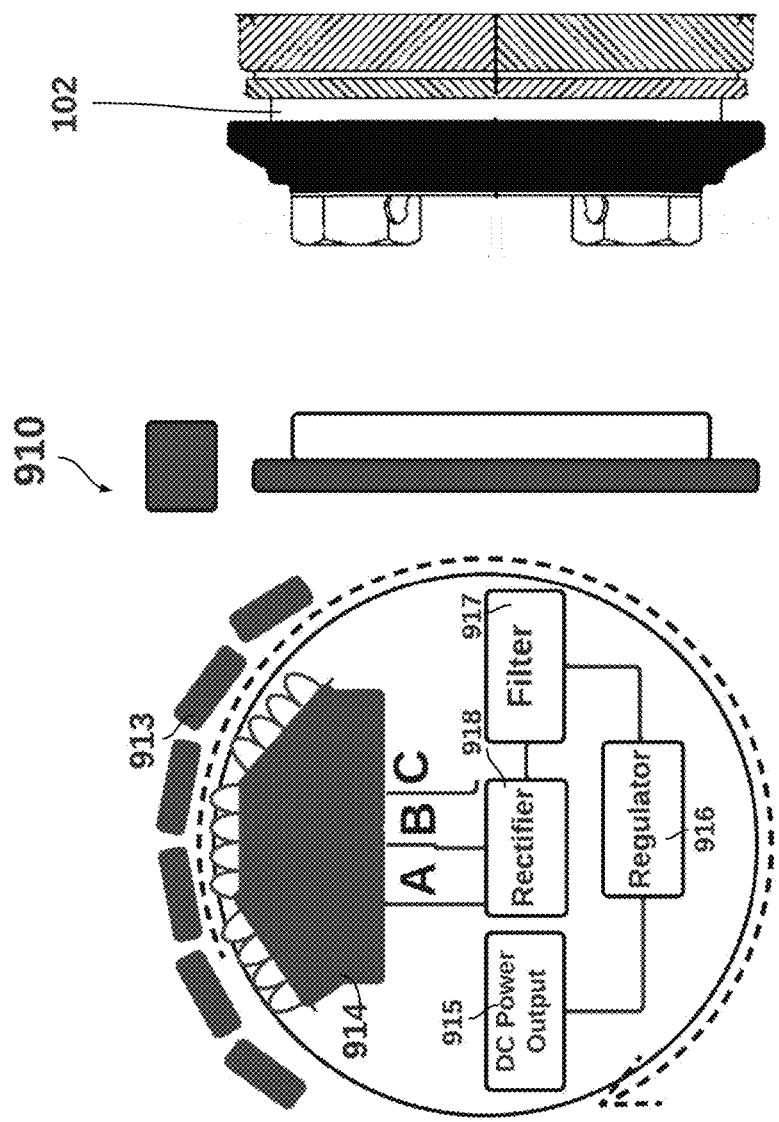
FIG. 12 shows a diagram of an alternate embodiment of the two-piece rotor-stator assembly of the present invention.

As seen in FIG. 12, in some embodiments, the stator component (903) and the rotor component (904) may be interchanged such that their nominal roles, e.g., the stator being rotationally static such that the stator-rotor combination is described as "moving stator". In some embodiments, the rotor may comprise one or more wire-wound coils. In some embodiments, the rotor may comprise a magnet ring. In some embodiments, the stator may comprise one or more wire-wound coils. In some embodiments, the stator may comprise a magnet ring. In some embodiments, the location of the magnet system having coils may be located near the electronics requiring power that is generated by the magnet systems as movement occurs. In some embodiments, the stator (914) may be coupled to a rectifier (918), a filter (917), a regulator (916), and a direct current (DC) power output (915).

In some embodiments, the present invention features a magnetic power unit (600) configured to couple to a rotating component and convert a rotation of the rotating component into energy. In some embodiments, the magnetic power unit (600) may comprise a rotor component (608), comprising a first magnet system, coupled to the rotating component such that the rotor component (608) rotates with a motion of the rotating component. In some embodiments, the magnetic power unit (600) may further comprise a stator component (607) comprising a second magnet system and an asymmetric counterweight, disposed adjacent to the rotor component (608), coupled to the rotating component, wherein the asymmetric counterweight is configured to offset an effect of the rotation of the rotating component on the stator component (607) such that the stator component (607) maintains rotational staticity. The first magnet system may be configured to pass the second magnet system with each rotation of the rotating component such that the first magnet system interacts with the second magnet system and the energy is generated.

In some embodiments, a ferrous material used magnetically, e.g., conveying magnetic flux by virtue of its low magnetic reluctance, and structurally supporting the magnets of the rotor can be part of the rotating structure itself, e.g., the shaft of a motor or generator assembly. This is advantageous for purposes of integration that minimize the size and/or cost of resultant magnetic systems.

While the present disclosure addresses applications in the domain of railroad safety and efficiency, those skilled in the art will readily observe the application of the invention to diverse fields of application in which sensing is added to moving components that derive their sensory energy from the motion, e.g., a vibration sensing accelerometer sensor (203) powered by the rotation of the moving motor shaft of a motor assembly for which vibration observation is of interest.

In some embodiments, each sensor device (104) may comprise a wireless transceiver component (106), e.g., often integrated with the computing component (108), configured to communicatively couple the sensor device (104) to the computing device (105). The computing device (105) may comprise a gateway server communicatively coupled to the one or more sensor devices. In some embodiments, the computing device (105) may be integral to the sensor device (104) such that a sensor device (104) comprises a complete powered system having local and wide area networking capacities. In some embodiments, a sensor device (104) having integral computing device (105) capacities may have an integral capacity to wirelessly communicate (107) with a larger network, e.g., a wide area network. In some embodiments, the gateway server may comprise a cloud computing system configured to wirelessly communicate with the one or more sensor devices. In some embodiments, the gateway server may comprise an edge computing system configured to wirelessly communicate with the one or more sensor devices and transmit the data from the one or more sensor devices to an external network, e.g., cloud computing device for processing the data.

In some embodiments, each sensor device (104) may comprise a wireless transceiver component (106) configured to communicatively couple the sensor device (104) to an external network without the use of a gateway server, including instances when each sensor device (104) is capable of being a component of a mesh network in which one sensor device (104) is delegated the responsibility to transmit data to an external network, such that one or more sensor device (104) comprises an ensemble comprising a sensing system.

In some embodiments, each sensor device (104) of the one or more sensor devices may further comprise an accelerometer (203) operatively coupled to the magnetic power unit (600). The accelerometer (203) may be configured to continuously measure a vibration signal of the wheel (103) and generate a continuous vibration data stream. In some embodiments, the memory component (109) may further comprise computer-readable instructions for accepting, for each sensor device (104), the continuous vibration data stream from the accelerometer (203), identifying one or more vibrational patterns in the one or more continuous vibration data streams and determining whether the one or more vibrational patterns are indicative of the one or more anomalies of the one or more bearings (102). In some embodiments, identifying one or more vibrational patterns in the one or more continuous vibration data streams comprises isolating, e.g., by a Fourier transform applied to the one or more continuous vibration data streams, the one or more vibrational patterns. In some embodiments, the accelerometer (203) may comprise a three-axis accelerometer.

In some embodiments, the vibration signal measured by each accelerometer (203) may be interpreted in terms of the weight of the vehicle supported by the wheel (103). In some embodiments, the one or more continuous vibration data streams may be used to measure bearing stability. In some embodiments, the one or more continuous vibration data streams may be used to measure an impact on the shape of the wheel (103). In some embodiments, the one or more continuous vibration data streams may be used to measure the health of the vehicle. In some embodiments, the one or more continuous vibration data streams may be used to measure health of the rail or its underlying support structures.

In some embodiments, each sensor device (104) of the one or more sensor devices may further comprise a sensor component circuit assembly (500) having a plurality of sensors (510) communicatively coupled with a processing unit (507) one or more operational condition sensors operatively coupled to the magnetic power unit (600), configured to detect one or more operational conditions of the wheel (103) and a surrounding environment of the wheel (103). In some embodiments, the one or more operational conditions of the wheel (103) may comprise environmental temperature, humidity, weather, wind, prior damage, road conditions, rail conditions, or a combination thereof. In some embodiments, the one or more operational condition sensors may comprise one or more thermal sensors, one or more moisture sensors, one or more pressure sensors, one or more cameras, or a combination thereof. In some embodiments, the memory component (109) may further comprise computer-readable instructions for accepting the one or more operational conditions from the one or more operational condition sensors and filtering the one or more continuous vibration data streams based on the one or more operational conditions.

In some embodiments, the accelerometer (203) may be further configured to periodically calibrate vibration signal measurement. Calibration may comprise one or more techniques individually or in combination, including 1) remote calibration techniques having a software-based calibration based on device firmware or software capabilities, such as using known properties of the context, e.g., a railroad system, having known or predetermined motion and/or reference data sources that can be used; a remote calibration can also make use of a reference vibration source or situation that the sensors traverse having known properties, the location of the device being used in such a case to identify the location state for a source of calibration data; 2) the use of existing data based on pre-installation measurements, historical data from the device or other such devices, or through the use of known motion patterns as a function of speed or location that are well understood and help to constrain calibration solutions; 3) external sensors or systems that can be used to inject reference signals into the vibration context such that a known-good measurement can be obtained and used as a baseline, or using a temporary device on a vehicle or railway/roadway to accomplish signal injection; 4) remote adjustment procedures that are algorithm driven, physics based so as to use the data itself to detect drift and other anomalies over the course of time, using remote firmware updates and model updates to enable solution convergence without physically visiting and touching the installed device; 5) simulation and modeling that can be used to leverage or augment a physical model of the system being observe, including predictive modeling of behaviors and, as possible, situations; 6) continuous monitoring in epochs of long and short duration that enable more intense measurement periods that would otherwise be permitted in an operational system-varying the measurement timing and frequency of occurence, even the data rate, so as to produce more phenomena to observe and assess, in the spirit of using situation variations as new equations that can be solved for new variables . . .

In some embodiments, each sensor device (104) of the one or more sensor devices may further comprise a rate gyrometer assembly (300) operatively coupled to the magnetic power unit (600). Each rate gyrometer (303, 504) may be configured to continuously measure a rotational speed and a rotational phase of the wheel (103) and generate a continuous rotational data stream. In some embodiments, the memory component (109) may further comprise computer-readable instructions for accepting, for each sensor device (104), the continuous rotational data stream from the rate gyrometer (303), and determining whether the rotational speed, the rotational phase, or a combination thereof are indicative of the one or more anomalies of the one or more bearings (102).

In some embodiments, each sensor device (104) of the one or more sensor devices may further comprise a wheel angular rate sensing device by virtue of the frequency of the generated power waveform produced by the stator, either by using magnetic sensors, e.g., hall sensors that are customary in rotor-stator arrangements, or by analyzing the frequency content of the stator waveform prior to rectification, the process of power generation typically following the sequence of generation, rectification and regulation, for applications requiring direct current electrical energy for use by sensor and computer circuit elements.

In some embodiments, the memory component (109) may further comprise computer-readable instructions for adjusting the heat threshold based on the rotational speed. In some embodiments, the memory component (109) may further comprise computer-readable instructions for integrating the one or more continuous vibration data streams with the one or more continuous rotational data streams to generate a vibration-rotation data stream and detecting, based on the vibration-rotation data stream, one or more anomalies of the one or more bearings (102). In some embodiments, determining whether the rotational speed, the rotational phase, or a combination thereof are indicative of the one or more anomalies of the one or more bearings (102) may comprise detecting one or more changes in the rotational speed over time. In some embodiments, determining whether the rotational speed, the rotational phase, or a combination thereof are indicative of the one or more anomalies of the one or more bearings (102) may comprise determining whether or not all wheels are rotating at the same rate.

In some embodiments, each sensor device (104) of the one or more sensor devices may further comprise an optical spectrometer assembly (400) having a spectrometer comprising a light source (403) and spectral array (404) operatively coupled to the magnetic power unit (600), configured to continuously measure spectral data of the one or more bearings (102) and generate a continuous spectral data stream. The one or more bearings (102) may comprise one or more lubricants. In some embodiments, the memory component (109) may further comprise computer-readable instructions for accepting, for each sensor device (104), the continuous spectral data stream from the optical spectrometer (400), identifying, based on the one or more continuous spectral data streams, an amount of lubricant, one or more lubricant types, one or more lubricant states, or a combination thereof, identifying, based on the amount of lubricant, the one or more lubricant types, the one or more lubricant states, or the combination thereof, a potential lubricant shortage, and adjusting, based on the amount of lubricant, the one or more lubricant types, the one or more lubricant states, or the combination thereof, the heat threshold. In some embodiments, the optical spectrometer assembly (400) may comprise one or more red-green-blue (RGB) sensors. In some embodiments, identifying, based on the one or more continuous spectral data streams, an amount of lubricant, one or more lubricant types, one or more lubricant states, or a combination thereof may comprise identifying a type of hydrocarbon present, a quantity of lubricant present, the presence of water in the lubricant, or a combination thereof.

In some embodiments, identifying, based on the amount of lubricant, the one or more lubricant types, the one or more lubricant states, or the combination thereof, a potential lubricant shortage may comprise identifying one or more lubricant degradation products. In some embodiments, the optical spectrometer (410) may comprise one or more light sources, each light source comprising a light intensity value. Each light source of the one or more light sources may be configured to detect an ambient light value of a surrounding environment and adjust the light intensity value based on the ambient light value. In some embodiments, the one or more light sources may comprise one or more narrowband light sources, one or more broadband light sources, or a combination thereof.

In some embodiments, the memory component (109) may further comprise a machine learning model configured to accept the one or more continuous thermal data streams as input and generate a bearing lifespan prediction as output. The machine learning model may be trained by sets of prior thermal data indicative of normal bearing health and poor bearing health. In some embodiments, the machine learning model may be further configured to accept the one or more continuous vibration data streams as input and generate the bearing lifespan prediction as output. The machine learning model may be further trained by sets of prior vibration data indicative of normal bearing health and poor bearing health. In some embodiments, the machine learning model may be further configured to accept the one or more continuous rotational data streams as input and generate the bearing lifespan prediction as output. The machine learning model may be further trained by sets of prior rotational data indicative of normal bearing health and poor bearing health. In some embodiments, the machine learning model may be further configured to accept the one or more continuous spectral data streams as input and generate the bearing lifespan prediction as output. The machine learning model may be further trained by sets of prior spectral data indicative of normal bearing health and poor bearing health. The machine learning model may be further configured to accept the one or more operational conditions as input and generate the bearing lifespan prediction as output. The machine learning model may be further trained by sets of prior operational condition data indicative of normal bearing health and poor bearing health. In some embodiments, filtering the one or more continuous vibration data streams based on the one or more operational conditions may implement the machine learning model. In some embodiments, the bearing lifespan prediction may comprise a prediction of bearing failure within multiple time spans, e.g., imminently or within days, weeks or months.

In some embodiments, the one or more thermal sensors (134) may further comprise one or more thermal cameras, one or more infrared sensors, or a combination thereof. In some embodiments, the memory component (109) may further comprise computer-readable instructions for alerting a user upon detecting the one or more anomalies. In some embodiments, the computing device (105) may further comprise a display component operatively coupled to the processor (108), configured to display the alert to the user.

Figure 19:
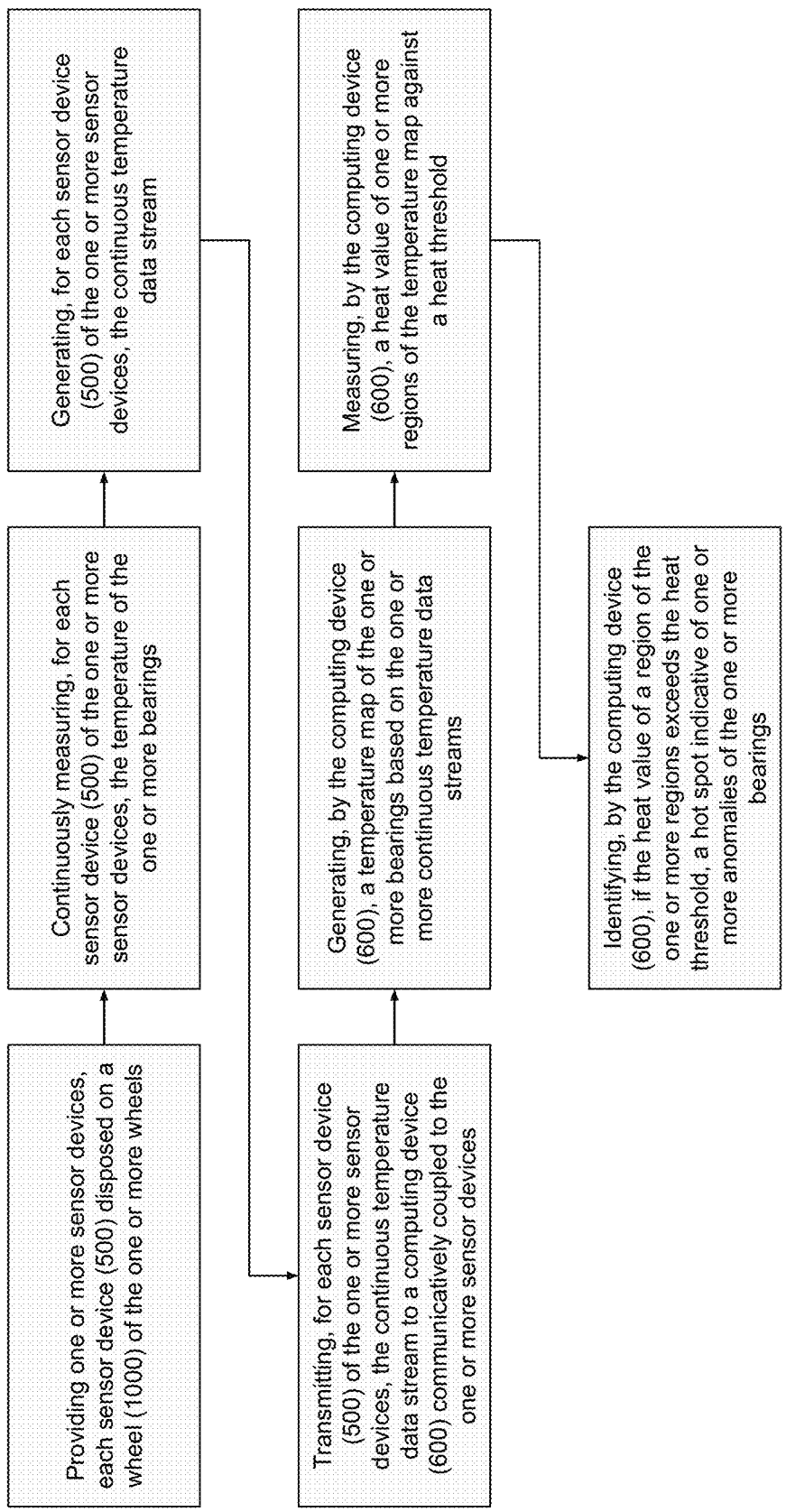
FIG. 19 shows a flow chart of an embodiment of a method for measuring properties of one or more bearings of one or more wheels.

Referring now to FIG. 19, the present invention features a method for measuring properties of one or more bearings (102) of one or more wheels. In some embodiments, the method may comprise providing one or more sensor devices, each sensor device (104) disposed on a wheel (103) of the one or more wheels. Each sensor device (104) may comprise one or more thermal sensors (134), configured to continuously measure a temperature of the one or more bearings (102) and generate a continuous temperature data stream. Each sensor device (104) may further comprise a magnetic power unit (600) operatively coupled to the one or more thermal sensors (134), configured to convert a rotation of the wheel (103) into energy and power the sensor device (104) with the energy without a battery.

The method may further comprise continuously measuring, for each sensor device (104) of the one or more sensor devices, the temperature of the one or more bearings (102), and generating, for each sensor device (104) of the one or more sensor devices, the continuous temperature data stream. The method may further comprise transmitting, for each sensor device (104) of the one or more sensor devices, the continuous temperature data stream to a computing device (105) communicatively coupled to the one or more sensor devices. The method may further comprise generating, by the computing device (105), a temperature map of the one or more bearings (102) based on the one or more continuous temperature data streams, measuring, by the computing device (105), a heat value of one or more regions of the temperature map against a heat threshold, and identifying, by the computing device (105), if the heat value of a region of the one or more regions exceeds the heat threshold, a hot spot indicative of one or more anomalies of the one or more bearings (102).

In some embodiments, the data collected by the sensing modalities of the sensor systems of the present invention (e.g. thermal, vibrational, rotational, optical, environmental, etc.) may be wirelessly transmitted to a cloud computing system. In some embodiments, the data may be wirelessly transmitted over a long range (LoRa) wireless connection, a wide area network (WAN) connection, a cellular connection, a low-power WAN connection, or any other form of long-range wireless communication. In some embodiments, this data may be used as training data for an artificial intelligence model configured to accept the data as input and predict various factors (e.g. wheel health, road health, bridge health, etc.) as output. In some embodiments, the data may be transmitted and/or sold to a third party company for use in analytics and marketing.

In some embodiments, each sensor device (104) of the one or more sensor devices further comprises an accelerometer (203) operatively coupled to the magnetic power unit (600). The method may further comprise continuously measuring, for each sensor device (104) of the one or more sensor devices, a vibration signal of the wheel (103), generating, for each sensor device (104) of the one or more sensor devices, a continuous vibration data stream based on the vibration signal. The method may further comprise transmitting, for each sensor device (104) of the one or more sensor devices, the continuous vibration data stream to the computing device (105), identifying, by the computing device (105), one or more vibrational patterns in the one or more continuous vibration data streams, and determining, by the computing device (105), whether the one or more vibrational patterns are indicative of the one or more anomalies of the one or more bearings (102). In some embodiments, identifying the one or more vibrational patterns in the one or more continuous vibration data streams comprises isolating, by a Fourier transform applied to the one or more continuous vibration data streams, the one or more vibrational patterns. In some embodiments, the accelerometer (203) may comprise a three-axis accelerometer.

In some embodiments, the sensor device (104) may further comprise an acoustic modality configured to further measure a vibration signal of the wheel. The acoustic modality may comprise one or more acoustic sensors configured to acoustically measure the acoustic emissions of a wheel, truck or car (the context of the device making the measurement) often driven by the vibration signal of the wheel (103) or other system elements, to generate a continuous stream of vibration data, and transmit the continuous stream of vibration data to the computing device (105). The continuous stream of vibration data gathered by the acoustic modality may be processed the same as the continuous stream of vibration data gathered by the accelerometer (203). In some embodiments, the one or more acoustic sensors may comprise one or more micro-electromechanical system (MEMS) microphones.

In some embodiments, each sensor device (104) of the one or more sensor devices may further comprise an acoustic transducer operatively coupled to the magnetic power unit (600), configured to continuously measure an acoustic signal of the wheel (103), a surrounding environment of the wheel (103), or a combination thereof, and generate a continuous acoustic data stream. The memory component (109) may further comprise computer-readable instructions for accepting, for each sensor device (104) of the one or more sensor devices, the continuous acoustic data stream from the acoustic transducer. The computer-readable instructions may further comprise identifying one or more acoustic patterns in the one or more continuous acoustic data streams, and determining whether the one or more acoustic patterns are indicative of the one or more anomalies of the one or more bearings (102) or related mechanical apparatuses.

In some embodiments, each sensor device (104) of the one or more sensor devices may further comprise one or more operational condition sensors operatively coupled to the magnetic power unit (600), configured to detect one or more operational conditions of the wheel (103) and a surrounding environment of the wheel (103). In some embodiments, the method may further comprise accepting, by the computing device (105), for each sensor device (104) of the one or more sensor devices, the one or more operational conditions, and filtering, by the computing device (105), the one or more continuous vibration data streams based on the one or more operational conditions. In some embodiments, the method may further comprise periodically calibrating, for each sensor device (104) of the one or more sensor devices, vibration signal measurement of the accelerometer (103).

In some embodiments, each sensor device (104) of the one or more sensor devices may further comprise a rate gyrometer (303) operatively coupled to the magnetic power unit (600). In some embodiments, the method may further comprise continuously measuring, for each sensor device (104) of the one or more sensor devices, a rotational speed and a rotational phase of the wheel (103), and generating, for each sensor device (104) of the one or more sensor devices, a continuous rotational data stream. The method may further comprise transmitting, for each sensor device (104) of the one or more sensor devices, the continuous rotational data stream to the computing device (105), and determining, by the computing device (105), whether the rotational speed, the rotational phase, or a combination thereof are indicative of the one or more anomalies of the one or more bearings (102).

In some embodiments, the method may further comprise adjusting, by the computing device (105), the heat threshold based on the rotational speed. In some embodiments, the method may further comprise integrating, by the computing device (105), the one or more continuous vibration data streams with the one or more continuous rotational data streams to generate a vibration-rotation data stream, and detecting, by the computing device (105), based on the vibration-rotation data stream, one or more anomalies of the one or more bearings (102). In some embodiments, determining whether the rotational speed, the rotational phase, or the combination thereof are indicative of the one or more anomalies of the one or more bearings (102) may comprise detecting one or more changes in the rotational speed over time.

In some embodiments, the one or more bearings (102) may comprise one or more lubricants. Each sensor device (104) of the one or more sensor devices may further comprise an optical spectrometer (400) operatively coupled to the magnetic power unit (600). In some embodiments, the method may further comprise continuously measuring, for each sensor device (104) of the one or more sensor devices, spectral data of the one or more bearings (102), and generating, for each sensor device (104) of the one or more sensor devices, a continuous spectral data stream. The method may further comprise transmitting, for each sensor device (104) of the one or more sensor devices, the continuous spectral data stream to the computing device (105) and identifying, by the computing device (105), based on the one or more continuous spectral data streams, an amount of lubricant, one or more lubricant types, one or more lubricant states, or a combination thereof. The method may further comprise identifying, by the computing device (105), based on the amount of lubricant, the one or more lubricant types, the one or more lubricant states, or the combination thereof, a potential lubricant shortage, and adjusting, by the computing device (105), based on the amount of lubricant, the one or more lubricant types, the one or more lubricant states, or the combination thereof, the heat threshold.

In some embodiments, identifying the potential lubricant shortage may comprise identifying one or more lubricant degradation products. In some embodiments, the optical spectrometer (400) may comprise one or more light sources, each light source comprising a light intensity value. The method may further comprise detecting, by each light source of the one or more light sources, an ambient light value of a surrounding environment, and adjusting, by each light source of the one or more light sources, the light intensity value based on the ambient light value. In some embodiments, the one or more light sources may comprise one or more narrowband light sources, one or more broadband light sources, or a combination thereof.

In some embodiments, the one or more thermal sensors (134) may further comprise one or more thermal cameras, one or more infrared sensors, or a combination thereof. In some embodiments, the method may further comprise alerting a user upon detecting the one or more anomalies.

Figure 3:
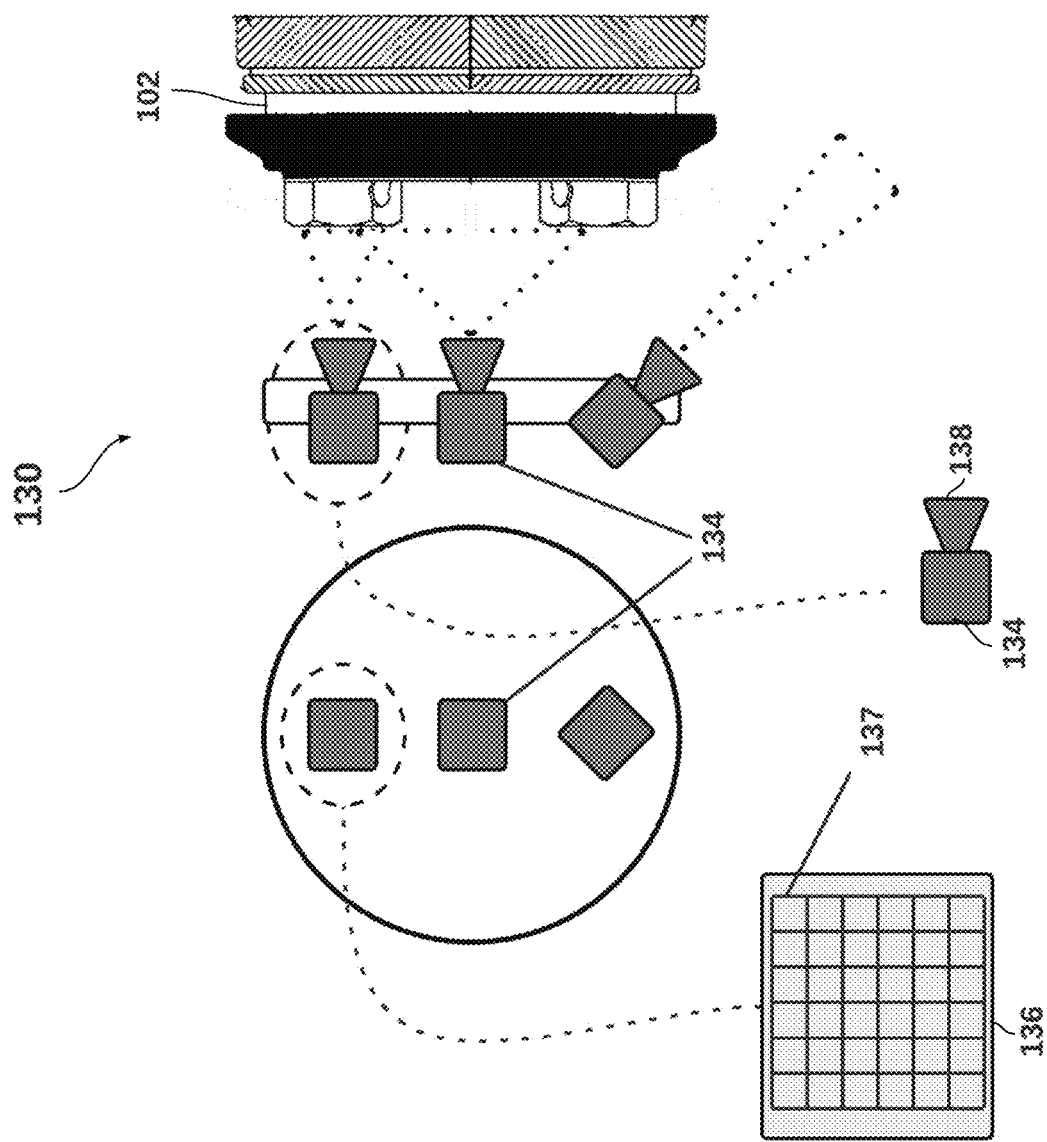
FIG. 3 shows a diagram of the thermal sensing modality of the sensor system of the present invention.
Figure 4:
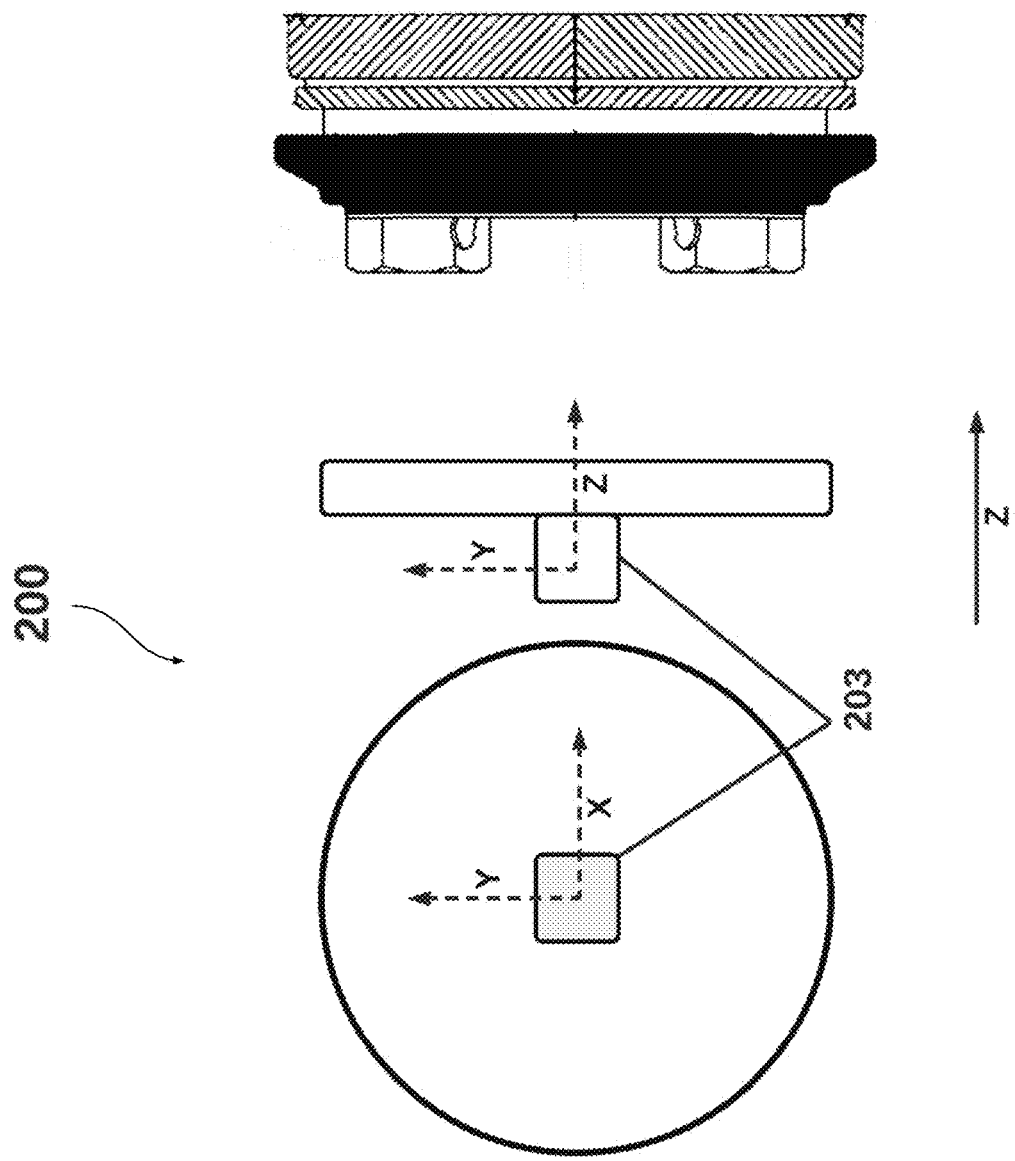
FIG. 4 shows a diagram of the vibrational sensing modality of the sensor system of the present invention.
Figure 6:
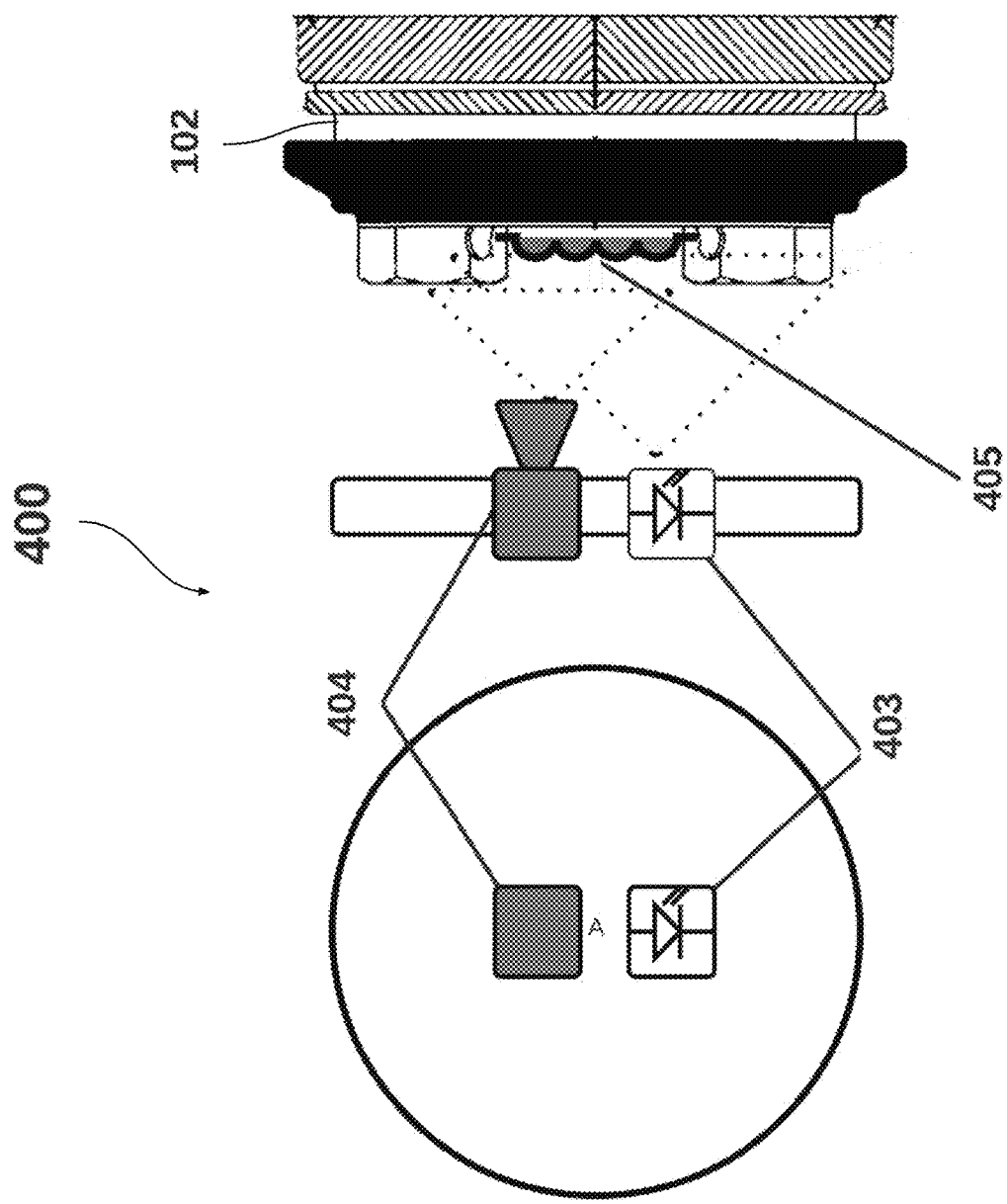
FIG. 6 shows a diagram of the optical spectrometry sensing modality of the sensor system of the present invention.
Figure 7:
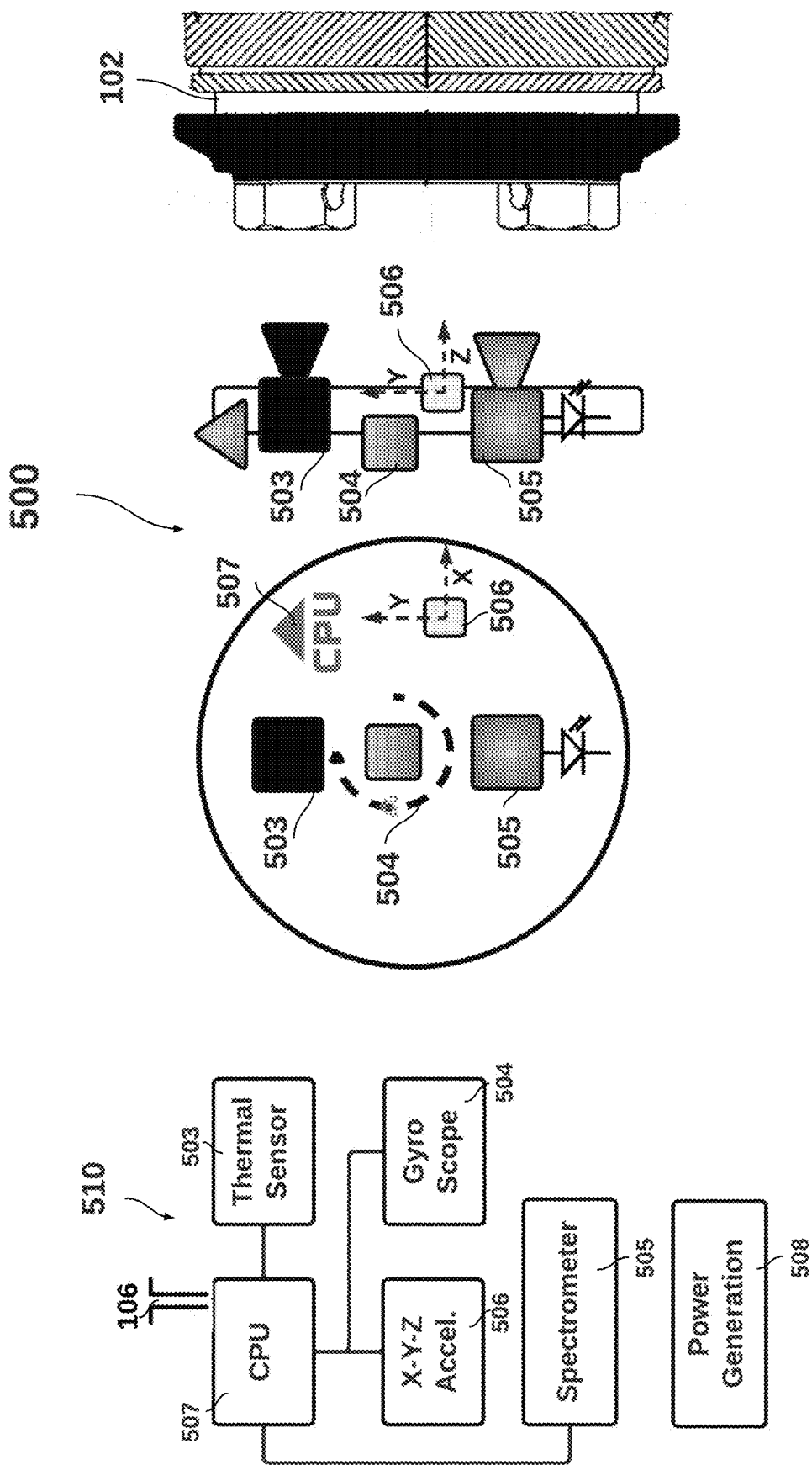
FIG. 7 shows a diagram of the sensor system of the present invention comprising multiple sensing modalities and processing and powering components thereof.

The invention integrates multiple sensing modalities into a comprehensive system for monitoring and predictive maintenance of railcar wheel bearings (102). It is designed to enhance reliability, safety, and operational efficiency in rail transportation. 1) Thermography Modality: Utilizes infrared sensors to create a temperature map of the wheel bearing, identifying hot spots indicative of potential issues. FIG. 3 illustrates the arrangement of infrared sensors and FIG. 7 relates to its data processing unit (507). 2) Vibration Analysis Modality: Employs a three-axis accelerometer (203) to detect vibrational patterns that signal wear or failure. FIG. 4 shows the accelerometer's placement and FIG. 7 relates its connection to the signal processing unit (507). 3) Rotational Velocity Measurement Modality: Incorporates a rate gyro to measure the wheel's rotational speed and phase, which is essential for assessing bearing health. FIG. 4 depicts the rate gyro, and its mounting, and FIG. 7 relates its data analysis unit. 4) Optical Spectrometry Modality: Uses an optical spectrometer to analyze lubricant condition on the bearing surface, differentiating between types and states of lubricants. FIG. 6 details the spectrometer sensor, light source, and FIG. 7 relates its analysis processor. Each modality contributes uniquely to the system's overall capability, offering a multidimensional approach to bearing maintenance and monitoring. It is understood that processing capacities can be located solely in the computing device (105) or distributed variously within the sensor device (104, 510) or within each sensing component.

Figure 8:
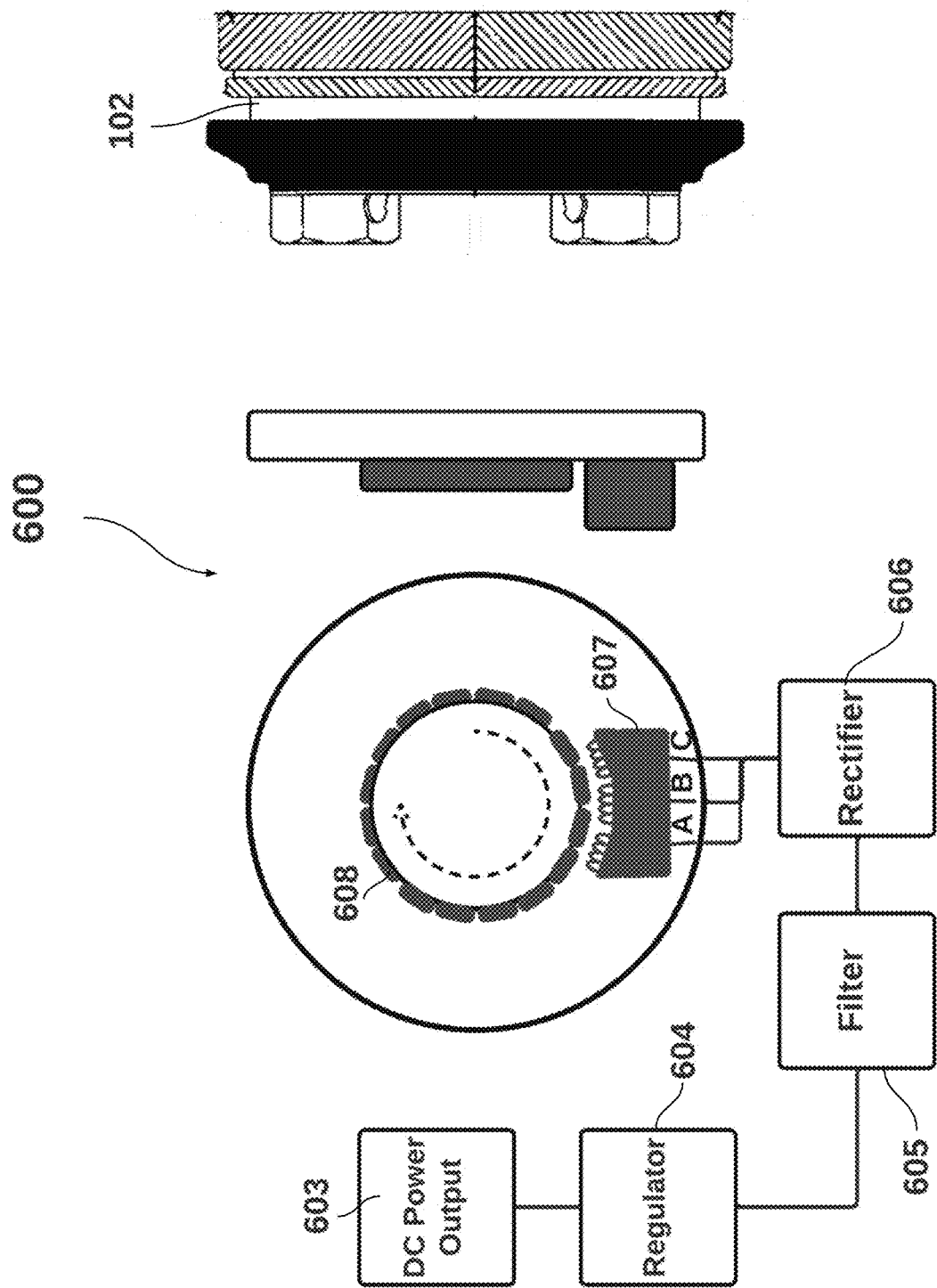
FIG. 8 shows a diagram of an embodiment of the magnetic powering system of the sensor system of the present invention.

Referring now to the invention in more detail, in FIG. 8, recognizing that each sensor device (104) comprises one or more electronic assemblies, there is shown a sensor electronics assembly (500) with integrated thermal imaging elements, vibration sensors, rotational speed sensors, and spectroscopic components and power generation. Further details on the sensor device (500) reveal its ability to generate power from the wheel's rotation, utilizing magnetic windings to form a self-sustained energy source for the IoT measurements. In some embodiments, the sensor electronics assembly (500) of the present invention may be self-powered without the use of batteries through use of a self-powering mechanism. In some embodiments, the self-powering mechanism may comprise a rotor component disposed within the sensor electronics assembly (500), comprising a first magnet system, configured to rotate with the rotation of the wheel. The self-powering mechanism may further comprise a stator component disposed adjacent to the sensor electronics assembly (500), comprising a second magnet system. The first magnet system may be configured to repeatedly pass by the second magnet system as the rotor rotates such that electricity to power the sensor device is generated. In some embodiments, the self-powering mechanism may be configured to electrically power the sensor electronics assembly (500) of the present invention without the need for external power sources, power storage, wires, or a combination thereof.

In some embodiments, the stator may comprise additional functionalities. In some embodiments, the stator may be configured to act as a power takeoff point for the vehicle. For example, the stator (903) may be configured to supply power to a computing device (105) communicatively coupled to the sensor electronics assembly (500). The stator may be configured to power other devices and systems onboard or coupled to the vehicle (i.e. battery, temperature management, onboard communications, etc.). In some embodiments, the stator may comprise additional sensors powered, in some embodiments, with a rectifier (908), a filter (907), a regulator (906), and DC output (905) facilities for measuring one or more properties. In some embodiments, the one or more additional sensors may comprise thermal sensors, vibration sensors, rotation sensors, optical sensors, velocity sensors, or a combination thereof. In some embodiments, the one or more additional sensors may comprise any of the sensors described herein.

In some embodiments, the single piece sensor device may be integrated into a mechanism that couples to the bearing adapter between the bearing housing and the side arm, or it may attach to the side arm structures or other nearby structures that support its operation. In this embodiment, a mechanical coupling to the bolt circle of the bearing end cap can be used to spin a rotor that energizes a stator that powers sensor electronics having multiple sensing modalities that have a view of the bearing, the wheel, and many other adjacent structures. In such an embodiment the structure engaging the bolt circle and coupling mechanically to the side arm, for instance, may resemble a hinged arm that reaches over the bearing, having a "hand" that extract the rotational energy while holding sensory devices that "see" the bearing, wheel and railcar truck periphery.

In some embodiments, the one or more additional sensors may be configured to detect load-unload conditions for carrier vehicles such as trains, trucks, etc. In some embodiments, the one or more additional sensors may be configured to detect car-frame spacing due to spring compression by load. In some embodiments, the one or more additional sensors may be configured to detect the opening and/or closing of a door. In some embodiments, detecting the opening and/or closing of a door may comprise implementing one or more camera sensors located within and/or near the stator to look for a door gap, detect a door paint-pattern that is only visible with an open door, or a combination thereof.

In some embodiments, the sensor electronics assembly (500) of the present invention may further comprise a solar power unit. The solar power unit may be configured to provide a minimum power level to the sensor electronics assembly (500) such that rotation can be sensed right away when motion begins. In some embodiments, the sensor electronics assembly (500) may be configured to shift into a micro-power mode when the wheel (103) is not moving, such that when rotation starts, it can be detected and transmitted within one or two rotations or equivalent sensed translation, e.g., with accelerometer or GPS data, etc. In some embodiments, the sensor electronics assembly (500) may be further configured to exit the micro-power mode when one or more rotations are detected. In some embodiments, the computing device (105) may be configured to detect when the sensor electronics assembly (500) enters the micro-power mode. In some embodiments, the computing device (105) may be configured to detect when the sensor electronics assembly (500) exits the micro-power mode.

In some embodiments, the sensor electronics assembly (500) of the present invention may be configured to mount to the one or more bearings (102), the wheelset, by which we mean the structure of a wheel-axle-wheel assembly, including support structure, which for this discussion shall include the side rail that attaches the car to the wheel sets, or a combination thereof. In some embodiments, the sensor electronics assembly (500) may be mounted to the one or more bearings (102), the wheelset, or a combination thereof by a sleeve configured to be fitted over the bearing end cap (124) or other mountable surface suitable to a sleeve. In some embodiments, the sleeve may be fitted over the one or more bearings (102), the wheelset surfaces, or a combination thereof by heating the sleeve, sliding the sleeve on, and allowing the sleeve to cool such that it fits snugly. In some embodiments, the sleeve may comprise a radial clamp configured to affix the sensor device (104) to the one or more bearings (102), the wheelset, or a combination thereof. In some embodiments, the wheelset, the one or more bearings (102), or a combination thereof may be threaded. In some embodiments, the sensor device (104) may be threaded such that the sensor device (104) is configured to thread onto the wheel, the one or more bearings (102), or a combination thereof. In some embodiments, the sensor device (104) may be configured to mount onto the one or more bearings (102), the wheelset, or a combination thereof by an adhesive. In some embodiments, the sensor device (104) may be mounted to the one or more bearings (102), the wheel, or a combination thereof by a spring-loaded edge clamp configured to hold onto one or more bolts of the wheel (103) or a centrally located spring mechanism between the sensor device (104) and the bearing cap assembly (102).

Figure 9:
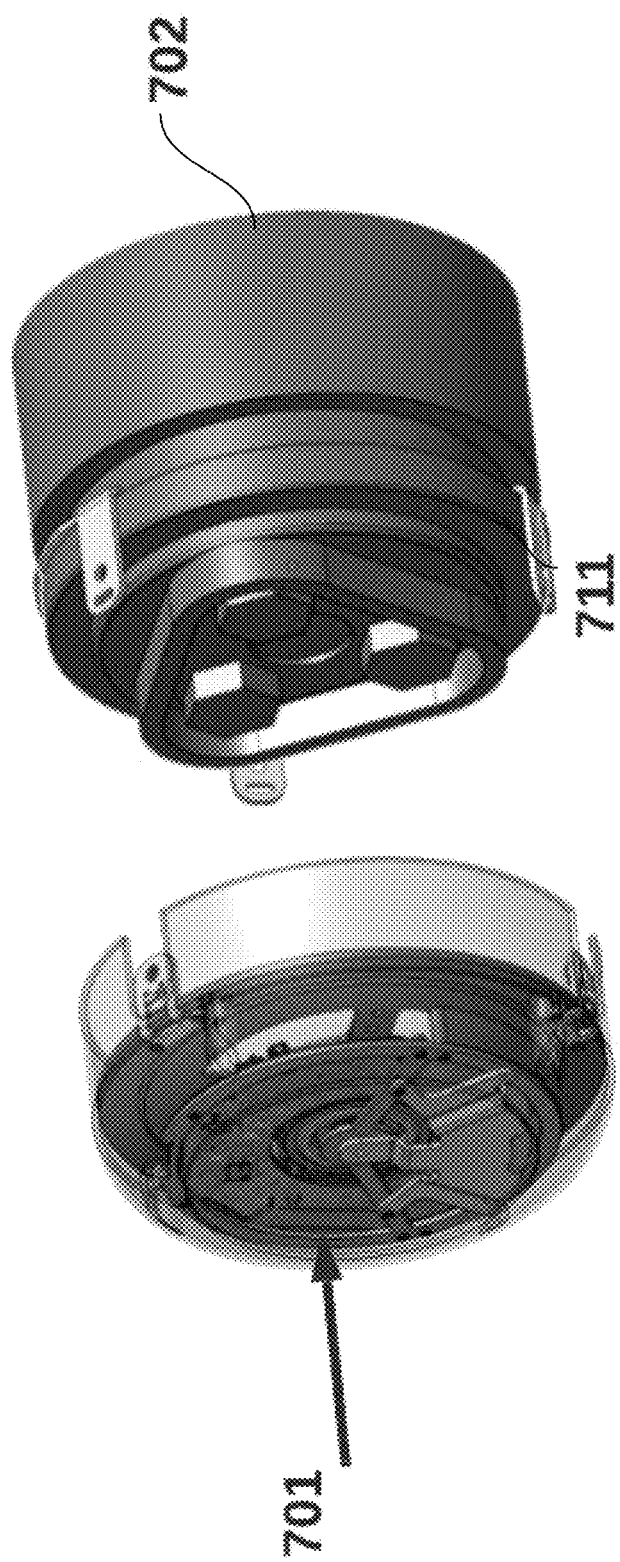
FIG. 9 shows an exploded view of a sensor device being attached to a wheel bearing by a tabbed disk assembly.

Referring now to the invention in more detail, FIG. 9 shows exploded views of a preferred embodiment of a single-piece sensor device (104) that portrays its attachment to a wheel bearing (702). In this embodiment, a (semi-transparent, as shown) sensor electromechanical assembly (701) attaches to a plurality of retainer lugs on the wheel bearing (702) some of which lugs are carried in pairs with a retainer ring (709). As such, FIG. 9 portrays the means of installing such a sensor device (104) onto a wheel bearing (702) with a need for only one "pair of hands".

Figure 10:
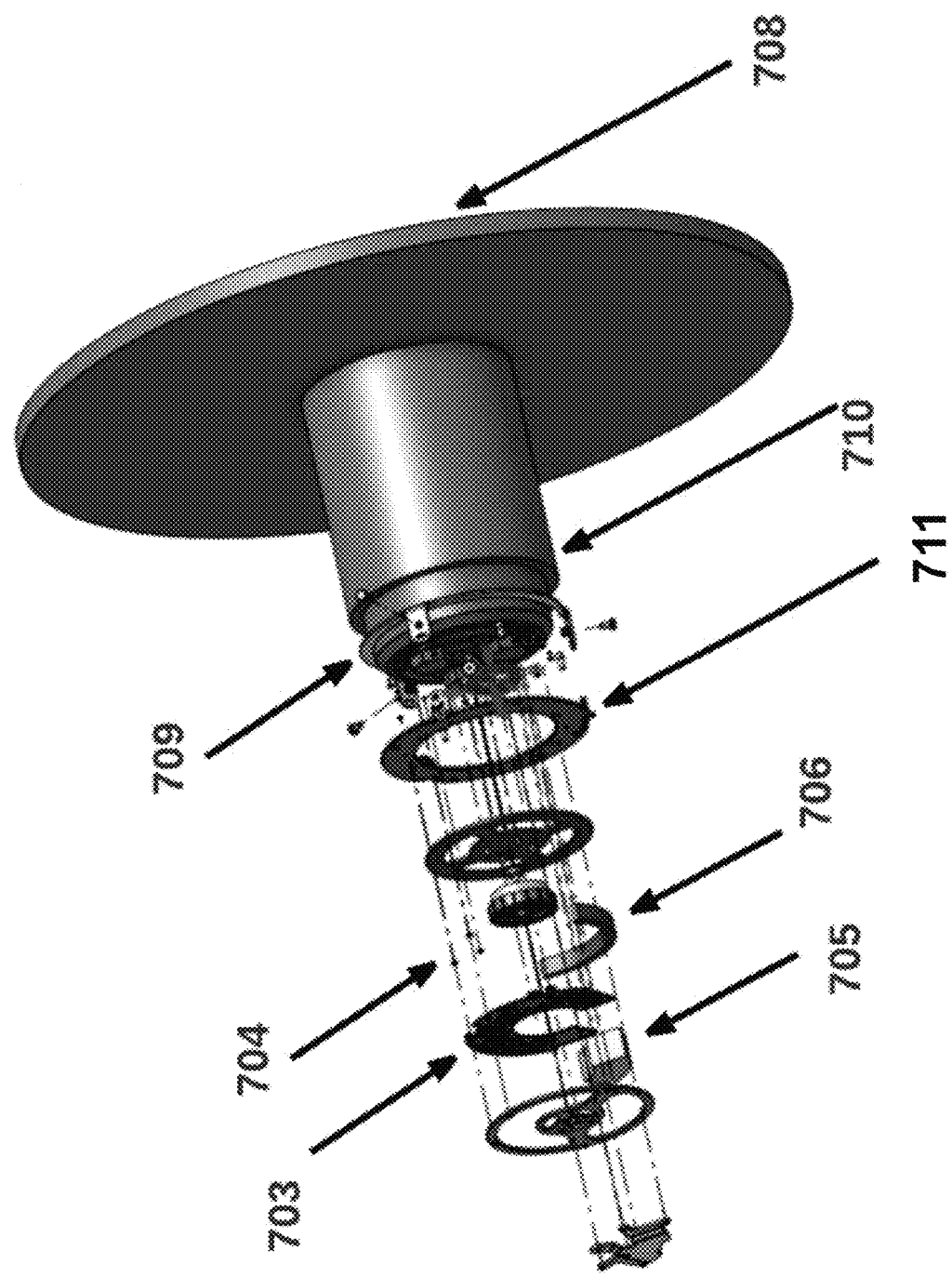
FIG. 10 shows an exploded diagram of the sensor device and power assembly of the present invention being attached to a wheel and bearing assembly by a retainer ring and tabbed disk.

The exploded view of FIG. 10 extends from a wheel (708) to the bearing assembly (710) to which a retainer ring (709) attaches so that a tabbed disk (711) can be attached, the disk carrying additional disc elements, the rotor (704), counterweight (706) and sensor printed circuit board (703) that is powered by a stator (705) which is energized by the rotor (704), all of which is stabilized mechanically by diverse disk and support structures. In this embodiment the sensor electronics on the printed circuit board (703) are relatively stationary while the rotor and other components rotate with the bearing, the counterweight helping to stabilize the sensor electronics.

In some embodiments, as shown in FIG. 11, the two piece rotor-stator assembly (900) is preferable, this arrangement having a stator (903) affixed to a stationary part of the structure adjacent to the bearing, e.g., the bearing adapter (110) and accompanying side rail of a railcar wheelset "bogie" or truck, while the rotor (904) is rotating beneath with the bearing as the wheel (708) rotates in concert with railcar motion along the railroad.

Figure 13:
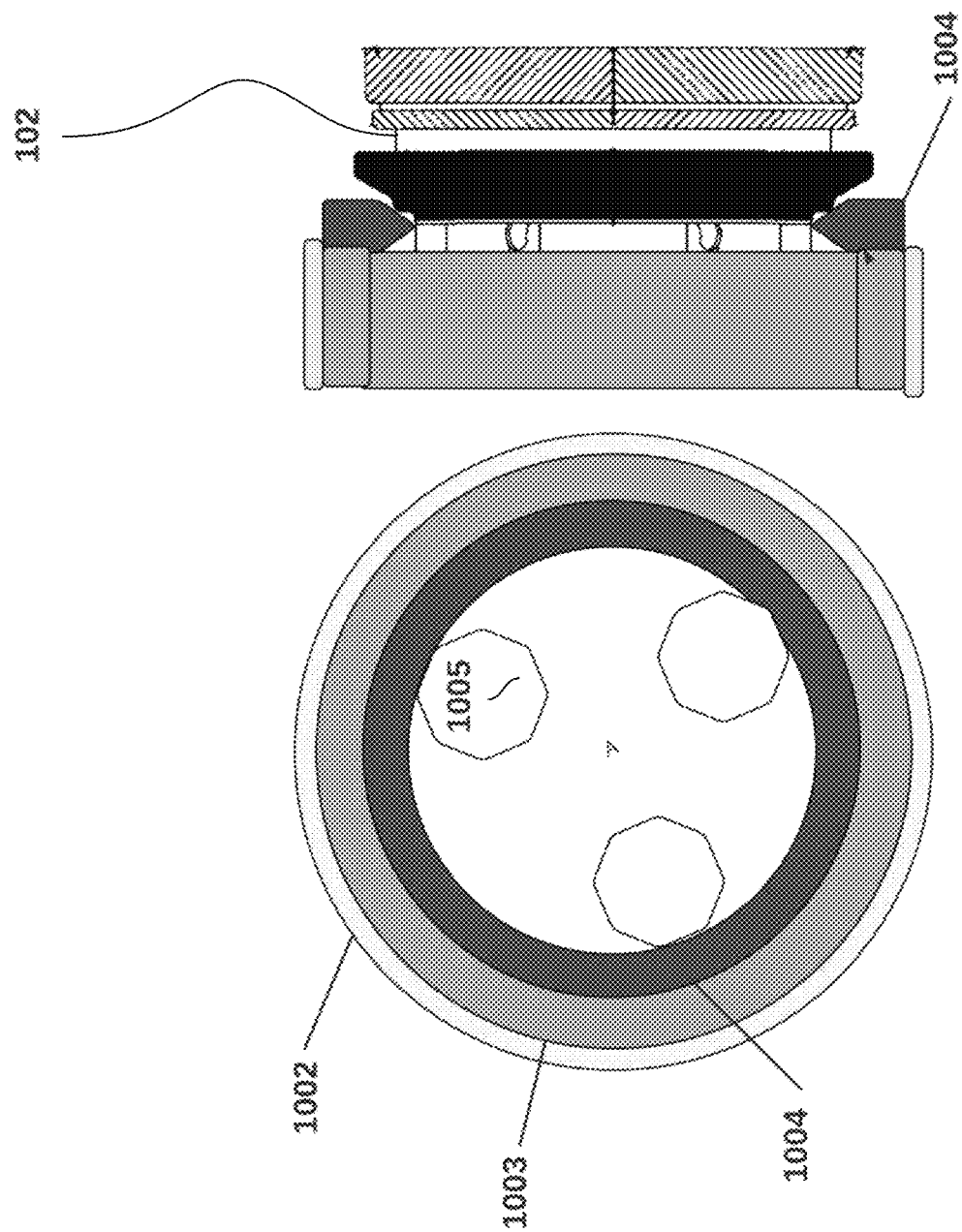
FIG. 13 shows a diagram of the sensor device coupled to bearings by a metal retainer component.
Figure 14A:
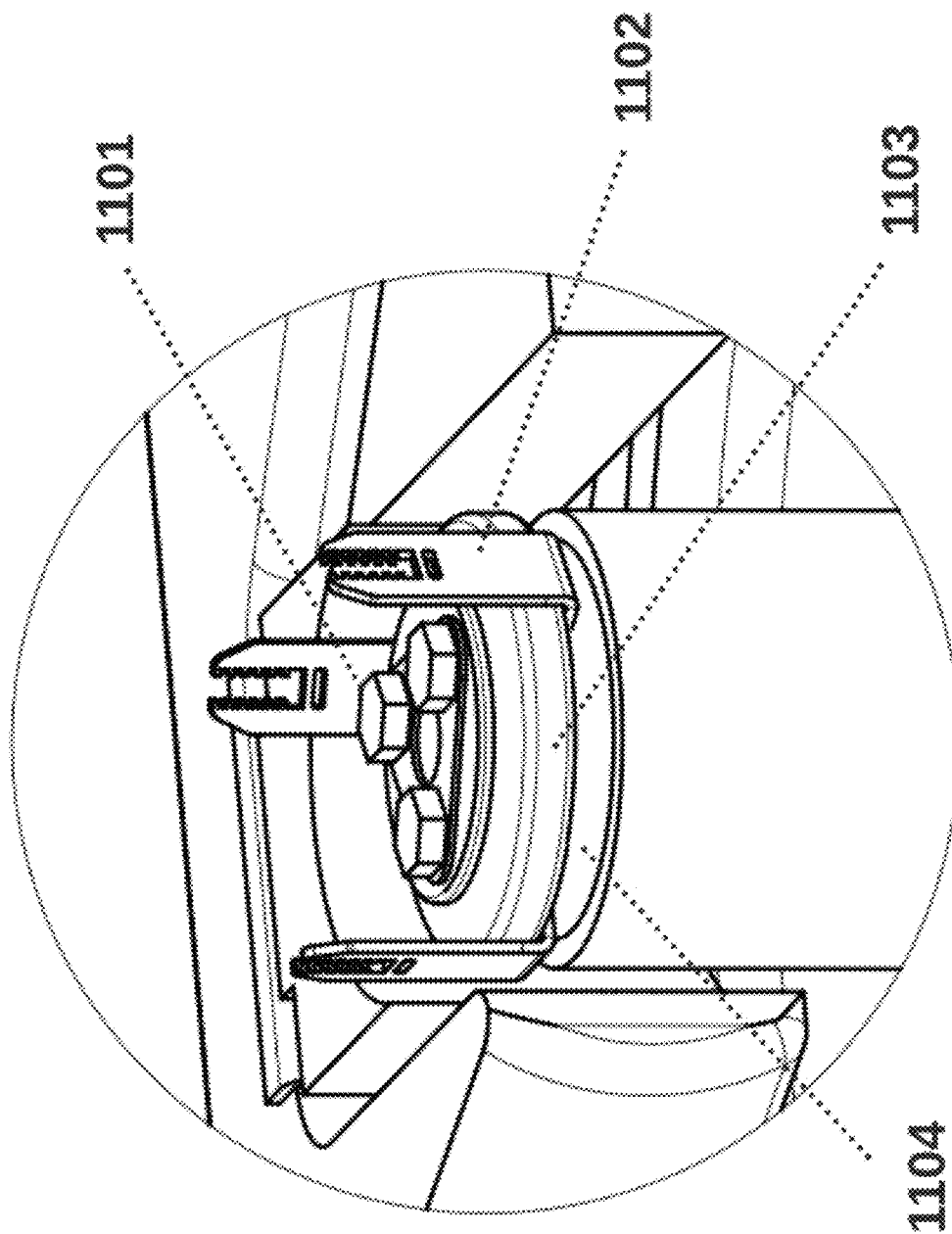
FIG. 14A shows a diagram of retaining lugs applied to a bearing assembly.
Figure 14B:
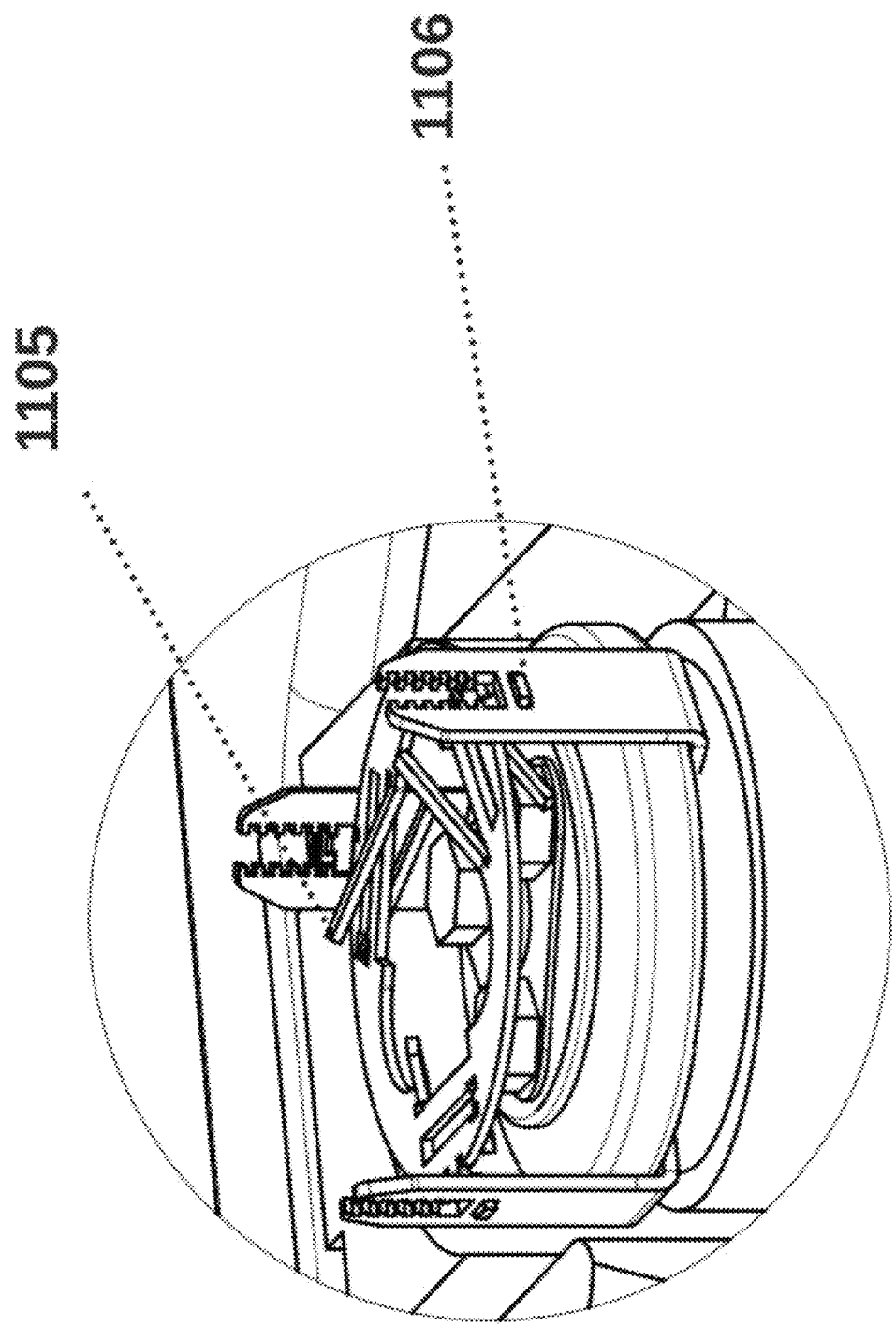
FIG. 14B shows a diagram of a preload spring feature applied to the retaining lugs.
Figure 14C:
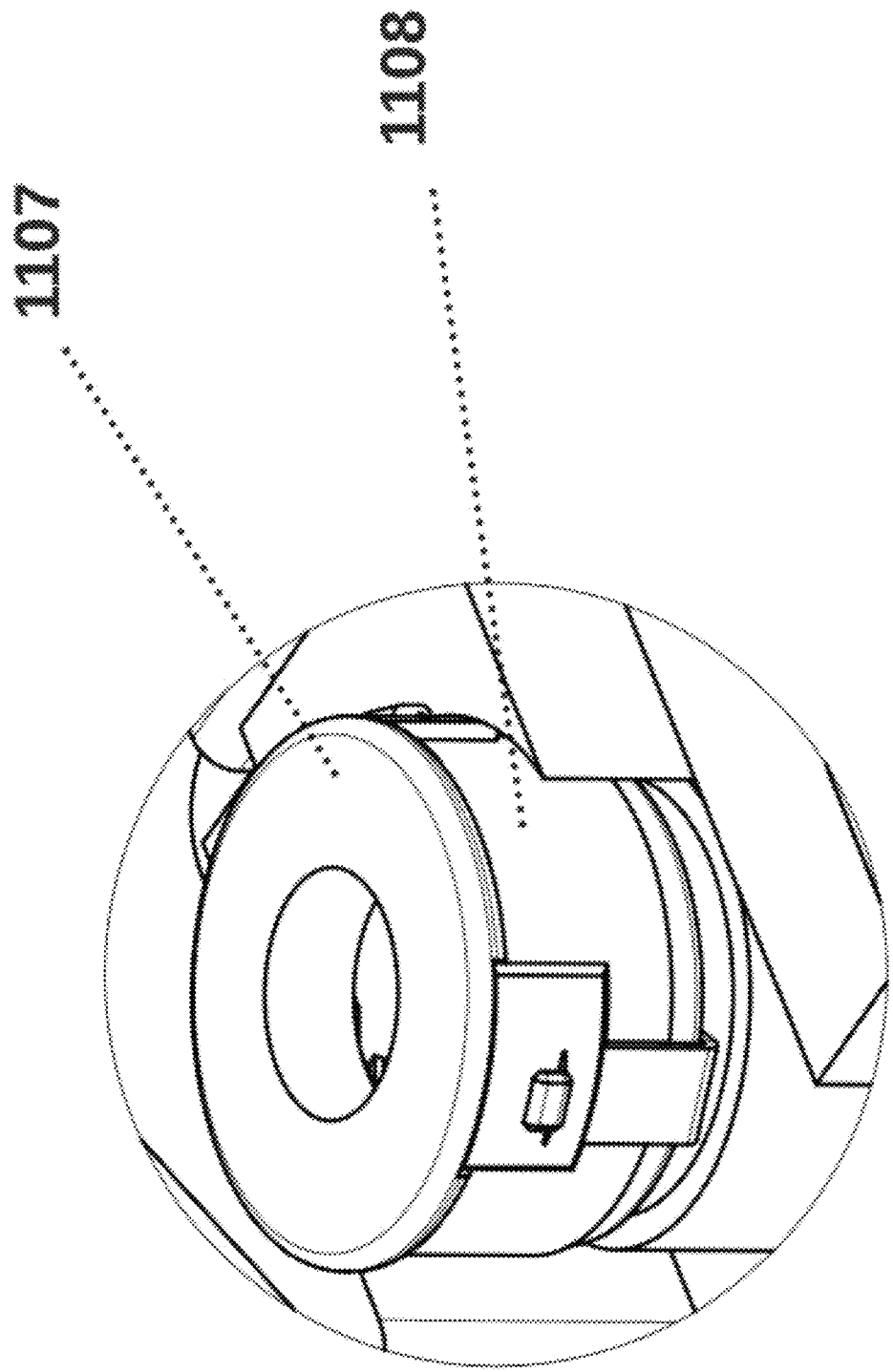
FIG. 14C shows a diagram of the sensor device of the present invention applied to the preload spring feature.
Figure 14D:
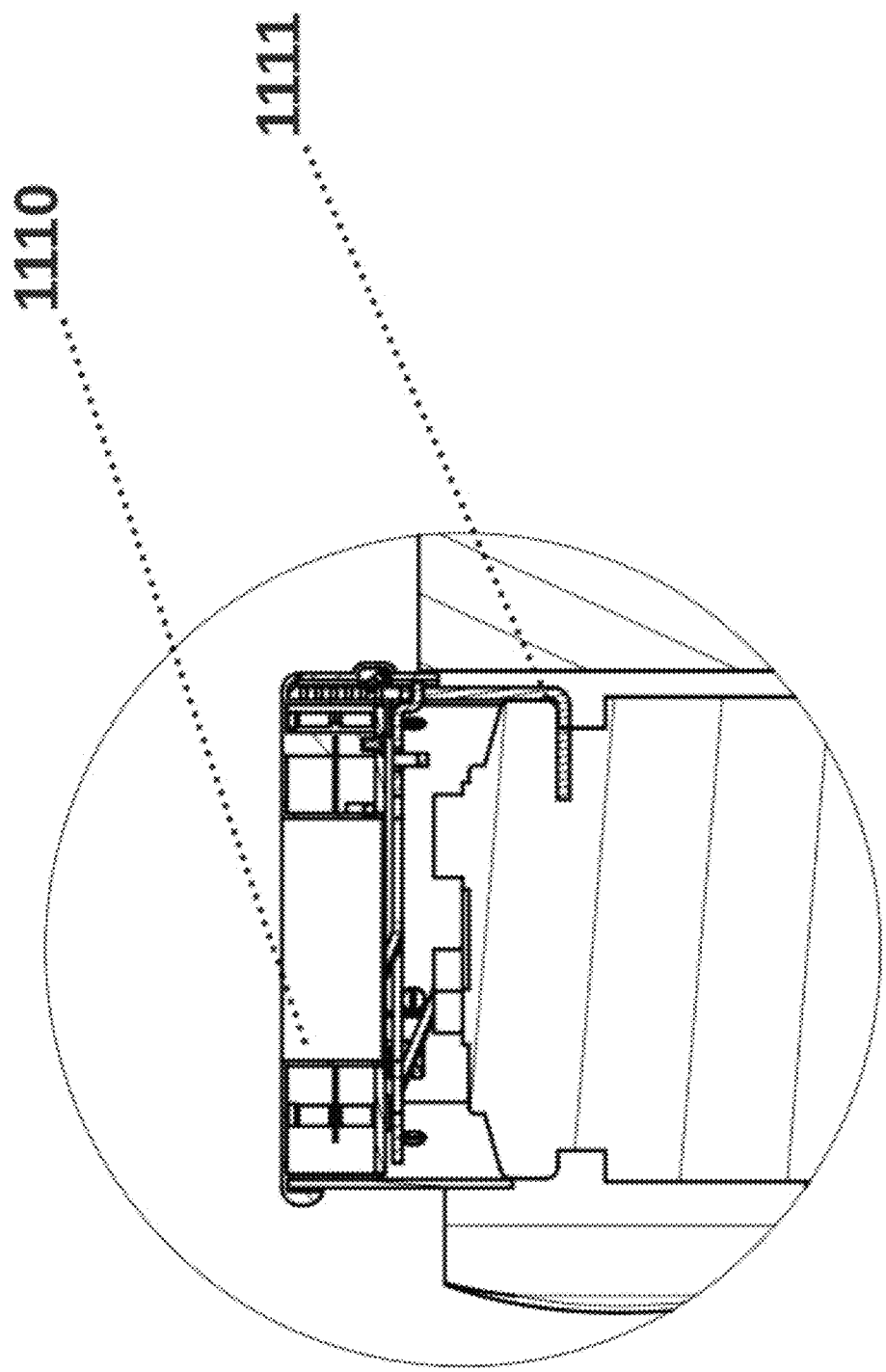
FIG. 14D shows a diagram of an interior view of the sensor device of the present invention attached to the bearing assembly.
Figure 15A:
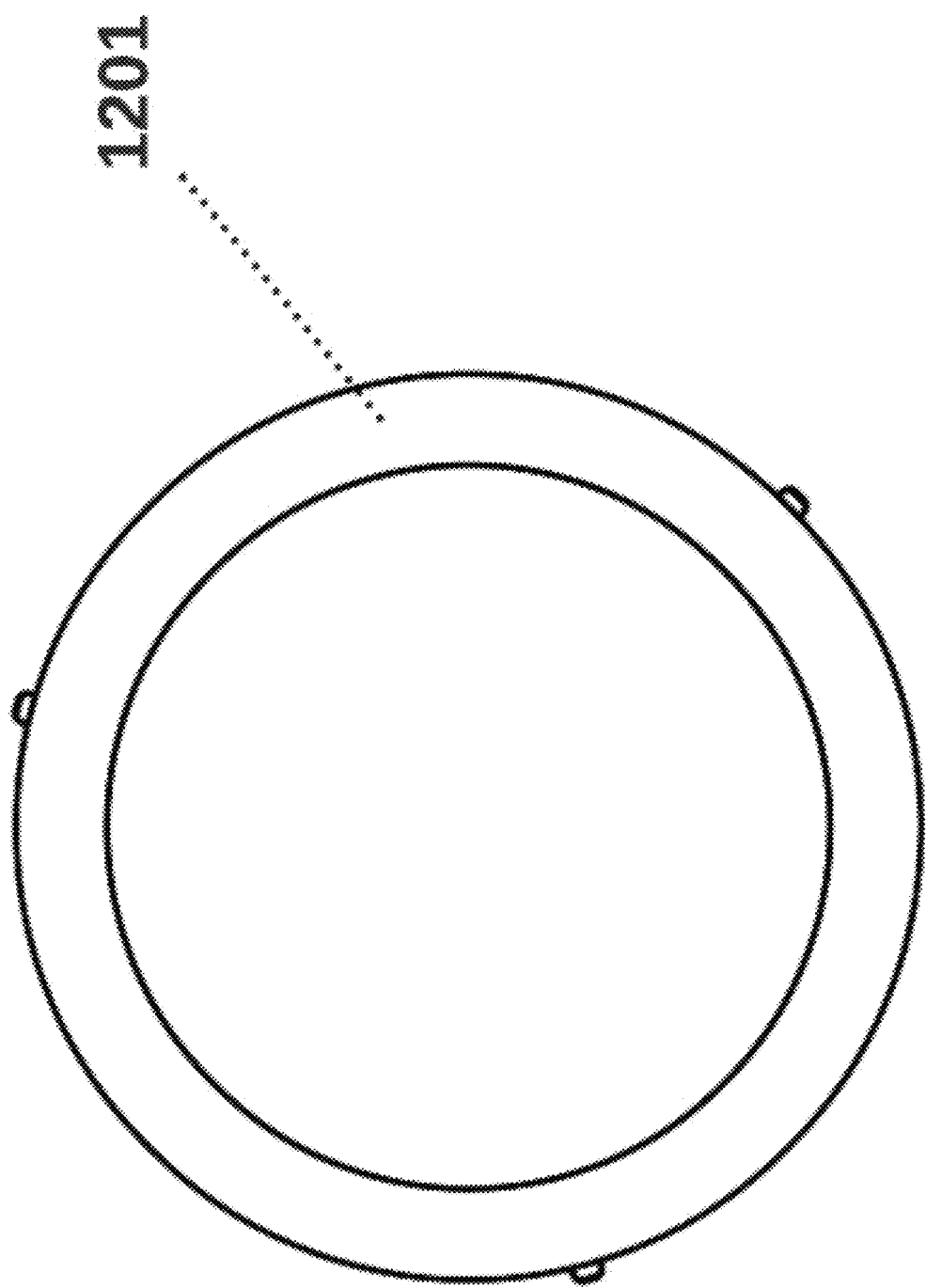
FIG. 15A shows a diagram of an exterior of the sensor device of the present invention.
Figure 15B:
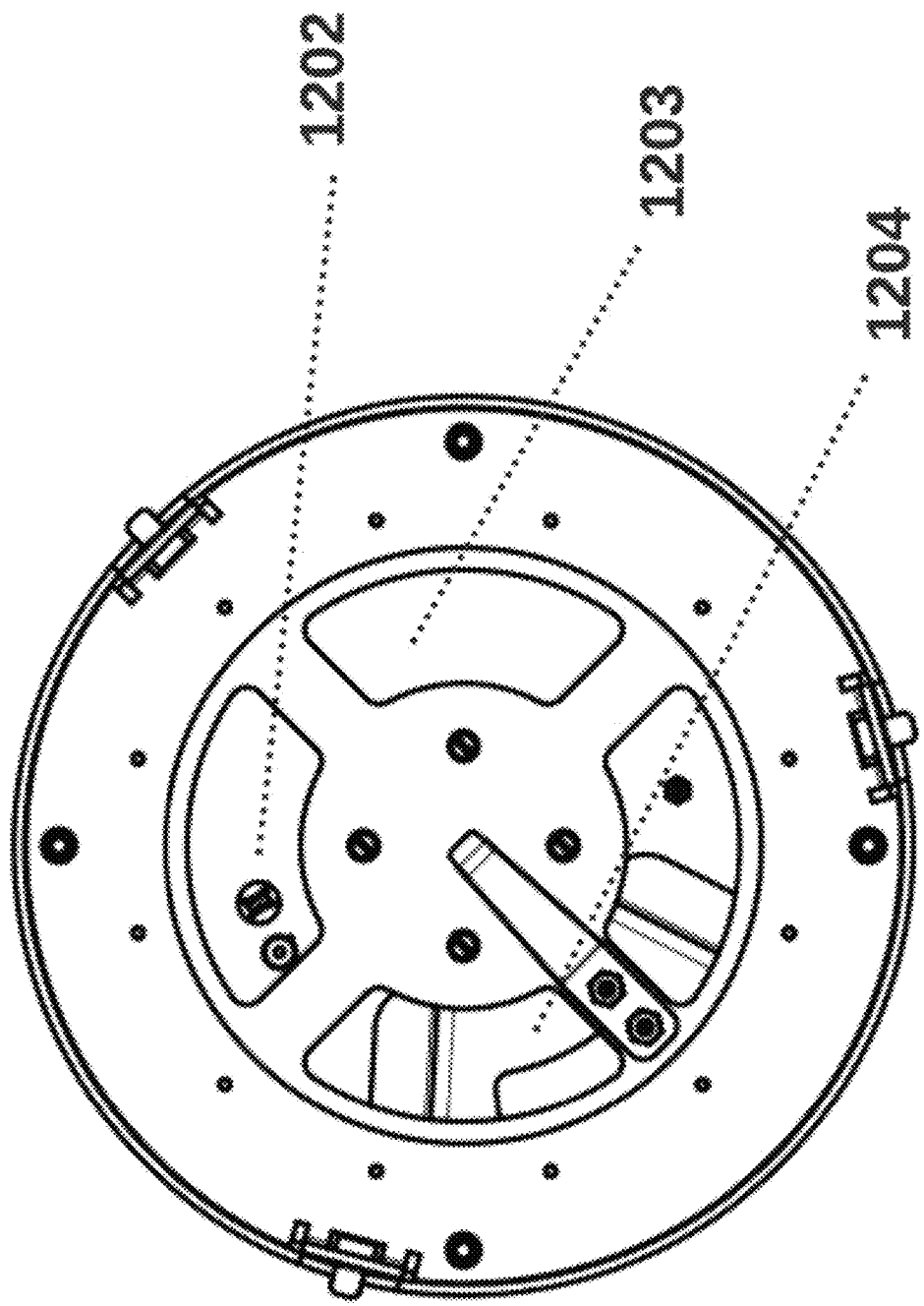
FIG. 15B shows a diagram of an interior of the sensor device of the present invention, showing the internal sensing components and slots.
Figure 15C:
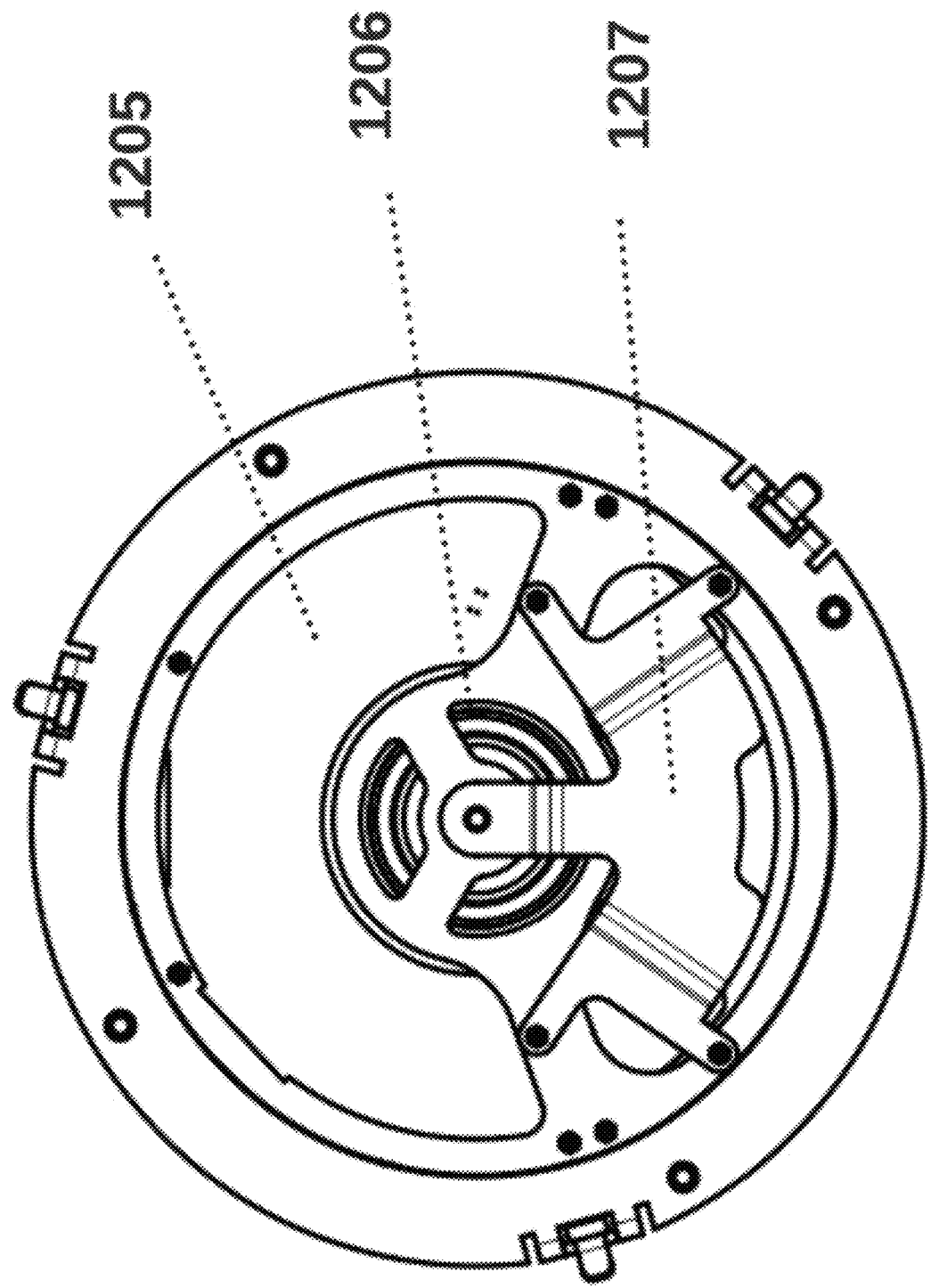
FIG. 15C shows a diagram of an interior of the sensor device of the present invention, showing the circuitry and support components.
Figure 15D:
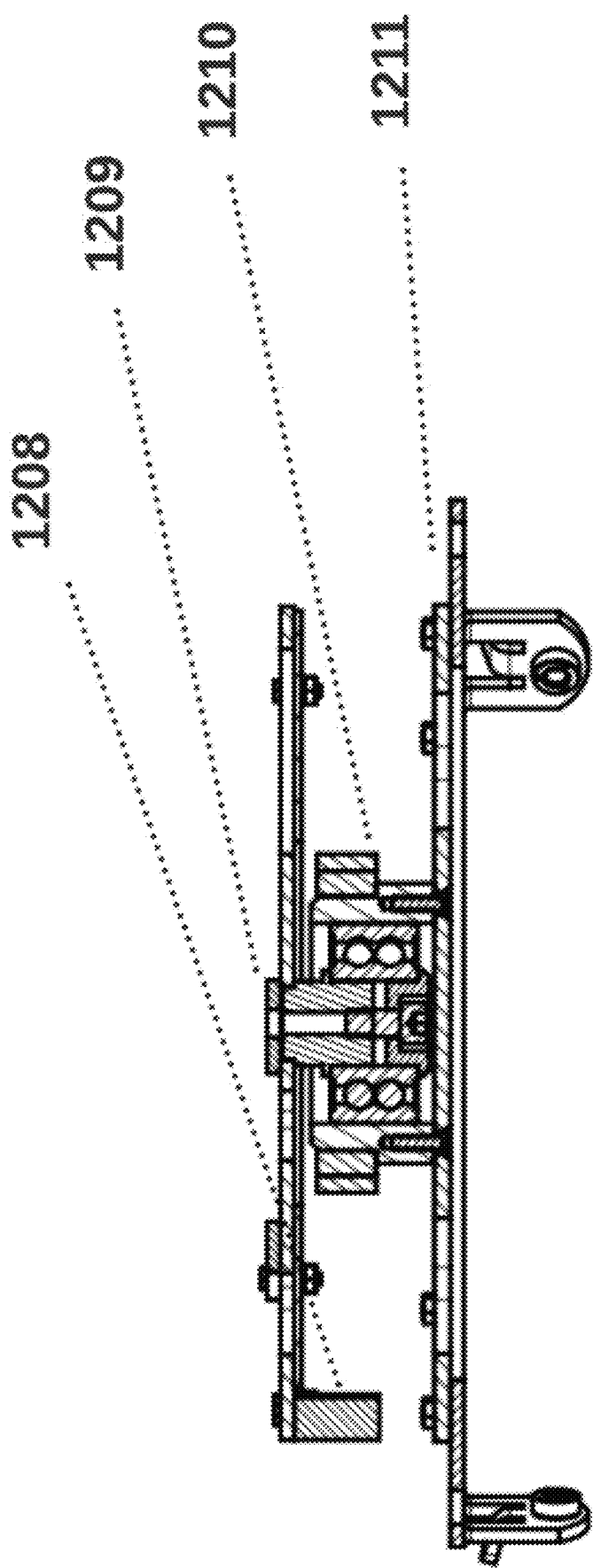
FIG. 15D shows a diagram of a side view of the internals of the sensor device of the present invention, showing the stator and rotor power generation assembly.

In some embodiments, as shown in the two piece stator-rotor assembly (910) of FIG. 12, the components normally associated with a rotor, the series of permanent magnets constituting a rotor magnetics assembly (913) is affixed to a stationary part of the structure adjacent to the bearing, e.g., the bearing adapter (110) and accompanying side rail of a railcar wheelset "bogie" or truck, while the multiphase coil components normally associated with a stator constitute a stator (914) is rotating beneath with the bearing as the wheel (708) rotates in concert with railcar motion along the railroad In some embodiments, as shown in FIG. 13, the sensor device (104) may further comprise a metal retainer (1004) configured to encircle the bolts of the end cap such that the sensor device (104) is held in place on the one or more bearings (102) by virtue of a clamping force produced by, for example, tightening an outer sleeve (1002) around a flexor or sectioned element (1003), the combined effect being that of a compression sleeve. In some embodiments, the compression that produces a clamping force can be produced with a compression bolt near the center of the end cap bolt circle that compresses radially outward into the interior of the bolt circle.

In some embodiments, as shown in FIGS. 14A-14D, the sensor device (104) is secured to the bearing assembly using a plurality of retaining lugs (1102), or claws, that can be fastened together with a tabbed disc (1106) such that an annular carrier (1107) for the sensor device (104) can be used to expose the center of the bearing cap (102), e.g., the inside of the bolt circle securing the bearing cap to the bearing housing (1104). In this embodiment, a ratcheting mechanism is used on the lugs (1102) such that the carrier (1107) can be tapped onto the lugs (1102) to compress a preload spring feature (1105) that absorbs excess axial motion, the compression being supported by the grabbing of the lugs (1102) onto the bearing end cap (1103) in the gap between the end cap (1103) and the bearing housing (1104).

In some embodiments, as shown in FIGS. 15A-15D, the sensor electronics printed circuit board (1205) assembly is combined with the rotor and stator electromagnetics for power generation by carrying the circuit board (1205) with a carrier disk (1206) having stator support (1207), e.g., a sectional stator, and freed rotationally with a bearing structure (1209) that permits the rotor (1210) to rotate with the bearing and the tabbed disc assembly (1211) while a counterweight (1208) supports the stationarity of the electronics and stator electromagnetics, the electronics having a primary objective of supporting the sensors (1202) on the printed circuit board to view bearing structures, e.g., as they move underneath the sensor (1202) field of view, this view constituted by slots (1203) in the tabbed disc assembly (1211). In this embodiment, the sensor device (104) comprises a complete system with sensors, power generation, computing, communicating and mechanical attachment elements that support its autonomous provision of sensory data to local and wide area networks.

Figure 16:
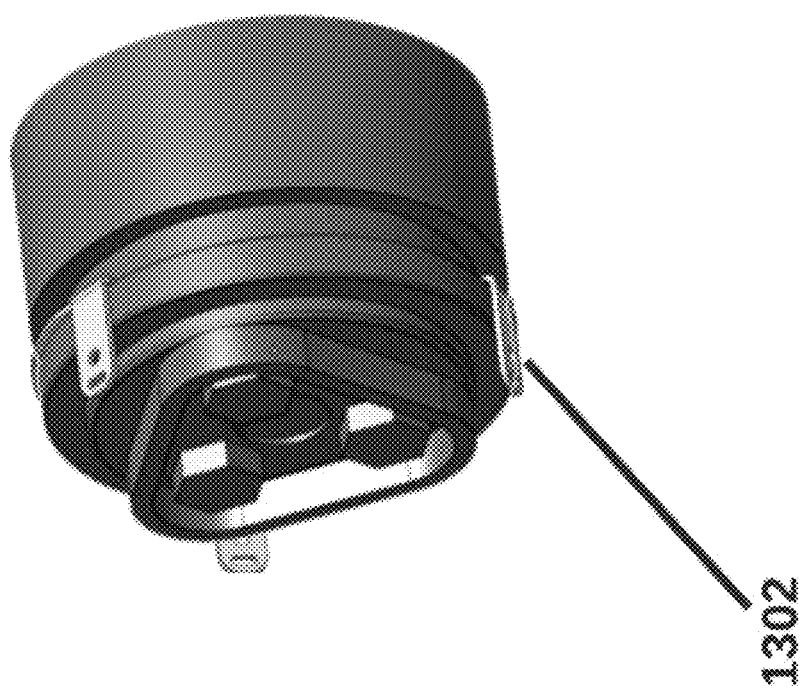
FIG. 16 shows a diagram of retaining lugs coupled to a bearing assembly.
Figure 17A:
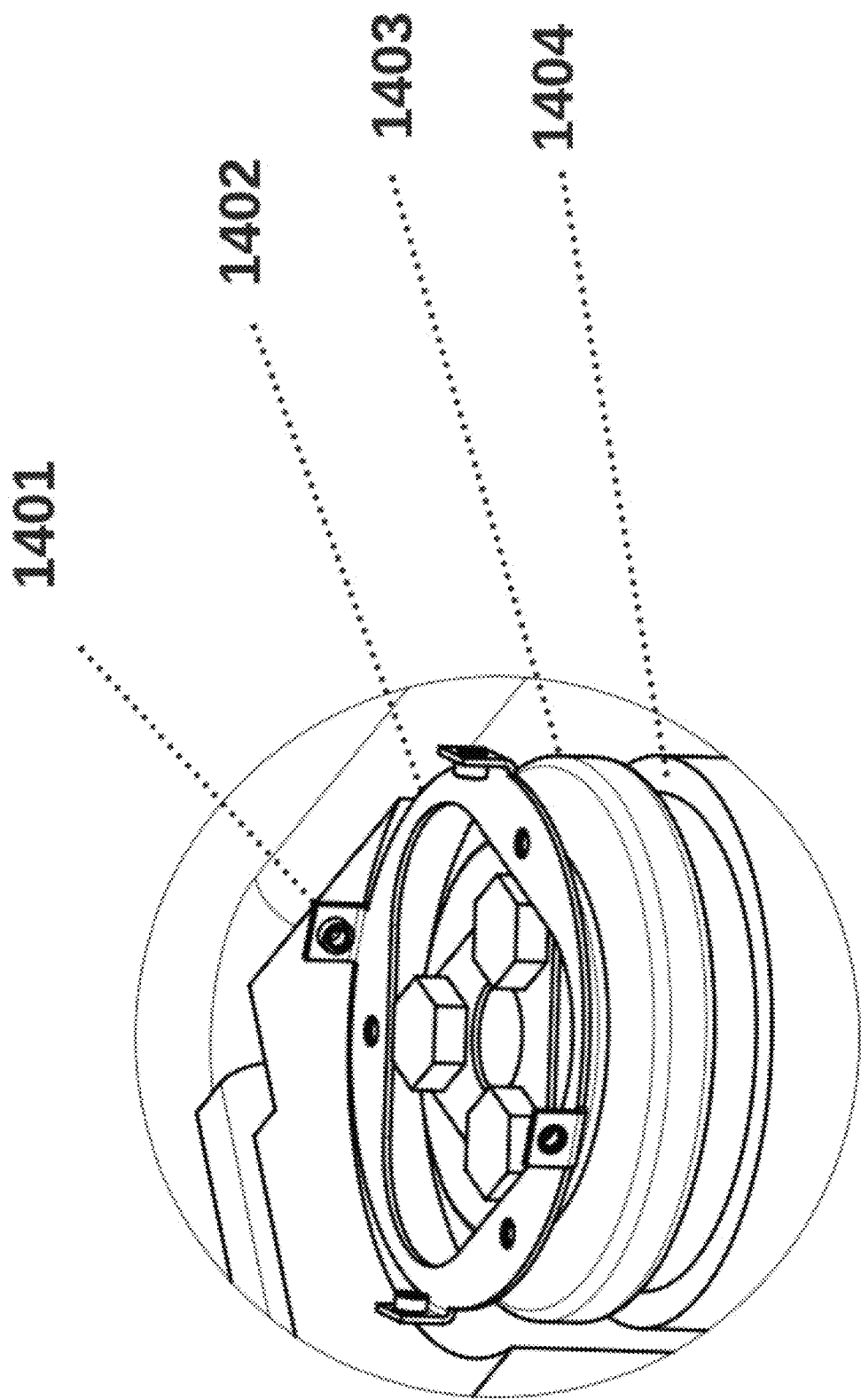
FIG. 17A shows a diagram of a tabbed disk assembly coupled to a bearing assembly of a wheel.
Figure 17B:
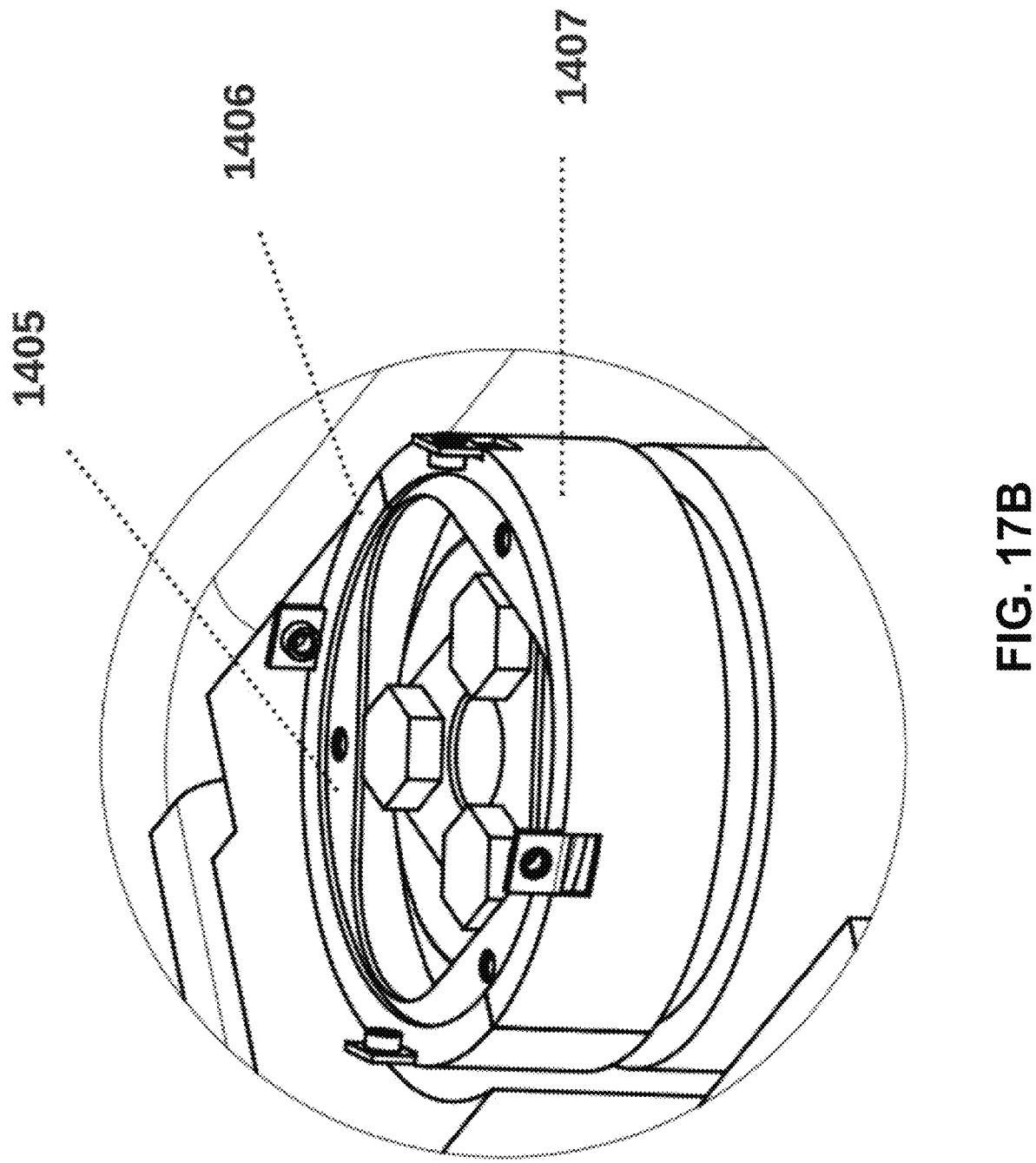
FIG. 17B shows a diagram of a c-channel structure coupled to the tabbed disk assembly.
Figure 17C:
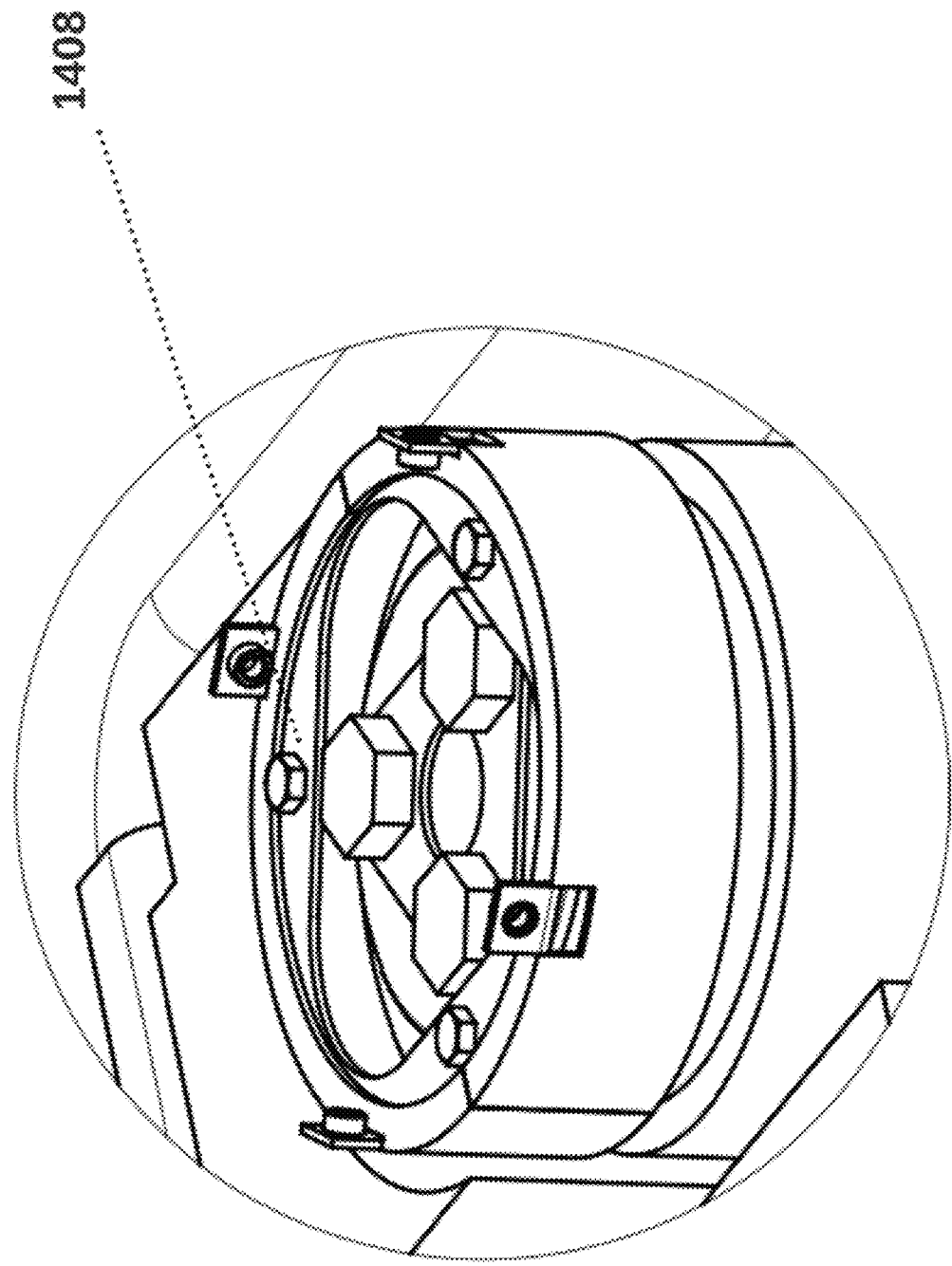
FIG. 17C shows a diagram of the c-channel structure bolted onto the tabbed disk assembly to fasten it to the bearing assembly.
Figure 17D:
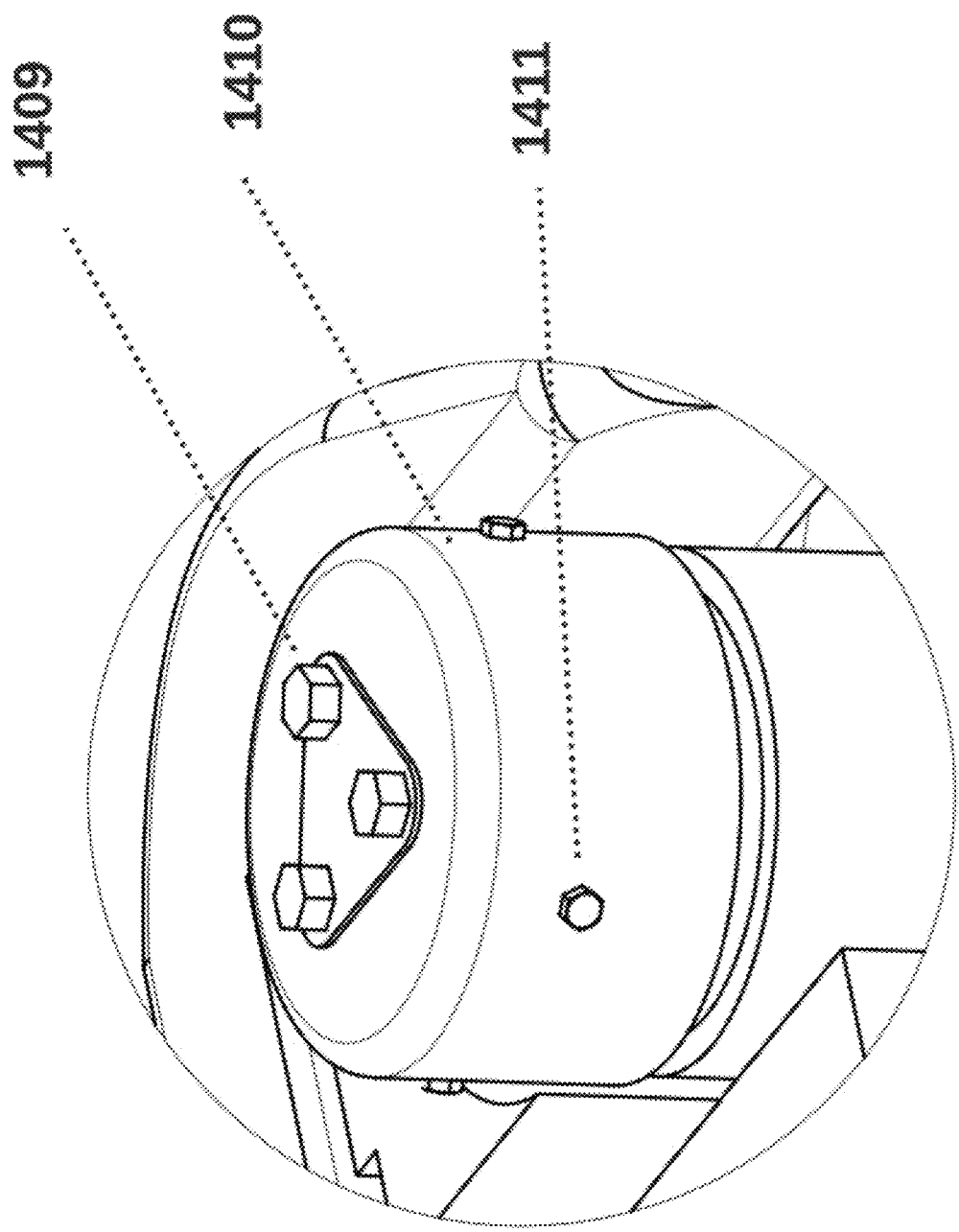
FIG. 17D shows a diagram of the sensor device assembled onto the c-channel structure and the bearing assembly.

In some embodiments, as shown in FIG. 16, the retaining lugs (1302) can be combined into one-piece and two-piece combinations that fit into the gap between the bearing end cap and the bearing housing, the two of which comprise the bearing assembly (1310). In some embodiments, these lugs can further have combinations of slots and holes that mate with tabbed or other discs that carry the rest of the sensor device (104), the combination of which makes it easy to install the sensor device on an operational wheel set without requiring an "extra pair of hands".

In some embodiments, the lugs can also have perpendicular surfaces at the lug end furthest from the bearing housing such that fasteners on the sensor device housing can be used to remove excess axial motion, even while the lugs and associated discs or lug structures clamp onto the bearing end cap both axially and radially. In some embodiments, a spring element can be used between sensor device (104) interior structures, e.g., discs (1211), and the bearing end cap, e.g., in the interior of the bolt circle, to provide axial preload to help remove excess axial motion. In some embodiments, features are added to the sensor device (104) interior structures, e.g., discs (1211), to mate with an insertable component lodged within the bolt circle, the purpose of which is to remove excess motion in the direction of bearing rotation.

In some embodiments, as shown in FIGS. 17A-17D, a tabbed disc assembly (1402) can use radially oriented fasteners (1401) to support attachment to lugs that use the gap between bearing end cap (1403) and bearing housing (1404) to produce axial and radial rigidity for the sensor device (104), or such fasteners (1401) may provide attachment points for the sensor device housing (1410) such that lateral fasteners (1411) remove excess motion in radial and rotary directions, with axial excess motion being removed by interior standoff fasteners (1408) that push the housing (1410) away from the bearing end cap (1403). In such embodiments, a c-channel structure (1406) can be used to "grab" the bearing end cap (1403) and secure the assembly onto the bearing axially and radially, with a faux bolt circle (1409) serving to dissuade vandals when necessary.

In some embodiments, the one or more anomalies of the one or more bearings (102) may comprise bearing deterioration, missing bearings, improperly installed bearings, dislodged bearings, or a combination thereof.

Referring now to the invention in more detail, the sensor device (104) comprising a thermographic sensing module (130) utilizes one or more thermographic devices (134) to create an image that maps the temperature across the surface of a railcar wheel bearing. The thermographic device may comprise a thermal imaging array (136) comprising one or more pixel elements (137) that detect infrared radiation within the array, each translating infrared energy into a temperature reading. The module may further comprise focusing optics (138) to direct infrared radiation onto the thermal imaging array. The module may further comprise a data processing unit (507) that converts the readings from each pixel element into a digital temperature map. The module may further comprise a power supply (508), derived from the generator rotor, that energizes the thermal imaging array. The module may further comprise a communication interface (106) that transmits temperature data to a maintenance monitoring system.

In FIG. 3, the thermal imaging array (136) captures infrared radiation emitted from the surface of the wheel bearing. Each pixel element (137) is sensitive to a specific region of the bearing's surface, providing localized temperature data. The focusing optics (138) ensure that the infrared radiation from the bearing is accurately imaged onto the pixel elements. The data processing unit (507) compiles the pixel temperature data to create a comprehensive thermal image, indicating potential hot spots that signify wear or defects. This unit is powered by the integrated power supply (508), which is self-sustained by the wheel's rotation. Finally, the temperature data is communicated in real-time via the communication interface (106) to the monitoring system for analysis and predictive maintenance actions.

The thermographic sensing modality operates on the principle of infrared radiation detection. The fundamental physics behind this modality is governed by Planck's law, which describes the spectral brightness of electromagnetic radiation at all wavelengths from a black body at temperature T. Additionally, Wien's Displacement Law can be used to find the peak wavelength of emission, and the Stefan-Boltzmann Law allows relation of the total emitted energy to the fourth power of the temperature.

For a pixel element (137) in the thermal array (236), the detected power (P) can be modeled as:

$$[P = \epsilon \sigma A T^4]$$

where: ($\epsilon$) is the emissivity of the surface, ($\sigma$) is the Stefan-Boltzmann constant, (A) is the area of the surface that the pixel views, and (T) is the absolute temperature of the bearing surface.

In some embodiments, the algorithm of the present invention for data processing may comprise capturing raw infrared data from each pixel element (137). The algorithm may further comprise applying a calibration curve to convert raw data to radiance. The algorithm may further comprise using the Stefan-Boltzmann law to convert radiance to temperature for each pixel. The algorithm may further comprise applying emissivity correction to account for material-specific infrared properties. The algorithm may further comprise integrating temperature data across the array to form a thermal image. The algorithm may further comprise analyzing the thermal image for regions of interest (hot spots) that exceed threshold values. The algorithm may further comprise communicating significant temperature variations for further diagnostic analysis.

To ensure high accuracy and low energy consumption, the algorithm should employ low-complexity computational methods and prioritize data processing steps that can be executed with minimal power. This means leveraging on-chip processing where possible, reducing data transmission by only sending data that indicates anomalies, and implementing efficient sleep modes for the sensor array when not in active measurement cycles.

Referring now to the invention in more detail, FIG. 4 shows a vibration analysis module (200), which utilizes a three-axis accelerometer (203) to detect and analyze the vibrational characteristics of the railcar wheel bearing. The module may comprise a three-axis accelerometer (203) capable of detecting vibrations in three perpendicular axes, often labeled X, Y, and Z. The module may further comprise an X-axis sensor (203), measuring lateral vibrations parallel to the railcar's direction of travel. The module, if accelerometry is accomplished with one sensing mode per axis, may further comprise a Y-axis sensor (203), measuring vertical vibrations perpendicular to the wheel's surface. The module may similarly further comprise a Z-axis sensor, aligned with the rotational axis of the wheel, measuring torsional vibrations. The module may further comprise a signal processing unit (507) that interprets the raw accelerometer data, filters noise, and extracts features indicative of bearing health. The module may further comprise an energy-efficient data transmitter (106) that sends the processed vibration data to the predictive maintenance system. The module may further comprise a power management module (508) that supplies energy to the accelerometer, optimizing power usage for extended operation.

In FIG. 4, the three-axis accelerometer (203) is strategically placed to capture the full spectrum of vibrational forces acting on the wheel bearing. As the wheel (103) rotates, vibrational data from the X-axis, Y-axis, and Z-axis either within a single multi axis assembly or as discrete sensing axes, sensors are continuously recorded. These measurements are then processed by the signal processing unit (507), which employs advanced algorithms to distinguish between normal operational vibrations and those signaling potential defects. The power management module (508) ensures efficient energy consumption, while the data transmitter (106) sends vital information to the maintenance crew for timely decision-making.

The vibration analysis using a three-axis accelerometer (203) can be modeled by considering the dynamics of a rotating system. Each axis of the accelerometer (203), X, Y, and Z, measures acceleration due to vibration in its respective direction. The physics-based model for the vibration analysis can be derived from Newton's second law of motion, (F=ma), where force (F) is the product of mass (m) and acceleration (a). For a rotating system like a wheel bearing, the acceleration measured by the accelerometer (203) can also include components due to centripetal force, which must be accounted for in the analysis. The mathematical representation for each axis can be expressed as:

$$[a_x(t) = -r\omega^2 \sin\sin(\omega t + \phi) + a_{0x}(t)]$$

$$[a_y(t) = -r\omega^2 \cos\cos(\omega t + \phi) + a_{0y}(t)]$$

$$[a_z(t) = a_{0z}(t)]$$

where: $-(a_x(t), a_y(t), a_z(t))$ are the time-dependent accelerations in each axis, (r) is the distance from the center of rotation to the accelerometer (203), ($\omega$) is the angular velocity of the wheel, ($\phi$) is the phase offset at (t=0), and $(a_{0x}(t), a_{0y}(t), a_{0z}(t))$ are the actual vibrational accelerations in each axis.

In some embodiments, the algorithm for vibration data processing may comprise acquiring raw data from the accelerometer (203) for each axis over time. The algorithm may further comprise applying a high-pass filter to remove the low-frequency components related to the wheel's rotation. The algorithm may further comprise performing a Fast Fourier Transform (FFT) on the filtered signal to convert from time domain to frequency domain. The algorithm may further comprise analyzing the FFT results to identify significant frequency components that correspond to known failure modes. The algorithm may further comprise applying a decision-making algorithm to determine the health status of the bearing based on the vibrational signature. The algorithm may further comprise communicating the results using an energy-efficient protocol, ensuring only the necessary data is sent to preserve power. This algorithm may prioritize accuracy by focusing on the frequency domain where bearing defects are more easily identified while maintaining low energy consumption by transmitting only essential processed data.

Bearing Vibrational Analysis Strategy and Equations: To establish the mathematical relationship between wheel rotational velocity, roller bearing diameter, bearing assembly diameter, bearing temperature, and vibrational spectrum, a plurality of parameters are considered. The parameters may comprise Wheel Rotational Velocity (($\omega$)), representing the angular velocity of the wheel in radians per second (rad/s), typically measured in revolutions per minute (RPM) and converted to radians per second for calculations. The parameters may further comprise Roller Bearing Diameter (($D_r$)), denoting the diameter of the roller bearing, influencing the vibration characteristics of the bearing assembly. The parameters may further comprise Bearing Assembly Diameter (($D_b$)), referring to the overall diameter of the bearing assembly, which includes the roller bearing and other components, affecting the resonant frequencies and mode shapes of the bearing assembly. The parameters may further comprise Bearing Temperature ((T)). The temperature of the bearing may affect its material properties and internal clearance, influencing the vibration behavior. The parameters may further comprise Vibrational Spectrum (($S(f)$)), representing the frequency spectrum of the vibration signal, indicating the amplitude distribution of vibration components across different frequencies.

To derive the mathematical relationship, we'll need to consider the dynamic characteristics of the bearing system, including its natural frequencies, mode shapes, and damping properties. A comprehensive analytical solution may require complex modeling techniques such as finite element analysis (FEA) or multibody dynamics simulation; however, a simplified equation can be provided to express the vibrational spectrum based on these parameters. Let's denote ($f$) as the frequency in Hertz (Hz). Assuming a simplified model, the vibrational spectrum (($S(f)$)) can be expressed as:

$$\left[ S(f) = A \cdot \frac{\omega^2}{\left(f^2 - f_n^2\right)^2 + 4 \cdot \xi^2 \cdot f^2 \cdot \omega^2} \right]$$

where: (A) is a constant representing the overall vibration magnitude, ($f_n$) is the natural frequency of the bearing assembly, and ($\xi$) is the damping ratio of the system. The natural frequency (($f_n$)) of the bearing assembly can be estimated using:

$$\left[ f_n = \frac{\sqrt{k/m}}{2\pi} \right]$$

where (k) is the equivalent stiffness of the bearing assembly, and (m) is the equivalent mass of the bearing assembly.

The equivalent stiffness (k) can be determined based on the bearing geometry and material properties. Similarly, the equivalent mass (m) considers the mass distribution of the bearing assembly. The damping ratio (($\xi$)) can be estimated based on the damping characteristics of the bearing materials and lubrication conditions. This simplified equation describes the relationship between wheel rotational velocity, roller bearing diameter, bearing assembly diameter, bearing temperature, and the resulting vibrational spectrum within the specified frequency range.

Model Variation Including the Roller Bearings and Bearing Assembly: To incorporate the size (diameter) and number of rollers in the roller bearing assembly into the mathematical model, their influence on the bearing stiffness and mass may be considered. Let's denote the number of rollers as (N) and the diameter of each roller as ($D_r$). The equivalent stiffness ((k)) of the bearing assembly can be expressed as:

$$\left[ k = \frac{N \cdot k_r}{D_r} \right]$$

where ($k_r$) is the stiffness of an individual roller. The equivalent mass ((m)) of the bearing assembly can be expressed as:

$$[m = N \cdot m_r]$$

where ($m_r$) is the mass of an individual roller.

The natural frequency (($f_n$)) of the bearing assembly can then be estimated using:

$$\left[ f_n = \frac{\sqrt{k/m}}{2\pi} \right]$$

The modified equation for the vibrational spectrum (($S(f)$)) becomes:

$$\left[ S(f) = A \cdot \frac{\omega^2}{\left(f^2 - f_n^2\right)^2 + 4 \cdot \xi^2 \cdot f^2 \cdot \omega^2} \right]$$

where (A) is a constant representing the overall vibration magnitude, ($f_n$) is the natural frequency of the bearing assembly, ($\xi$) is the damping ratio of the system. Incorporating the size (diameter) and number of rollers into the model allows for a more accurate representation of the bearing's dynamic behavior, considering the influence of these parameters on stiffness, mass, and consequently, natural frequency. vibration characteristics may also be influenced by bearing clearance, lubrication, and operating conditions, though these are not explicitly shown in this example.

Model Refinement to Reflect the Railcar Load, Assessing Load with Vibration Data: To incorporate the load applied to the bearing into the mathematical model and assess its impact on the vibrational spectrum captured by the 3-axis accelerometer, it is useful to consider the load-induced changes in bearing stiffness and mass. The load applied to the bearing can influence its dynamic behavior by altering the contact stresses, internal clearances, and deformation characteristics. The model can be modified by including the load applied to the bearing, ($F_{load}$). The load applied to the bearing can result in changes in contact stresses and deformation (($\Delta k$)), affecting the bearing's stiffness. The variation in stiffness can be approximated using Hertzian contact theory or bearing stiffness models considering the load distribution across the rollers. The load applied to the bearing contributes to an increase in the effective mass (($\Delta m$)) due to the additional load-bearing capacity required. This increase in mass can be estimated based on the load distribution and bearing geometry.

The modified equation for the equivalent stiffness ((k)) and mass ((m)) of the bearing assembly incorporating the load-induced changes becomes:

$$\left[k = \frac{N \cdot k_r + \Delta k}{D_r}\right]$$

$$[m = N \cdot m_r + \Delta m]$$

Subsequently, the natural frequency (($f_n$)) of the bearing assembly considering the load-induced changes can be estimated using:

$$\left[f_n = \frac{\sqrt{k/m}}{2\pi}\right]$$

The vibrational spectrum (S(f)) captured by the 3-axis accelerometer will be influenced by these load-induced variations in stiffness and mass. Generally, an increase in load can lead to higher stiffness and mass, potentially shifting the resonant frequencies and altering the vibrational characteristics of the bearing assembly. The specific impact on the spectrum will depend on factors such as the magnitude and distribution of the load, bearing geometry, and operating conditions. In summary, incorporating the load applied to the bearing into the performance model allows the data recipient to understand the dynamic behavior of the bearing under different load conditions and use this for optimizing maintenance strategies. This capability also facilitates, in some embodiments, the use of vibrational data to estimate the load/unload status of a wheeled vehicle.

Model Modifications to Include Bearing/Assembly Defect Sites: To incorporate defects in the bearing assembly distributed circumferentially around the race of the bearing or the cylindrical housing structure into the model, their impact on the bearing's dynamic behavior must be considered, particularly on its stiffness and damping properties. The model can be modified to include parameters and equations for estimating the effect of the distribution and size of bearing defects on the measured spectrum with accelerometers. In some embodiments, the bearing defect parameters may comprise the distribution pattern of defects around the race of the bearing or the cylindrical housing structure. This can be uniform, random, or localized. In some embodiments, the bearing defect parameters may further comprise the size or severity of the defects, typically characterized by dimensions such as depth, width, and length.

The presence of defects introduces localized reductions in bearing stiffness due to material discontinuities and stress concentrations. The reduction in stiffness caused by each defect based on defect size, location, and material properties using fracture mechanics principles or numerical simulations can be represented as (($\Delta k_{defect}$)). Defects can also affect the damping properties of the bearing assembly by altering the energy dissipation mechanisms. The change in damping ratio induced by defects considering their size, shape, and material properties can be represented as (($\Delta \xi_{defect}$)).

The equivalent stiffness ((k)) and damping ratio (($\xi$)) of the bearing assembly can be adjusted by the following equations to account for the effects of defects:

$$[k_{modified} = k - \Sigma \Delta k_{defect}]$$

$$[\xi_{modified} = \xi + \Sigma \Delta \xi_{defect}]$$

These equations may then be repeated to incorporate the cumulative effects of all defects distributed circumferentially around the bearing race or housing structure.

The presence of defects alters the bearing's dynamic response, leading to changes in the vibrational spectrum ((S(f)) captured by accelerometers. Numerical simulations or analytical methods may be utilized to predict the modified spectrum considering the modified bearing parameters and defect characteristics. The modified spectrum may be compared to a baseline (defect-free) spectrum to identify spectral features indicative of defect presence and severity. The model predictions may be validated through experimental testing using artificially induced defects or real-world bearing samples with known defects. The vibrational spectrum may then be measured under various load and operating conditions to assess the detectability and diagnostic capability of the accelerometer-based monitoring system. Estimating the effect of distribution and size of bearing defects on the measured spectrum with accelerometers allows for a more comprehensive assessment of bearing health and condition monitoring for predictive maintenance and avoidance of catastrophic failure.

Modifying the Model to Enable Spectral Separation For Distinguishing Causes: To separate bearing defect spectra from spectra expected for a defect-free bearing, and subsequently assess the defect spectra, a robust signal processing and anomaly detection method is required. In some embodiments, this may comprise establishing a baseline spectrum. Establishing the baseline may comprise acquiring vibration data from accelerometers installed on defect-free bearings under normal operating conditions to establish a baseline spectrum. Establishing the baseline may further comprise computing statistical measures (e.g., mean, standard deviation) of the baseline spectrum for each frequency bin to characterize the expected vibration levels.

In some embodiments, the method may further comprise a defect detection algorithm. The algorithm may comprise developing a defect detection algorithm based on deviation analysis to identify spectral features indicative of bearing defects. The algorithm may further comprise a spectral subtraction technique, comprising subtracting the baseline spectrum from the measured spectrum to isolate deviations caused by defects. The algorithm may further comprise a thresholding technique, comprising setting thresholds based on statistical measures (e.g. z-score) to flag frequency bins exhibiting significant deviations from the baseline. The algorithm may further comprise a machine learning technique comprising training classifiers (e.g., SVM, neural networks) using labeled data to distinguish between defect and defect-free spectra. In some embodiments, the method may further comprise a feature extraction algorithm. The algorithm may comprise extracting informative features from the defect spectra to characterize the nature and severity of bearing defects. The algorithm may further comprise considering features such as peak amplitudes, frequency shifts, spectral entropy, and higher-order statistics (e.g., kurtosis, skewness) to capture distinct spectral signatures associated with different types of defects.

In some embodiments, the method may further comprise a pattern recognition and classification algorithm. The algorithm may comprise utilizing pattern recognition and classification techniques to classify defect spectra into different fault categories (e.g., inner race, outer race, rolling element faults). The algorithm may further comprise training machine learning models (e.g., decision trees, random forests) using labeled defect spectra to automatically classify and categorize bearing defects based on their spectral patterns. In some embodiments, the method may further comprise a validation and refinement algorithm. The algorithm may comprise validating the defect detection algorithm and classification model using experimental data collected from bearings with known defects. The algorithm may further comprise refining the algorithm and model parameters based on feedback from real-world testing to enhance accuracy and robustness.

In some embodiments, the method may further comprise a continuous improvement algorithm. The algorithm may comprise continuously monitoring and evaluating the performance of the defect detection system in detecting and classifying bearing defects. The algorithm may further comprise incorporating feedback from field data and user experience to refine algorithms, update models, and improve the overall effectiveness of the system. By implementing this strategy, bearing defect spectra can be effectively separated from spectra expected for defect-free bearings, enabling accurate assessment and diagnosis of bearing health. This proactive approach to condition monitoring facilitates early detection of defects, minimizes downtime, and extends the operational life of bearings in critical applications.

Model Modification to Incorporate Temperature Dependence: To incorporate the effects of physical temperature on the bearing spectra into the model, the influence of temperature variations on the dynamic behavior of the bearing assembly must be considered. Temperature changes can affect the material properties, internal clearances, and lubrication conditions of the bearing, leading to alterations in its vibration characteristics. These alterations may comprise temperature-dependent stiffness (k(T)). The stiffness of the bearing assembly is influenced by temperature variations, affecting its dynamic response. The temperature-dependent stiffness (k(T)) may be modeled using empirical equations or finite element analysis considering the thermal expansion coefficients of bearing materials and geometric properties.

These alterations may further comprise temperature-dependent damping (ξ(T)). Similarly, temperature changes can influence the damping properties of the bearing, affecting energy dissipation mechanisms. The temperature-dependent damping (ξ(T)) may be estimated based on the viscosity of lubricants, thermal conductivity of bearing materials, and contact friction coefficients. These alterations may further comprise modified bearing parameters with temperature. The equivalent stiffness ((k)) and damping ratio ((ξ)) of the bearing assembly may be adjusted by the following equations to account for temperature effects:

$$[k_{modified}(T)=k(T)]$$

$$[\xi_{modified}(T)=\xi(T)]$$

Temperature-dependent variations in bearing parameters may in this way be incorporated into the vibrational spectrum model.

Incorporating temperature dependence into the model may further comprise implementing a temperature compensation algorithm. This algorithm may be developed to mitigate the influence of temperature variations on the measured spectra. The algorithm may comprise utilizing temperature sensors embedded within or near the bearing assembly to monitor temperature changes in real-time. The algorithm may further comprise implementing compensation techniques such as scaling or normalization to adjust the measured spectra based on the temperature variations according to the temperature-dependent bearing parameters.

Temperature dependence may be integrated with defect detection in the model. In some embodiments, this integration may comprise integrating the temperature compensation algorithm with the defect detection system to ensure accurate assessment of bearing health regardless of temperature fluctuations. Integration may further comprise applying temperature compensation to defect spectra and baseline spectra to maintain consistency in the analysis and classification of bearing defects.

The incorporation of temperature dependence may be validated through experimentation. Validation may comprise validating the temperature compensation algorithm and its effectiveness in mitigating temperature effects on the measured spectra through experimental testing under controlled temperature conditions. Validation may further comprise assessing the performance of the integrated system in detecting and classifying bearing defects across a range of temperatures. The model's capability for incorporating temperature dependence may be continuously monitored and adjusted. This may comprise continuously monitoring temperature variations and evaluating the performance of the temperature compensation algorithm in real-world applications. This may further comprise fine-tuning the algorithm parameters and update the temperature-dependent bearing models as needed to improve accuracy and reliability.

By incorporating the effects of physical temperature on the bearing spectra and implementing temperature compensation techniques, robust and accurate assessment of bearing health may be ensured, even in challenging operating environments with significant temperature fluctuations. This holistic approach enhances the effectiveness of condition monitoring systems and enables proactive maintenance to prevent unexpected failures and optimize asset performance.

Model Variation that Includes the Temperature Dependence for Stiffness and Damping: The temperature dependence of the equivalent stiffness ((k(T))) and damping ratio ((ξ(T))) for the bearing assembly and its components can be described mathematically using empirical models or physical principles related to material properties and thermal behavior. Each parameter may be mathematically formulated as follows.

Temperature-Dependent Stiffness ((k(T))): The stiffness of the bearing assembly may vary with temperature due to changes in material properties, such as Young's modulus, thermal expansion coefficients, and elastic modulus. A simple linear model for temperature dependence of stiffness can be expressed as:

$$[k(T)=k_0+\alpha_k \cdot (T-T_0)]$$

where ($k_0$) is the baseline stiffness at reference temperature ($T_0$), and ($\alpha_k$) is the temperature coefficient of stiffness, representing the rate of change of stiffness with temperature.

Temperature-Dependent Damping ((ξ(T))): Damping in the bearing assembly can be influenced by temperature variations affecting factors such as viscosity of lubricants, thermal expansion of bearing materials, and frictional heating. A simple linear model for temperature dependence of damping can be expressed as:

$$[\xi(T)=\xi_0+\alpha_\xi \cdot (T-T_0)]$$

where ($\xi_0$) is the baseline damping ratio at reference temperature ($T_0$), and ($\alpha_\xi$) is the temperature coefficient of damping, representing the rate of change of damping ratio with temperature.

In practice, the stiffness and damping of the bearing assembly may exhibit nonlinear temperature dependencies due to complex interactions between material properties and thermal effects. More sophisticated models incorporating nonlinear temperature dependencies or empirical fitting based on experimental data may be necessary for accurate representation of stiffness and damping variations across a wide temperature range.

To determine the specific values of parameters ($k_0$, $\alpha_k$, $\xi_0$, $\alpha_\xi$) in the temperature-dependent models, experimental testing is required, e.g., conducting controlled experiments to measure stiffness and damping properties of the bearing assembly at different temperatures. This may comprise fitting the experimental data to the mathematical models to determine the temperature coefficients and validate the accuracy of the models across the operating temperature range of interest. By mathematically describing the temperature dependence of stiffness and damping for the bearing assembly and its components, temperature's effects into vibration analysis and condition monitoring algorithms can be incorporated, e.g. into the sensor data processor (507), enabling accurate assessment of bearing health under varying temperature conditions.

The system (100) of the present invention may comprise a rate gyro module. The module may comprise a rate gyro sensor (303), which detects the angular velocity of the wheel bearing. The module may comprise a mounting platform (302), which secures the rate gyro to the wheel bearing assembly, ensuring that it rotates with the wheel (103) or element having known rotation relationships to wheel rotation. The module may further comprise an angular velocity data processing unit (507), which interprets the gyroscopic data to derive rotational speed and phase. The module may further comprise a power supply (508), which energizes the rate gyro using energy harvested from the wheel's rotation. The module may further comprise a communication module (106) that wirelessly transmits the processed data to a predictive maintenance system. The module may further comprise reference markers on the wheel bearing or sensor device (104) rotor related elements, which can be used by the rate gyro to determine the start and end points of each rotation, or in the case of the rotor magnetics, can be used with a magnetic field sensor, e.g., hall effect device, to measure rotation directly by virtue of the number of poles counted per unit time or the passing of a single magnet displaced radially from the rotor magnets.

Figure 5:
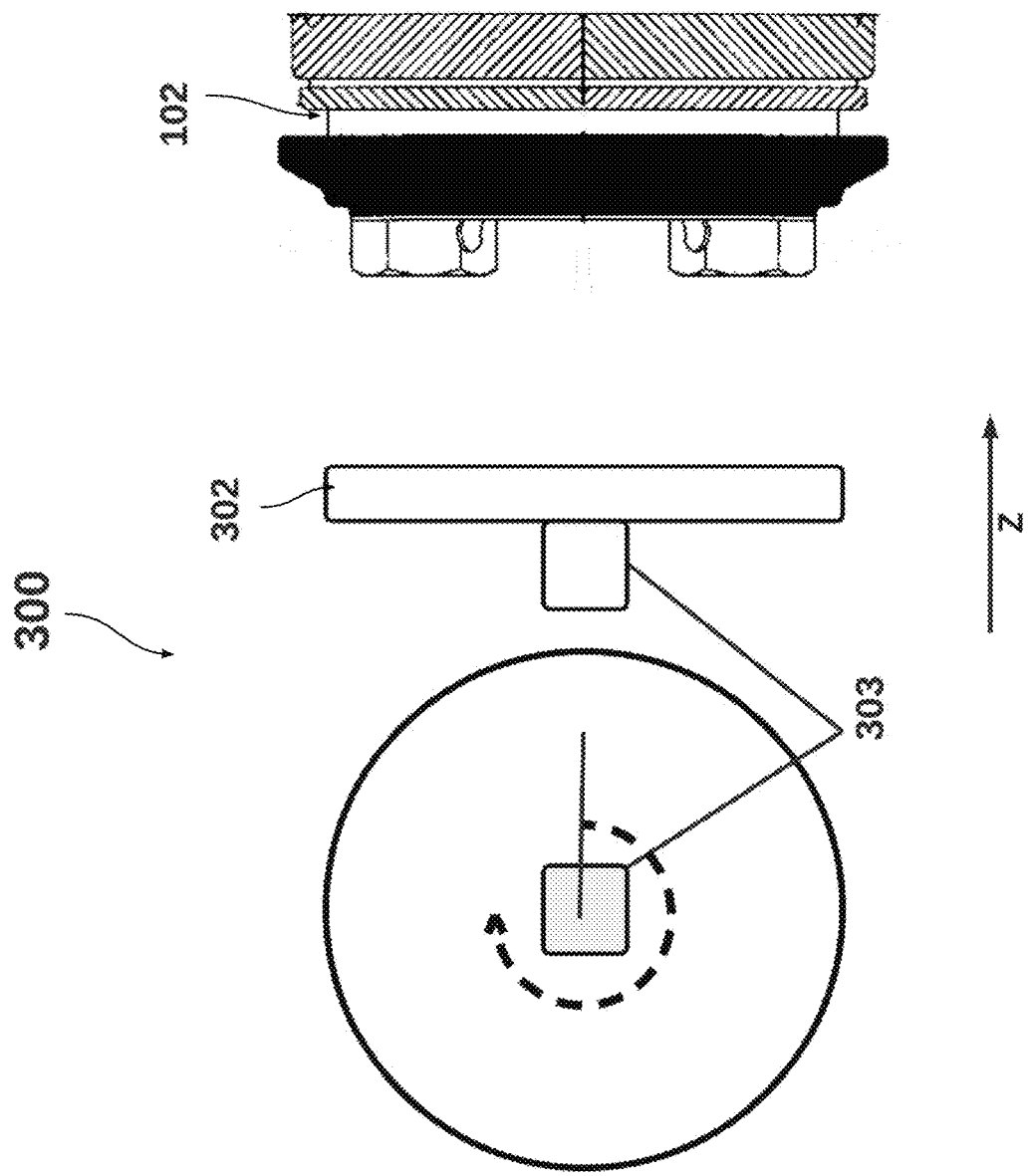
FIG. 5 shows a diagram of the rotational sensing modality of the sensor system of the present invention.

In FIG. 5, the rate gyro sensor (303) is rigidly mounted on the platform (302) so that it accurately reflects the rotational dynamics of the wheel bearing. As the wheel (103) turns, the rate gyro (303) measures the angular velocity, and the data processing unit (507) calculates the rotational speed and phase. This information is crucial for synchronization in multi-sensor data fusion and for assessing the wheel's dynamic balance. The system (100) is powered by a dedicated supply (508), and rotational data is communicated to the monitoring system via the communication module (106), with the reference markers providing positional context for each measurement.

The rate gyro sensing modality uses the principles of angular momentum and gyroscopic effects to measure rotational velocity. The rate gyro outputs a signal proportional to the rate of change of angular position over time, typically in degrees per second or radians per second. The angular velocity ($\omega$) sensed by the gyro can be modeled as:

$$\left[\omega(t) = \frac{d\theta(t)}{dt}\right]$$

where ($\theta(t)$) is the angular position of the wheel bearing at time (t).

In some embodiments, an algorithm for rotational data processing may comprise collecting raw gyroscopic data ($\omega(t)$) as a time series. The algorithm may further comprise applying a low-pass filter to remove high-frequency noise that is not characteristic of the wheel's rotation. The algorithm may further comprise integrating the filtered gyroscopic data over time to obtain the angular position ($\theta(t)$) by the following equation:

$$\left[\theta(t) = \int_0^t \omega(t)dt\right]$$

The algorithm may further comprise detecting rotation cycles by identifying peaks or troughs in ($\theta(t)$), which correspond to specific reference points on the wheel. The algorithm may further comprise calculating the rotational speed by analyzing the time intervals between successive peaks or troughs. The algorithm may further comprise using a communication protocol optimized for low power to transmit only essential information, such as the rotational speed and phase, to the predictive maintenance system. The algorithm focuses on accurately determining the wheel's rotational characteristics while conserving energy through efficient data processing and transmission methods.

Referring now to the invention in more detail, in FIG. 6 there is shown the fourth sensing modality, integrating an optical spectrometer into the sensor device (104), primarily for the detection and analysis of lubricant presence, type, and quantity on the railcar wheel bearing.

The system (100) of the present invention may further comprise an optical spectrometry module. In some embodiments, the module may comprise an optical spectrometer sensor (404) that captures the spectral data of the lubricant. The module may further comprise a light source (403) that emits broadband or narrowband light to illuminate the bearing surface. The module may further comprise a detector array integral to the spectrometer sensor (404) that captures the light after interaction with the lubricant. The module may further comprise a spectral analysis processor (507) which interprets the spectral data to identify lubricant characteristics. The module may further comprise a power supply unit (508) that operates the spectrometer and the light source. The module may further comprise a communication interface (106) for transmitting spectral data findings to the analysis system. The module may further comprise one or more optical fibers or lenses that guide the light from the source to the bearing and from the bearing to the detector.

In FIG. 6, the optical spectrometer (404) captures light reflected from or transmitted through the lubricant (405) on the bearing's surface. The light source (403) illuminates the lubricant, and the modified light is then collected by the detector array (404). The spectral analysis processor (507) uses this data to determine the lubricant's properties, including its type and the degree of degradation. Powered by the unit (508), the entire spectrometry module operates with energy efficiency, and the results are communicated via the interface (106), with the optical components ensuring precise light path management.

The optical spectrometry modality for lubricant analysis involves the physics of light-matter interaction, specifically absorption and fluorescence spectroscopy. The Beer-Lambert law is central to this analysis, relating the absorption of light to the properties of the material:

$$[A = \epsilon l\, c]$$

where (A) is the absorbance, (ϵ) is the molar absorptivity, (l) is the path length of the light through the material, and (c) is the concentration of the absorbing species.

The algorithm of the present invention for optical spectrometry may comprise emitting light onto the lubricant and collecting the transmitted or reflected light. The algorithm may further comprise converting the detected light into a spectrum using the detector array. The algorithm may further comprise applying the Beer-Lambert law to determine the concentration of specific lubricant components. The algorithm may further comprise using absorption peaks to identify the type of lubricant and its degradation state. The algorithm may further comprise optimizing energy usage by activating the light source and spectrometer only during measurement periods. The algorithm may further comprise transmitting processed data, minimizing the energy required for communication. This approach enables precise lubricant analysis with minimal energy consumption, facilitating real-time monitoring of lubricant condition without significant power requirements.

To estimate the presence and quantity of petroleum lubricants using the optical spectrometer, the spectral characteristics of petroleum-based lubricants may be utilized, particularly their absorption or emission spectra in the UV-visible range. In some embodiments, a method of the present invention for analyzing optical spectrometer data may comprise collecting spectral data from the optical spectrometer while scanning the exterior of the bearing assembly where lubricant seepage may occur. The method may further comprise ensuring that the spectrometer covers the UV-visible range, as this is a readily instrumented spectral region where petroleum-based lubricants exhibit absorption or emission features. Other spectra can be observed that are outside the region of common CMOS materials, provided light sources and detector materials are accordingly adjusted.

The method may further comprise taking baseline measurements of the spectral response in the absence of lubricants to establish a reference spectrum. The method may further comprise analyzing the acquired spectra to identify characteristic features associated with petroleum-based lubricants. This may involve comparing the measured spectra with reference spectra of known lubricants or using spectral libraries. The method may further comprise developing a mathematical model to quantify the presence and quantity of lubricants based on the intensity of specific spectral peaks or bands associated with petroleum lubricants. The method may further comprise calibrating the model using known concentrations of lubricants or standardized samples to establish a relationship between spectral intensity and lubricant concentration. The method may further comprise validating the model using samples with known lubricant concentrations and assessing its accuracy and reliability.

A common approach for estimating the quantity of petroleum lubricants based on spectral data is to utilize Beer-Lambert's law, solving for (c) is the concentration of the absorbing species, in terms of the other parameters of the law.

For petroleum lubricants, the Beer-Lambert equation can be modified to estimate lubricant concentration (c) based on the measured absorbance (A):

$$\left[ c = \frac{A}{\epsilon \cdot l} \right]$$

Where again, (ϵ) represents the molar absorptivity of the specific wavelengths corresponding to the absorption peaks of petroleum-based lubricants, and (l) is the path length of the sample, assumed a constant for this description.

In some embodiments, the optical spectrometry method of the present invention may further comprise identifying the specific wavelengths or spectral regions where petroleum-based lubricants exhibit distinct absorption or emission peaks. These features will serve as the basis for quantification. The method may further comprise calibrating the measurement system using known concentrations of lubricants to establish a reliable relationship between spectral intensity and lubricant concentration. The method may further ensure that the surface being scanned is appropriately prepared to provide consistent and reproducible spectral measurements. This may involve cleaning and standardizing the surface conditions. By implementing this strategy and mathematical function, the optical spectrometer can be effectively utilized to estimate the presence and quantity of petroleum-based lubricants on the exterior of the bearing assembly, facilitating condition monitoring and maintenance decisions.

The present invention may comprise a strategy for spectral analysis that includes both broadband and narrowband excitation, allowing the present invention to leverage different excitation wavelengths for specific observations. The strategy may comprise a selection of excitation wavelengths. Selection may comprise broadband excitation, which may comprise choosing an excitation wavelength that covers a broad spectral range to assess absorptions and general spectral features of the lubricant. Selection may further comprise narrowband excitation for fluorescence, which may comprise selecting a specific excitation wavelength known to induce fluorescence in the lubricant. Fluorescence emission can provide additional information about the lubricant composition and quantity. Selection may further comprise narrowband excitation for absorption lines, which may comprise identifying excitation wavelengths corresponding to specific absorption lines of the lubricant. These wavelengths can be used for precise measurements of lubricant presence and quantity based on absorption intensity.

The strategy may further comprise implementing a measurement spectrum. This may comprise performing spectral measurements using the optical spectrometer with each excitation wavelength. For broadband excitation, the focus is placed on assessing absorption features and overall spectral characteristics of the lubricant. For narrowband excitation (fluorescence), emission bands may be observed corresponding to fluorescence signals emitted by the lubricant. For narrowband excitation (absorption lines), specific absorption peaks may be targeted to assess the presence and quantity of lubricants.

The strategy may further comprise a quantification method. The method may comprise developing separate quantification methods for each excitation wavelength and corresponding spectral observation. For broadband excitation, lubricant concentration may be quantified based on the intensity of absorption features across the spectrum. For narrowband excitation (fluorescence), the fluorescence emission intensity may be analyzed to estimate lubricant quantity and composition. For narrowband excitation (absorption lines), the intensity of specific absorption peaks may be measured and related to lubricant concentration using calibration curves or known standards.

The strategy may further comprise a sample preparation method in support of calibration and or baseline model parameter estimation. The method may comprise preparing samples to ensure consistent and reproducible spectral measurements for each excitation wavelength. The method may further comprise considering variations in sample preparation techniques based on the nature of the excitation (broadband, narrowband fluorescence, narrowband absorption). The strategy may further comprise a validation and calibration method. The method may comprise validating each quantification method using standardized samples with known concentrations of lubricants. The method may further comprise calibrating the measurement system for each excitation wavelength to establish accurate relationships between spectral intensity and lubricant concentration or quantity. By incorporating both broadband and narrowband excitation approaches into the spectral analysis strategy, the sensitivity and specificity of lubricant detection and quantification can be enhanced. This comprehensive approach allows the diverse spectral features of lubricants to be leveraged and the assessment of lubricant presence and quantity on bearing surfaces to be effectively optimized.

In some embodiments, the present invention may be configured to measure the presence of mineral oil. Mineral oil has a broadband excitation wavelength of 260 nm. Upon excitation of this wavelength, the absorption peaks in the UV-visible range (e.g., aromatic compounds) may be assessed. Mineral oil has a narrowband excitation for fluorescence of 320 nm. Upon excitation of this wavelength, fluorescence emission bands indicative of specific molecular components may be observed. Mineral oil has a narrowband excitation wavelength for absorption lines of 280 nm. Upon excitation of this wavelength, absorption lines corresponding to characteristic molecular transitions may be targeted.

In some embodiments, the present invention may be configured to measure the presence of polyalphaolefin (PAO). PAO has a broadband excitation wavelength of 280 nm. Upon excitation of this wavelength, absorption features associated with aliphatic hydrocarbons may be evaluated. PAO has a narrowband excitation wavelength for fluorescence of 350 nm. Upon excitation of this wavelength, fluorescence emission signals characteristic of PAO components may be detected. PAO has a narrowband excitation wavelength for absorption lines of 300 nm. Upon excitation of this wavelength, specific absorption peaks related to PAO molecular structure may be analyzed.

In some embodiments, the present invention may be configured to measure the presence of polyglycol (PAG). PAG has a broadband excitation wavelength of 320 nm. Upon excitation of this wavelength, absorption peaks corresponding to polyglycol chains may be examined. PAG has a narrowband excitation wavelength for fluorescence of 380 nm. Upon excitation of this wavelength, fluorescence emission bands indicative of PAG constituents may be captured. PAG has a narrowband excitation wavelength for absorption lines of 340 nm. Upon excitation of this wavelength, absorption lines specific to PAG molecules may be focused on.

In some embodiments, the present invention may be configured to measure the presence of diester. Diester has a broadband excitation wavelength of 340 nm. Upon excitation of this wavelength, absorption features related to ester groups may be examined. Diester has a narrowband excitation wavelength for fluorescence of 400 nm. Upon excitation of this wavelength, fluorescence emission characteristics of diester components may be detected. Diester has a narrowband excitation wavelength for absorption lines of 360 nm. Upon excitation of this wavelength, absorption peaks associated with diester molecular transitions may be targeted.

In some embodiments, the present invention may be configured to measure the presence of synthetic hydrocarbon. Synthetic hydrocarbon has a broadband excitation wavelength of 300 nm. Upon excitation of this wavelength, absorption peaks attributed to alkane chains may be assessed. Synthetic hydrocarbon has a narrowband excitation wavelength for fluorescence of 370 nm. Upon excitation of this wavelength, fluorescence emission bands indicative of synthetic hydrocarbon constituents may be captured. Synthetic hydrocarbon has a narrowband excitation wavelength for absorption lines of 320 nm. Upon excitation of this wavelength, absorption lines specific to synthetic hydrocarbon molecules may be analyzed.

These parameter sets encompass a range of excitation wavelengths for broadband, narrowband fluorescence, and narrowband absorption analysis, allowing for comprehensive spectral assessment of lubricant presence and quantity. Adjustments and fine-tuning may be necessary based on experimental results and specific spectral characteristics of each lubricant type.

In some embodiments, the system (100) of the present invention may comprise one or more cameras. In some embodiments, the one or more cameras may comprise one or more red-green-blue (RGB) sensors. In some embodiments, the one or more cameras may comprise one or more thermal cameras. In some embodiments, at least one of the one or more cameras may be configured to view the rim of the wheel. In some embodiments, the one or more cameras may be further configured to take one or more images of the rim, detect a temperature of the rim, and determine if the temperature of the rim is indicative of the rim dragging. In some embodiments, the one or more cameras may be configured to transmit one or more images of the rim to the computing device (105). In some embodiments, the computing device (105) may be configured to detect a temperature of the rim based on the one or more images of the rim and determine if the temperature of the rim is indicative of the rim dragging.

In some embodiments, the one or more cameras may be configured to view one or more doors of the vehicle. In some embodiments, the one or more cameras may be further configured to take one or more images of the one or more doors, detect an open-close condition of the one or more doors, and determine whether the door is open or not. In some embodiments, one or more cameras may be configured to transfer the one or more images of the one or more doors to the computing device (105). In some embodiments, the computing device (105) may be configured to accept the one or more images of the one or more doors, detect an open-close condition of the one or more doors, and determine whether the door is open or not.

In some embodiments, the motion of the vehicle may be used in combination with an imaging sensor, configured to capture visible light, non-visible light, or a combination thereof to produce a stream of images that can be combined into a larger image describing the region traversed, e.g., for a rail car an image of the track or special track features may be produced as the car traverses the rail, thereby producing a panorama. In some embodiments, the panorama may comprise a thermographic panorama. In some embodiments, the panorama effect may be accomplished as the one or more imaging sensors rotate, translate, or a combination thereof.

The panoramic component is further described in patent application Ser. No. 18/490,044, the specification of which is incorporated herein in its entirety by reference.

In some embodiments, one or more of the sensor modalities of the sensor device (104) of the present invention may be configured to communicate with an additional device for transmitting data gathered by the one or more sensing modalities. In some embodiments, the additional device may comprise a computing device (105). In some embodiments, the sensor device (104) may be configured to transmit the data magnetically. In some embodiments, the computing device (105) may be disposed in the stator such that the data is transferred by communication between the first and second magnet systems. In some embodiments, the sensor device (104) may comprise a wireless transceiver component (106) configured to transfer the data through a wireless connection to the computing device (105). In some embodiments, the wireless transceiver component (106) may comprise an antenna. In some embodiments, the wireless connection may comprise a Bluetooth connection, a WiFi connection, a wide area network (WAN) connection, a wireless local-area network (WLAN) connection, any other category of wireless connection, or a combination thereof.

As stated above, the individual sensor modalities of the present invention are configured for data transmission and/or processing. For example, to design a measurement strategy for capturing accelerometer data and computing relevant data outputs for assessing railcar wheel bearing wear, the present invention implements a strategy that considers various factors such as sampling frequency, data processing techniques, and relevant parameters for assessing wear. Consideration of sampling frequency may comprise determining an appropriate sampling frequency based on the expected frequency range of vibration signals associated with normal and abnormal operation of the wheel bearing. A higher sampling frequency allows for capturing finer details of the vibration behavior. Typically, sampling frequencies in the range of 0 kHz to 10 KHz are suitable for capturing wheel bearing vibration data.

The strategy may comprise data pre-processing. Data pre-processing may comprise implementing filtering techniques, such as low-pass filters, to remove high-frequency noise from the accelerometer data while retaining the relevant vibration signals and applying signal conditioning methods to normalize the accelerometer data and remove any bias or drift. The strategy may further comprise feature extraction. Feature extraction may comprise extracting relevant features from the preprocessed accelerometer data to characterize the vibrational behavior of the wheel bearing.

Common features include RMS (Root Mean Square) amplitude, peak amplitude, frequency spectrum analysis (FFT), Kurtosis, Crest Factor, etc. Feature extraction may further comprise utilizing statistical measures to quantify the variability and distribution of vibration signals over time.

The strategy may further comprise trend analysis. Trend analysis may comprise monitoring changes in the extracted features over time to identify trends indicative of wear progression. Trend analysis may further comprise establishing baseline values for each feature during normal operation and comparing them with real-time data to detect deviations. Trend analysis may further comprise implementing algorithms for trend analysis, such as moving averages, exponential smoothing, or machine learning models for anomaly detection. The strategy may further comprise thresholding and alarming. Thresholding may comprise defining threshold levels for each extracted feature beyond which the vibration behavior is considered abnormal or indicative of excessive wear. Alarming may comprise triggering alarms or notifications when the extracted features exceed predefined threshold levels, signaling the need for further inspection or maintenance.

The strategy may further comprise failure mode prediction. The prediction may comprise leveraging knowledge of wheel bearing failure modes and literature on predictive maintenance strategies to correlate specific vibration patterns with potential failure modes. The prediction may further comprise developing algorithms or decision trees based on historical data and expert knowledge to predict impending failures and prioritize maintenance actions. The strategy may comprise integration with the overall monitoring system. Integration may comprise integrating the accelerometer data processing and analysis pipeline with the overall railcar monitoring system, incorporating other sensor data such as temperature measurements from the thermal infrared sensor. Integration may further comprise implementing a centralized data management platform for storing, processing, and visualizing the collected sensor data, facilitating comprehensive analysis and decision-making.

The strategy may comprise continuous improvement. This may comprise continuously evaluating and refining the measurement strategy based on feedback from deployments and ongoing calibration and characterization work, knowledge that can be used to remotely update measurement systems using an exterior network to connect with measurement systems or devices. This may further comprise staying updated with advancements in sensor technology, data analytics techniques, and industry best practices for wheel bearing predictive maintenance. By following this measurement strategy, accelerometer data can be effectively captured, and processed to compute relevant data outputs, and the wear status of railcar wheel bearings can be assessed, enabling proactive maintenance and minimizing downtime due to unexpected failures.

In some embodiments, the present invention features a wireless sensor device comprising a body component, configured to be attached to a wheel (103) of a railcar, the wheel (103) comprising a plate extending from the railcar such that a groove exists between the plate and the railcar, and a bearing disposed on the plate. The bearing may comprise one or more bolts such that the device is configured to expose the one or more bolts.

In some embodiments, the device may further comprise a clamp component, wherein the device is configured to attach to the bearing assembly by clamping onto the bearing end cap (124). In some embodiments, the device may further comprise a slotting component at least partially matching a shape of the radial gap between end cap (124) and bearing housing (1104). The device may be configured to attach to the wheel (103) by slotting into the groove between the plate and the railcar. In some embodiments, the device may further comprise a mask component comprising one or more holes such that the one or more bolts fit through the one or more holes, wherein the device is configured to attach to the wheel (103) by fitting the mask component around the one or more bolts. In some embodiments, fitting the mask component around the one or more bolts may comprise applying force to the mask component by a sledgehammer.

In some embodiments, the attachment mechanism may further comprise a border surrounding the one or more bolts. In some embodiments, the device may further comprise a clamp component. The device may be configured to attach to the wheel (103) by clamping onto the border by the clamp component. In some embodiments, the device may further comprise a slotting component at least partially matching a shape defined by the border. The device may be configured to attach to the wheel (103) by slotting into the border. In some embodiments, the device may further comprise a mask component matching a shape of the border. The device may be configured to attach to the wheel (103) by fitting the mask component onto the border. In some embodiments, fitting the mask component onto the border may comprise applying force to the mask component by a sledgehammer.

In some embodiments, the device may further comprise one or more mount claws configured to be disposed around a border of the bearing, and an intermediate plate attached to the body component, configured to attach to the one or more mount claws and rest on a face of the bearing. In some embodiments, the intermediate plate may be configured to attach to the one or more mount claws by applying force to the intermediate plate by a hammer.

In some embodiments, the device may further comprise a plurality of bracket components disposed around a border of the body component, configured to fit around a border of the bearing, each bracket component comprising a ratchet component configured to be inserted into the body component such that the device is held in place against the bearing by the plurality of bracket components. In some embodiments, the plurality of ratchet components may be configured to be inserted into the body component by application of force by a hammer. In some embodiments, the body component may further comprise an internal spring assembly comprising a first panel, a second panel, and a plurality of springs disposed between the first panel and the second panel. The first panel may be configured to compress against the second panel by the plurality of springs upon application of force by the hammer such that the body component fits snugly against the bearing.

In some embodiments, the body component may comprise a first half and a second half. The first half and the second half may be configured to fit around a border of the bearing. In some embodiments, the body component may be configured to sit in the groove of the bearing. In some embodiments, the first half may be configured to attach to the second half by one or more screws. In some embodiments, the body component may further comprise one or more gripping components configured to fit against a front of the bearing, a back of the bearing, or a combination thereof.

In some embodiments, the plate may comprise a first threading component. In some embodiments, the device may further comprise a second threading component configured to interlock with the first threading component. The device may be configured to attach to the wheel (103) by interlocking the first threading component with the second threading component. In some embodiments, the device may further comprise a sleeve configured to expand upon exposure to heat and shrink upon cooling. The device may be configured to attach to the wheel (103) by applying heat to the sleeve, fitting the sleeve onto the bearing, and cooling the sleeve such that the sleeve snugly fits onto the bearing. In some embodiments, the device may be configured to attach to the bearing by an adhesive component. In some embodiments, the device may further comprise one or more spring-loaded clamps configured to attach to the one or more bolts of the bearing.

While the sensor device of the present invention is, in some embodiments, configured to be disposed on the bearings, the sensor device may be configured to measure properties of the bearings, a perimeter of the wheel (103) (e.g. to detect flat spots), the bearing housing (1104), and mechanical and acoustic properties of things that the wheels may be in contact with, such as rail structures, roads, bridges, or a combination thereof.

The computer system can include a desktop computer, a workstation computer, a laptop computer, a netbook computer, a tablet, a handheld computer (including a smartphone), a server, a supercomputer, a wearable computer (including a SmartWatch™), or the like and can include digital electronic circuitry, firmware, hardware, memory, a computer storage medium, a computer program, a processor (including a programmed processor), an imaging apparatus, wired/wireless communication components, or the like. The computing system may include a desktop computer with a screen, a tower, and components to connect the two. The tower can store digital images, numerical data, text data, or any other kind of data in binary form, hexadecimal form, octal form, or any other data format in the memory component. The data/images can also be stored in a server communicatively coupled to the computer system. The images can also be divided into a matrix of pixels, known as a bitmap that indicates a color for each pixel along the horizontal axis and the vertical axis. The pixels can include a digital value of one or more bits, defined by the bit depth. Each pixel may comprise three values, each value corresponding to a major color component (red, green, and blue). A size of each pixel in data can range from a 8 bits to 24 bits. The network or a direct connection interconnects the imaging apparatus and the computer system.

The term "processor" encompasses all kinds of apparatus, devices, and machines for processing data, including by way of example a programmable microprocessor, a microcontroller comprising a microprocessor and a memory component, an embedded processor, a digital signal processor, a media processor, a computer, a system on a chip, or multiple ones, or combinations, of the foregoing. The apparatus can include special-purpose logic circuitry, e.g., an FPGA (field programmable gate array) or an ASIC (application-specific integrated circuit). Logic circuitry may comprise multiplexers, registers, arithmetic logic units (ALUs), computer memory, look-up tables, flip-flops (FF), wires, input blocks, output blocks, read-only memory, randomly accessible memory, electronically-erasable programmable read-only memory, flash memory, discrete gate or transistor logic, discrete hardware components, or any combination thereof. The apparatus also can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. The processor may include one or more processors of any type, such as central processing units (CPUs), graphics processing units (GPUs), special-purpose signal or image processors, field-programmable gate arrays (FPGAs), tensor processing units (TPUs), and so forth.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, a data processing apparatus.

A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or can be included in, one or more separate physical components or media (e.g., multiple CDs, drives, or other storage devices). The operations described in this specification can be implemented as operations performed by a data processing apparatus on data stored on one or more computer-readable storage devices or received from other sources.

Program code embodied on a computer readable medium may be transmitted using any appropriate medium, including but not limited to wireless, wireline, optical fiber cable, R.F, Bluetooth, storage media, computer buses, etc., or any suitable combination of the foregoing. Computer program code for carrying out operations for aspects of the present disclosure may be written in any combination of one or more programming languages, including an object oriented programming language such as Java, Smalltalk, C#, Ruby, or the like, conventional procedural programming languages, such as Pascal, FORTRAN, BASIC, or similar programming languages, programming languages that have both object-oriented and procedural aspects, such as the "C" programming language, C++, Python, or the like, conventional functional programming languages such as Scheme, Common Lisp, Elixir, or the like, conventional scripting programming languages such as PHP, Perl, Javascript, or the like, or conventional logic programming languages such as PROLOG, ASAP, Datalog, or the like.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks.

However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

Computers typically include known components, such as a processor, an operating system, system memory, memory storage devices, input-output controllers, input-output devices, and display devices. It will also be understood by those of ordinary skill in the relevant art that there are many possible configurations and components of a computer and may also include cache memory, a data backup unit, and many other devices. To provide for interaction with a user, embodiments of the subject matter described in this specification can be implemented on a computer having a display device, e.g., an LCD (liquid crystal display), LED (light emitting diode) display, or OLED (organic light emitting diode) display, for displaying information to the user.

Examples of input devices include a keyboard, cursor control devices (e.g., a mouse or a trackball), a microphone, a scanner, and so forth, wherein the user can provide input to the computer. Other kinds of devices can be used to provide for interaction with a user as well; for example, feedback provided to the user can be in any form of sensory feedback, e.g., visual feedback, auditory feedback, or tactile feedback; and input from the user can be received in any form, including acoustic, speech, or tactile input. Examples of output devices include a display device (e.g., a monitor or projector), speakers, a printer, a network card, and so forth. Display devices may include display devices that provide visual information, this information typically may be logically and/or physically organized as an array of pixels. In addition, a computer can interact with a user by sending documents to and receiving documents from a device that is used by the user; for example, by sending web pages to a web browser on a user's client device in response to requests received from the web browser.

An interface controller may also be included that may comprise any of a variety of known or future software programs for providing input and output interfaces. For example, interfaces may include what are generally referred to as "Graphical User Interfaces" (often referred to as GUI's) that provide one or more graphical representations to a user. Interfaces are typically enabled to accept user inputs using means of selection or input known to those of ordinary skill in the related art. In some implementations, the interface may be a touch screen that can be used to display information and receive input from a user. In the same or alternative embodiments, applications on a computer may employ an interface that includes what are referred to as "command line interfaces" (often referred to as CLI's). CLI's typically provide a text based interaction between an application and a user. Typically, command line interfaces present output and receive input as lines of text through display devices. For example, some implementations may include what are referred to as a "shell" such as Unix Shells known to those of ordinary skill in the related art, or Microsoft® Windows Powershell that employs object-oriented type programming architectures such as the Microsoft®.NET framework.

Those of ordinary skill in the related art will appreciate that interfaces may include one or more GUI's, CLI's or a combination thereof. A processor may include a commercially available processor such as a Celeron, Core, or Pentium processor made by Intel Corporation®, a SPARC processor made by Sun Microsystems®, an Athlon, Sempron, Phenom, or Opteron processor made by AMD Corporation®, or it may be one of other processors that are or will become available. Some embodiments of a processor may include what is referred to as multi-core processor and/or be enabled to employ parallel processing technology in a single or multi-core configuration. For example, a multi-core architecture typically comprises two or more processor "execution cores". In the present example, each execution core may perform as an independent processor that enables parallel execution of multiple threads. In addition, those of ordinary skill in the related field will appreciate that a processor may be configured in what is generally referred to as 32 or 64 bit architectures, or other architectural configurations now known or that may be developed in the future.

A processor typically executes an operating system, which may be, for example, a Windows type operating system from the Microsoft Corporation®; the Mac OS X operating system from Apple Computer Corp.®; a Unix® or Linux®-type operating system available from many vendors or what is referred to as an open source; another or a future operating system; or some combination thereof. An operating system interfaces with firmware and hardware in a well-known manner, and facilitates the processor in coordinating and executing the functions of various computer programs that may be written in a variety of programming languages. An operating system, typically in cooperation with a processor, coordinates and executes functions of the other components of a computer. An operating system also provides scheduling, input-output control, file and data management, memory management, and communication control and related services, all in accordance with known techniques.

Connecting components may be properly termed as computer-readable media.

For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

The present invention may comprise or implement a neural network for machine learning tasks. The neural network may be stored, trained, and/or executed entirely on the user's computer, partly on the user's computer, as a stand-alone software package, partly on the user's computer and partly on a remote computer or entirely on the remote computer or server. The neural network may be stored in the form of program code, as described above. The neural network, in some embodiments, may be a perceptron neural network, a feed forward neural network, a multilayer perceptron neural network, a convolutional neural network, a radial basis functional neural network, a recurrent neural network, a long short-term memory neural network, a sequence-to-sequence neural network model, a modular neural network, or the like.

Embodiments

The following embodiments are intended to be illustrative only and not to be limiting in any way.

Embodiment 1: A self-powered sensor device (104) configured to measure properties of one or more bearings (102) of a wheel (103), the device comprising a magnetic power unit (600), configured to convert a rotation of the wheel (103) into energy and power the sensor device (104) with the energy without a battery.

Embodiment 2: A self-powered system (100) configured to measure properties of one or more bearings (102) of one or more wheels, the system (100) comprising: one or more sensor devices, each sensor device (104) disposed on a wheel (103) of the one or more wheels, each sensor device (104) comprising a magnetic power unit (600) operatively coupled to the one or more thermal sensors (134), configured to convert a rotation of the wheel (103) into energy and power the sensor device (104) with the energy without a battery.

Embodiment 3: A wireless sensor device comprising a body component, configured to be attached to a wheel (103) of a railcar, the wheel (103) comprising a plate extending from the railcar such that a groove exists between the plate and the railcar, and a bearing disposed on the plate, the bearing comprising one or more bolts, wherein the device is configured to expose the one or more bolts.

Embodiment 4: The device of embodiment 3 further comprising a clamp component, wherein the device is configured to attach to the wheel (103) by clamping onto the plate by the clamp component.

Embodiment 5: The device of embodiment 3 further comprising a slotting component at least partially matching a shape of the groove, wherein the device is configured to attach to the wheel (103) by slotting into the groove between the plate and the railcar.

Embodiment 6: The device of embodiment 3 further comprising a mask component comprising one or more holes such that the one or more bolts fit through the one or more holes, wherein the device is configured to attach to the wheel (103) by fitting the mask component around the one or more bolts.

Embodiment 7: The device of embodiment 6, wherein fitting the mask component around the one or more bolts comprises applying force to the mask component by a sledgehammer.

Embodiment 8: The device of embodiment 3, wherein the wheel (103) further comprises a border surrounding the one or more bolts.

Embodiment 9: The device of embodiment 8 further comprising a clamp component, wherein the device is configured to attach to the wheel (103) by clamping onto the border by the clamp component.

Embodiment 10: The device of embodiment 8 further comprising a slotting component at least partially matching a shape defined by the border, wherein the device is configured to attach to the wheel (103) by slotting into the border.

Embodiment 11: The device of embodiment 8 further comprising a mask component matching a shape of the border, wherein the device is configured to attach to the wheel (103) by fitting the mask component onto the border.

Embodiment 12: The device of embodiment 11, wherein fitting the mask component onto the border comprises applying force to the mask component by a sledgehammer.

Embodiment 13: The device of embodiment 3 further comprising: one or more mount claws configured to be disposed around a border of the bearing; and an intermediate plate attached to the body component, configured to attach to the one or more mount claws and rest on a face of the bearing.

Embodiment 14: The device of embodiment 13, wherein the intermediate plate is configured to attach to the one or more mount claws by applying force to the intermediate plate by a hammer.

Embodiment 15: The device of embodiment 3 further comprising a plurality of bracket components disposed around a border of the body component, configured to fit around a border of the bearing, each bracket component comprising a ratchet component configured to be inserted into the body component such that the device is held in place against the bearing by the plurality of bracket components.

Embodiment 16: The device of embodiment 15, wherein the plurality of ratchet components are configured to be inserted into the body component by application of force by a sledgehammer.

Embodiment 17: The device of embodiment 16, wherein the body component further comprises an internal spring assembly comprising a first panel, a second panel, and a plurality of springs disposed between the first panel and the second panel, wherein the first panel is configured to compress against the second panel by the plurality of springs upon application of force by the sledgehammer such that the body component fits snugly against the bearing.

Embodiment 18: The device of embodiment 3, wherein the body component comprises a first half and a second half, wherein the first half and the second half are configured to fit around a border of the bearing.

Embodiment 19: The device of embodiment 18, wherein the body component is configured to sit in the groove of the bearing.

Embodiment 20: The device of embodiment 18, wherein the first half is configured to attach to the second half by one or more screws.

Embodiment 21: The device of embodiment 18, wherein the body component further comprises one or more gripping components configured to fit against a front of the bearing, a back of the bearing, or a combination thereof.

Embodiment 22: The device of embodiment 1, wherein the plate comprises a first threading component.

Embodiment 23: The device of embodiment 22 further comprising a second threading component configured to interlock with the first threading component, wherein the device is configured to attach to the wheel (103) by interlocking the first threading component with the second threading component.

Embodiment 24: The device of embodiment 1 further comprising a sleeve configured to expand upon exposure to heat and shrink upon cooling, wherein the device is configured to attach to the wheel (103) by applying heat to the sleeve, fitting the sleeve onto the bearing, and cooling the sleeve such that the sleeve snugly fits onto the bearing.

Embodiment 25: The device of embodiment 1, wherein the device is configured to attach to the bearing by an adhesive component.

Embodiment 26: The device of embodiment 1, the device further comprises one or more spring-loaded clamps configured to attach to the one or more bolts of the bearing.

Embodiment 27: A magnetic power unit (600) configured to couple to a rotating component and convert a rotation of the rotating component into energy, the magnetic power unit (600) comprising: a rotor component (608), comprising a first magnet system, coupled to the rotating component such that the rotor component (608) rotates with a motion of the rotating component; a stator component (607) comprising a second magnet system and an asymmetric counterweight, disposed adjacent to the rotor component (608), coupled to the rotating component, wherein the asymmetric counterweight (707) is configured to offset an effect of the rotation of the rotating component on the stator component (607) such that the stator component (608) maintains rotational staticity; wherein the first magnet system is configured to pass the second magnet system with each rotation of the rotating component such that the first magnet system interacts with the second magnet system and the energy is generated.

Embodiment 28: A self-powered system (100) configured to measure properties of one or more bearings (102) of one or more wheels, the system (100) comprising: one or more sensor devices, each sensor device (104) disposed on a wheel (103) of the one or more wheels, each sensor device (104) comprising: a sensor housing; one or more thermal sensors (134) disposed within the sensor housing, configured to continuously measure a temperature of the one or more bearings (102) and generate a continuous temperature data stream; and a magnetic power unit (600) disposed within the sensor housing, operatively coupled to the one or more thermal sensors (134), configured to convert a rotation of the wheel (103) into energy and power the sensor device (104) with the energy without a battery; wherein the magnetic power unit (600) is disposed adjacent to the one or more thermal sensors (134); a computing device (105) communicatively coupled to the one or more sensor devices, comprising a processor (108) configured to execute computer-readable instructions and a memory component (109) comprising computer-readable instructions for: accepting, for each sensor device (104) of the one or more sensor devices, the continuous temperature data stream from the one or more thermal sensors (134); generating a temperature map of the one or more bearings (102) based on the one or more continuous temperature data streams; measuring a heat value of one or more regions of the temperature map against a heat threshold; and identifying, if the heat value of a region of the one or more regions exceeds the heat threshold, a hot spot indicative of one or more anomalies of the one or more bearings (102).

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting essentially of" or "consisting of", and as such the written description requirement for claiming one or more embodiments of the present invention using the phrase "consisting essentially of" or "consisting of" is met.

The reference numbers recited in the below claims are solely for ease of examination of this patent application, and are exemplary, and are not intended in any way to limit the scope of the claims to the particular features having the corresponding reference numbers in the drawings.

What is claimed is:

1. A self-powered system (100) configured to measure properties of one or more bearings (102) of one or more wheels, the system (100) comprising:
   a. one or more sensor devices, each sensor device (104) disposed on a wheel (103) of the one or more wheels, each sensor device (104) comprising:
      i. one or more thermal sensors (134), configured to continuously measure a temperature of the one or more bearings (102) and generate a continuous temperature data stream; and
      ii. a magnetic power unit (600) operatively coupled to the one or more thermal sensors (134), configured to convert a rotation of the wheel (103) into energy and power the sensor device (104) with the energy without a battery; and
   b. a computing device (105) communicatively coupled to the one or more sensor devices, comprising a processor (108) configured to execute computer-readable instructions and a memory component (109) comprising computer-readable instructions for:
      i. accepting, for each sensor device (104) of the one or more sensor devices, the continuous temperature data stream from the one or more thermal sensors (134);
      ii. generating a temperature map of the one or more bearings (102) based on the one or more continuous temperature data streams;
      iii. measuring a heat value of one or more regions of the temperature map against a heat threshold; and
      iv. identifying, if the heat value of a region of the one or more regions exceeds the heat threshold, a hot spot indicative of one or more anomalies of the one or more bearings (102).

2. The system (100) of claim 1, wherein the magnetic power unit (600) comprises:
   a. a rotor component (608) comprising a first magnet system, configured to rotate with a motion of the wheel (103); and
   b. a stator component (607) comprising a second magnet system, disposed adjacent to the rotor component (608);
      wherein the first magnet system is configured to pass the second magnet system with each rotation of the wheel (103) such that the first magnet system interacts with the second magnet system and the energy is generated.

3. The system (100) of claim 1, wherein each sensor device (104) of the one or more sensor devices further comprises a wireless transceiver component (106) configured to communicatively couple the sensor device (104) to the computing device (105).

4. The system (100) of claim 1, wherein each sensor device (104) of the one or more sensor devices further comprises an accelerometer (203) operatively coupled to the magnetic power unit (600), configured to continuously measure a vibration signal of the wheel (103) and generate a continuous vibration data stream;
   wherein the memory component (109) further comprises computer-readable instructions for:
      a. accepting, for each sensor device (104) of the one or more sensor devices, the continuous vibration data stream from the accelerometer (203);
      b. identifying one or more vibrational patterns in the one or more continuous vibration data streams; and
      c. determining whether the one or more vibrational patterns are indicative of the one or more anomalies of the one or more bearings (102).

5. The system (100) of claim 4, wherein identifying the one or more vibrational patterns in the one or more continuous vibration data streams comprises isolating, by a Fourier transform applied to the one or more continuous vibration data streams, the one or more vibrational patterns.

6. The system (100) of claim 4, wherein the accelerometer (203) comprises a single-axis accelerometer, a three-axis accelerometer, or a combination thereof.

7. The system (100) of claim 4, wherein each sensor device (104) of the one or more sensor devices further comprises one or more operational condition sensors operatively coupled to the magnetic power unit (600), configured to detect one or more operational conditions of the wheel (103) and a surrounding environment of the wheel (103).

8. The system (100) of claim 7, wherein the memory component (109) further comprises computer-readable instructions for:
   a. accepting, for each sensor device (104), the one or more operational conditions from the one or more operational condition sensors; and
   b. filtering the one or more continuous vibration data streams based on the one or more operational conditions.

9. The system (100) of claim 4, wherein the accelerometer (203) is further configured to periodically calibrate vibration signal measurement.

10. The system (100) of claim 4, wherein each sensor device (104) of the one or more sensor devices further comprises a rate gyrometer (303) operatively coupled to the magnetic power unit (600), configured to continuously measure a rotational speed and a rotational phase of the wheel (103) and generate a continuous rotational data stream;
   wherein the memory component (109) further comprises computer-readable instructions for:
      a. accepting, for each sensor device (104) of the one or more sensor devices, the continuous rotational data stream from the rate gyrometer (303); and
      b. determining whether the rotational speed, the rotational phase, or a combination thereof are indicative of the one or more anomalies of the one or more bearings (102).

11. The system (100) of claim 10, wherein the memory component (109) further comprises computer-readable instructions for adjusting the heat threshold based on the rotational speed.

12. The system (100) of claim 10, wherein the memory component (109) further comprises computer-readable instructions for:
   a. integrating the one or more continuous vibration data streams with the one or more continuous rotational data streams to generate a vibration-rotation data stream; and
   b. detecting, based on the vibration-rotation data stream, one or more anomalies of the one or more bearings (102).

13. The system (100) of claim 10, wherein determining whether the rotational speed, the rotational phase, or the combination thereof are indicative of the one or more anomalies of the one or more bearings (102) comprises detecting one or more changes in the rotational speed over time.

14. The system (100) of claim 1, wherein each sensor device (104) of the one or more sensor devices further comprises an optical spectrometer (404) operatively coupled to the magnetic power unit (600), configured to continuously measure spectral data of the one or more bearings (102) and generate a continuous spectral data stream;
   wherein the one or more bearings (102) comprise one or more lubricants;
   wherein the memory component (109) further comprises computer-readable instructions for:
   a. accepting, for each sensor device (104) of the one or more sensor devices, the continuous spectral data stream from the optical spectrometer (404);
   b. identifying, based on the one or more continuous spectral data streams, an amount of lubricant, one or more lubricant types, one or more lubricant states, or a combination thereof;
   c. identifying, based on the amount of lubricant, the one or more lubricant types, the one or more lubricant states, or the combination thereof, a potential lubricant shortage; and
   d. adjusting, based on the amount of lubricant, the one or more lubricant types, the one or more lubricant states, or the combination thereof, the heat threshold.

15. The system (100) of claim 14, wherein identifying the potential lubricant shortage comprises identifying one or more lubricant degradation products.

16. The system (100) of claim 14, wherein the optical spectrometer (404) comprises one or more light sources, each light source comprising a light intensity value, wherein each light source of the one or more light sources are configured to detect an ambient light value of a surrounding environment, and adjust the light intensity value based on the ambient light value.

17. The system (100) of claim 1, wherein the memory component (109) further comprises a machine learning model configured to accept the one or more continuous thermal data streams as input and generate a bearing lifespan prediction as output.

18. The system (100) of claim 1, wherein each sensor device (104) of the one or more sensor devices further comprises an acoustic transducer operatively coupled to the magnetic power unit (600), configured to continuously measure an acoustic signal of the wheel (103), a surrounding environment of the wheel (103), or a combination thereof, and generate a continuous acoustic data stream; wherein the memory component (109) further comprises computer-readable instructions for:
   a. accepting, for each sensor device (104) of the one or more sensor devices, the continuous acoustic data stream from the acoustic transducer;
   b. identifying one or more acoustic patterns in the one or more continuous acoustic data streams; and
   c. determining whether the one or more acoustic patterns are indicative of the one or more anomalies of the one or more bearings (102) or related mechanical apparatuses.

19. A method for measuring properties of one or more bearings (102) of one or more wheels, the method comprising:
   a. providing one or more sensor devices, each sensor device (104) disposed on a wheel (103) of the one or more wheels, each sensor device (104) comprising:
      i. one or more thermal sensors (134), configured to continuously measure a temperature of the one or more bearings (102) and generate a continuous temperature data stream; and
      ii. a magnetic power unit (600) operatively coupled to the one or more thermal sensors (134), configured to convert a rotation of the wheel (103) into energy and power the sensor device (104) with the energy without a battery; and
   b. continuously measuring, for each sensor device (104) of the one or more sensor devices, the temperature of the one or more bearings (102);
   c. generating, for each sensor device (104) of the one or more sensor devices, the continuous temperature data stream;
   d. transmitting, for each sensor device (104) of the one or more sensor devices, the continuous temperature data stream to a computing device (105) communicatively coupled to the one or more sensor devices;
   e. generating, by the computing device (105), a temperature map of the one or more bearings (102) based on the one or more continuous temperature data streams;
   f. measuring, by the computing device (105), a heat value of one or more regions of the temperature map against a heat threshold; and
   g. identifying, by the computing device (105), if the heat value of a region of the one or more regions exceeds the heat threshold, a hot spot indicative of one or more anomalies of the one or more bearings (102).

20. A self-powered system (100) configured to measure properties of one or more bearings (102) of one or more wheels, the system (100) comprising:
   a. one or more sensor devices, each sensor device (104) disposed on a wheel (103) of the one or more wheels, each sensor device (104) comprising:
      i. a magnetic power unit (600), configured to convert a rotation of the wheel (103) into energy and power the sensor device (104) with the energy without a battery;
      ii. one or more thermal sensors (134) operatively coupled to the magnetic power unit (600), configured to continuously measure a temperature of the one or more bearings (102) and generate a continuous temperature data stream;
      iii. an accelerometer (203) operatively coupled to the magnetic power unit (600), configured to continuously measure a vibration signal of the wheel (103) and generate a continuous vibration data stream;
      iv. a rate gyrometer (303) operatively coupled to the magnetic power unit (600), configured to continuously measure a rotational speed and a rotational phase of the wheel (103) and generate a continuous rotational data stream; and v. an optical spectrometer (404) operatively coupled to the magnetic power unit (600), configured to continuously measure spectral data of the one or more bearings (102) and generate a continuous spectral data stream; and b. a computing device (105) communicatively coupled to the one or more sensor devices, comprising a processor (108) configured to execute computer-readable instructions and a memory component (109) comprising computer-readable instructions for:

i. accepting, for each sensor device (104) of the one or more sensor devices, the continuous temperature data stream from the one or more thermal sensors (134);

ii. generating a temperature map of the one or more bearings (102) based on the one or more continuous temperature data streams;

iii. measuring a heat value of one or more regions of the temperature map against a heat threshold;

iv. identifying, if the heat value of a region of the one or more regions exceeds the heat threshold, a hot spot indicative of one or more anomalies of the one or more bearings (102);

v. accepting, for each sensor device (104) of the one or more sensor devices, the continuous vibration data stream from the accelerometer (203);

vi. identifying one or more vibrational patterns in the one or more continuous vibration data streams;

vii. determining whether the one or more vibrational patterns are indicative of the one or more anomalies of the one or more bearings (102);

viii. accepting, for each sensor device (104) of the one or more sensor devices, the continuous rotational data stream from the rate gyrometer (303);

ix. determining whether the rotational speed, the rotational phase, or a combination thereof are indicative of the one or more anomalies of the one or more bearings (102);

x. accepting, for each sensor device (104) of the one or more sensor devices, the continuous spectral data stream from the optical spectrometer (404);

xi. identifying, based on the one or more continuous spectral data streams, an amount of lubricant, one or more lubricant types, one or more lubricant states, or a combination thereof;

xii. identifying, based on the amount of lubricant, the one or more lubricant types, the one or more lubricant states, or the combination thereof, a potential lubricant shortage; and xiii. adjusting, based on the amount of lubricant, the one or more lubricant types, the one or more lubricant states, or the combination thereof, the heat threshold.

21. A self-powered system (100) configured to measure properties of one or more bearings (102) of one or more wheels, the system (100) comprising:

a. one or more sensor devices, each sensor device (104) disposed on a wheel (103) of the one or more wheels, each sensor device (104) comprising:

i. one or more thermal sensors (134), configured to continuously measure a temperature of the one or more bearings (102) and generate a continuous temperature data stream;

wherein the one or more thermal sensors (134) are disposed optically in-line with the one or more bearings (102) such that the one or more thermal sensors (134) do not contact the one or more bearings (102); and ii. a magnetic power unit (600) operatively coupled to the one or more thermal sensors (134), configured to convert a rotation of the wheel (103) into energy and power the sensor device (104) with the energy without a battery; and b. a computing device (105) communicatively coupled to the one or more sensor devices, comprising a processor (108) configured to execute computer-readable instructions and a memory component (109) comprising computer-readable instructions for:

i. accepting, for each sensor device (104) of the one or more sensor devices, the continuous temperature data stream from the one or more thermal sensors (134);

ii. generating a temperature map of the one or more bearings (102) based on the one or more continuous temperature data streams;

iii. measuring a heat value of one or more regions of the temperature map against a heat threshold; and iv. identifying, if the heat value of a region of the one or more regions exceeds the heat threshold, a hot spot indicative of one or more anomalies of the one or more bearings (102).

* * * * *